Figure 1:
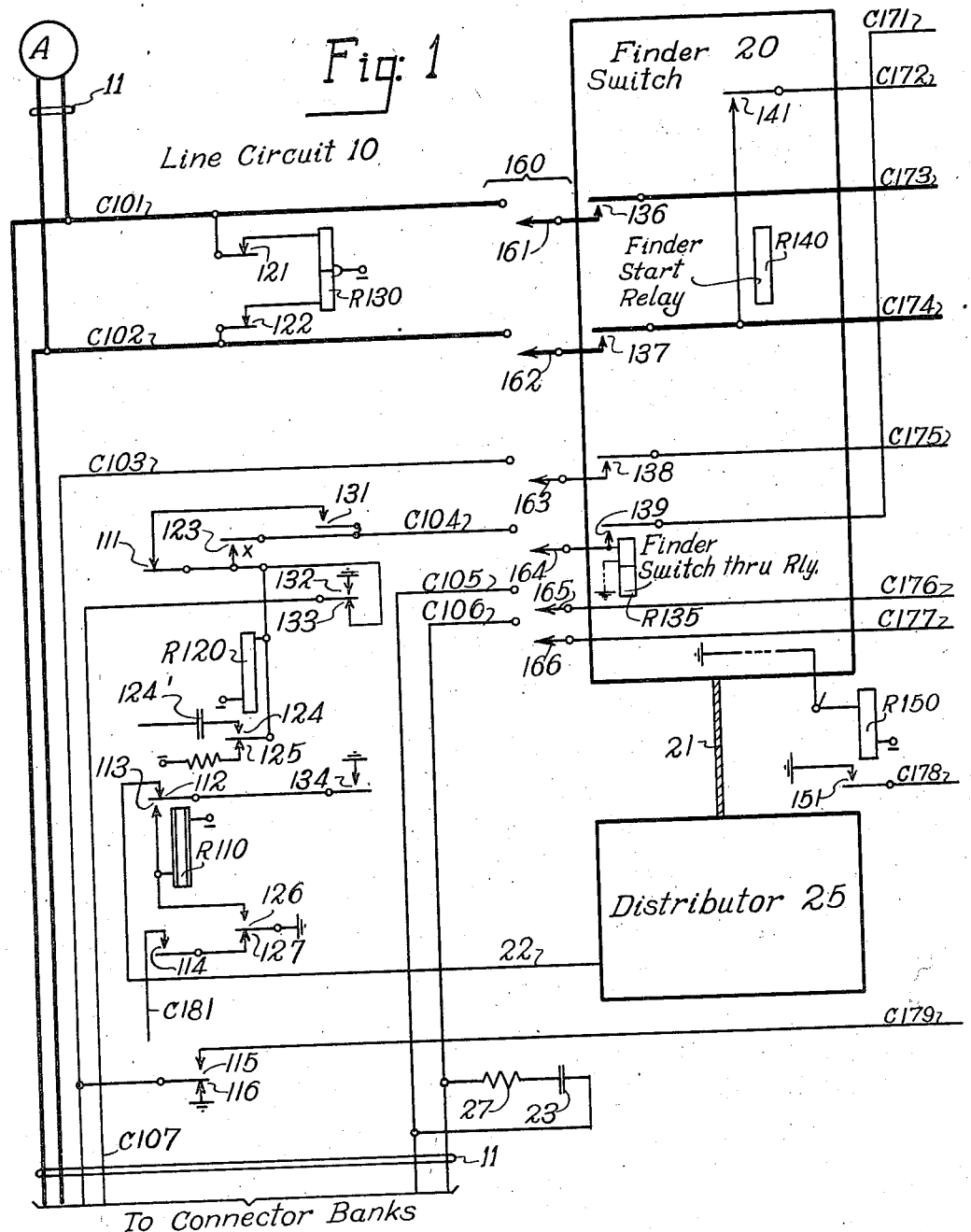
Figure 2:
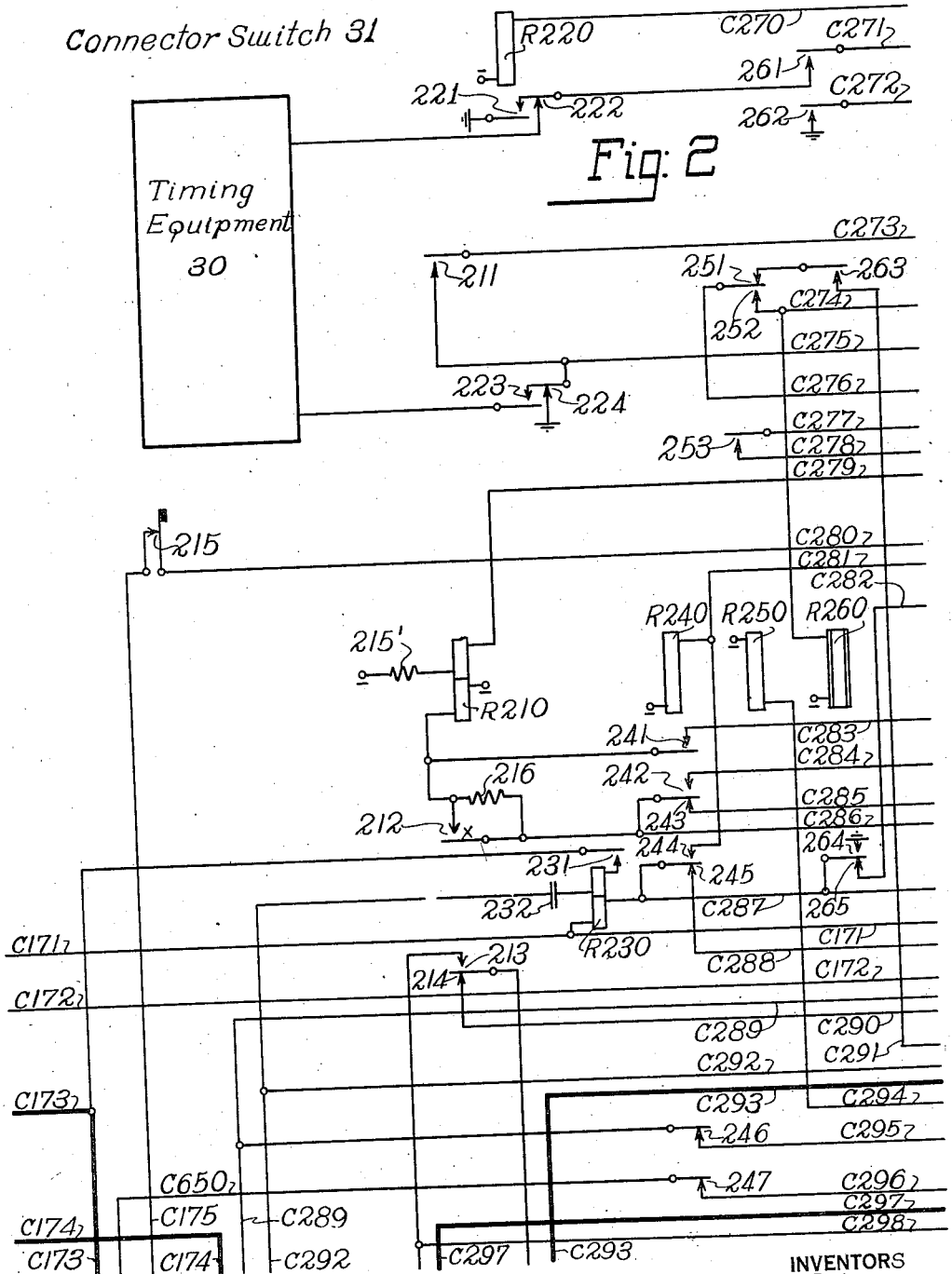
Figure 3:
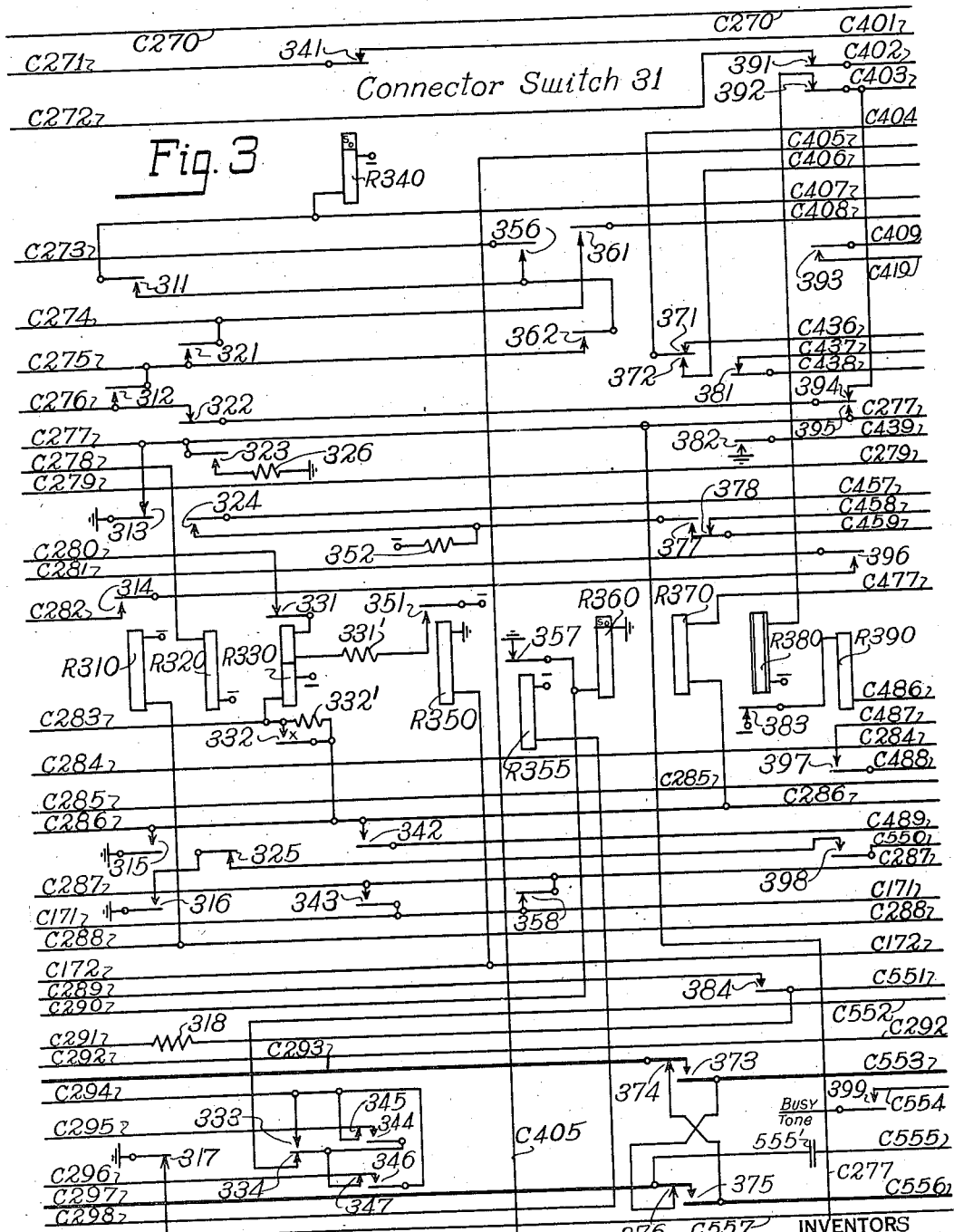
Figure 4:
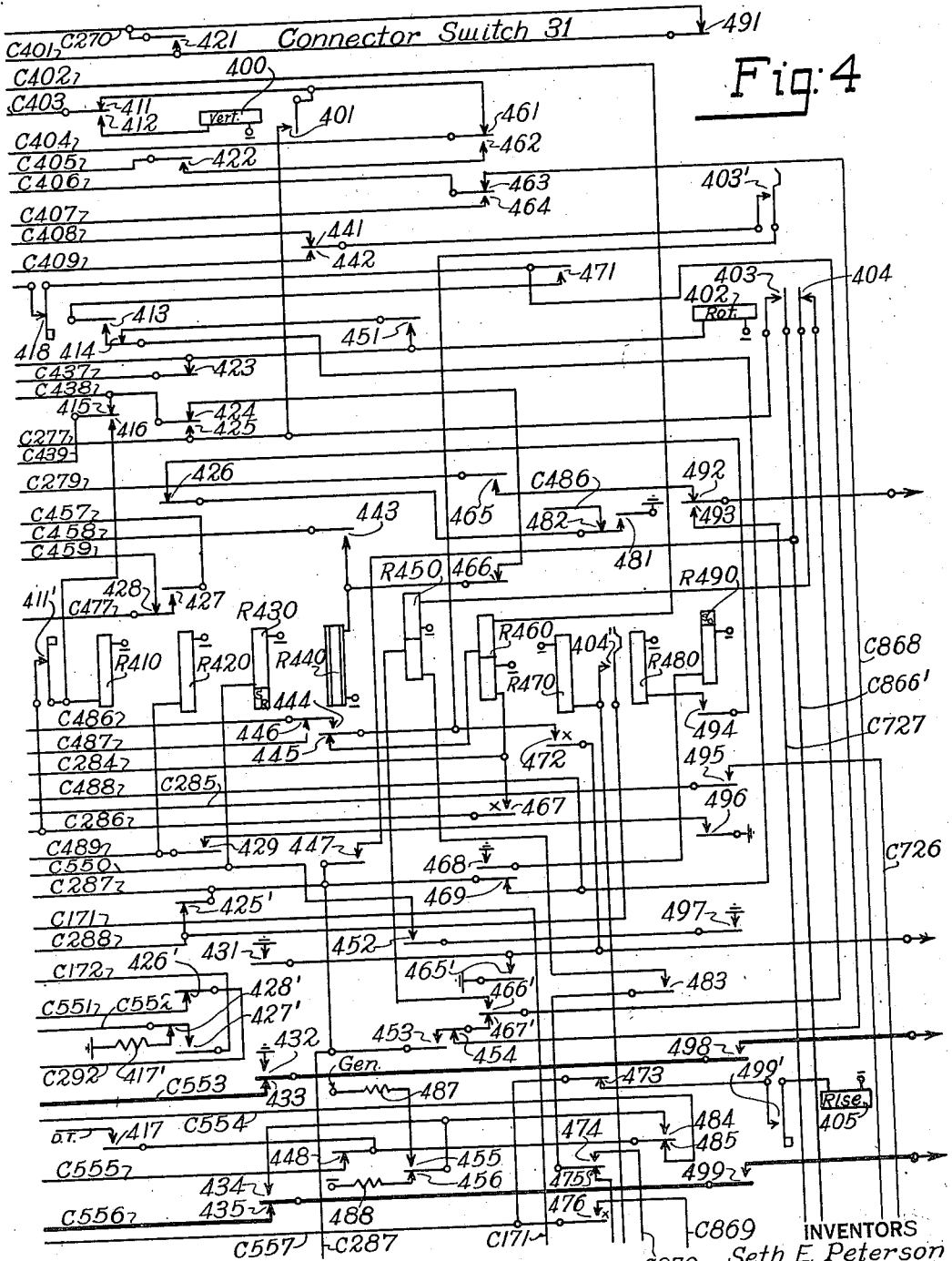

Feb. 23, 1943. S. E. PETERSON ET AL 2,311,774
TELEPHONE SYSTEM
Filed Aug. 2, 1940    14 Sheets-Sheet 10

INVENTORS
Seth E. Peterson
Morris E. Griffins
BY
Davis, Lindsey, Smith + Shonts
ATTORNEYS Feb. 23, 1943. S. E. PETERSON ET AL 2,311,774
TELEPHONE SYSTEM
Filed Aug. 2, 1940 14 Sheets-Sheet 11

INVENTORS
Seth E. Peterson
Morris E. Griffins
BY
Davis, Lindsey, Smith & Shonts
ATTORNEYS Link and Line Class Finder Apparatus 42

Pulsing Relays

INVENTORS
Seth E. Peterson
Morris E. Griffins
BY
Davis, Lindsey, Smith & Shonts
ATTORNEYS Feb. 23, 1943. S. E. PETERSON ET AL 2,311,774
TELEPHONE SYSTEM
Filed Aug. 2, 1940 14 Sheets—Sheet 14
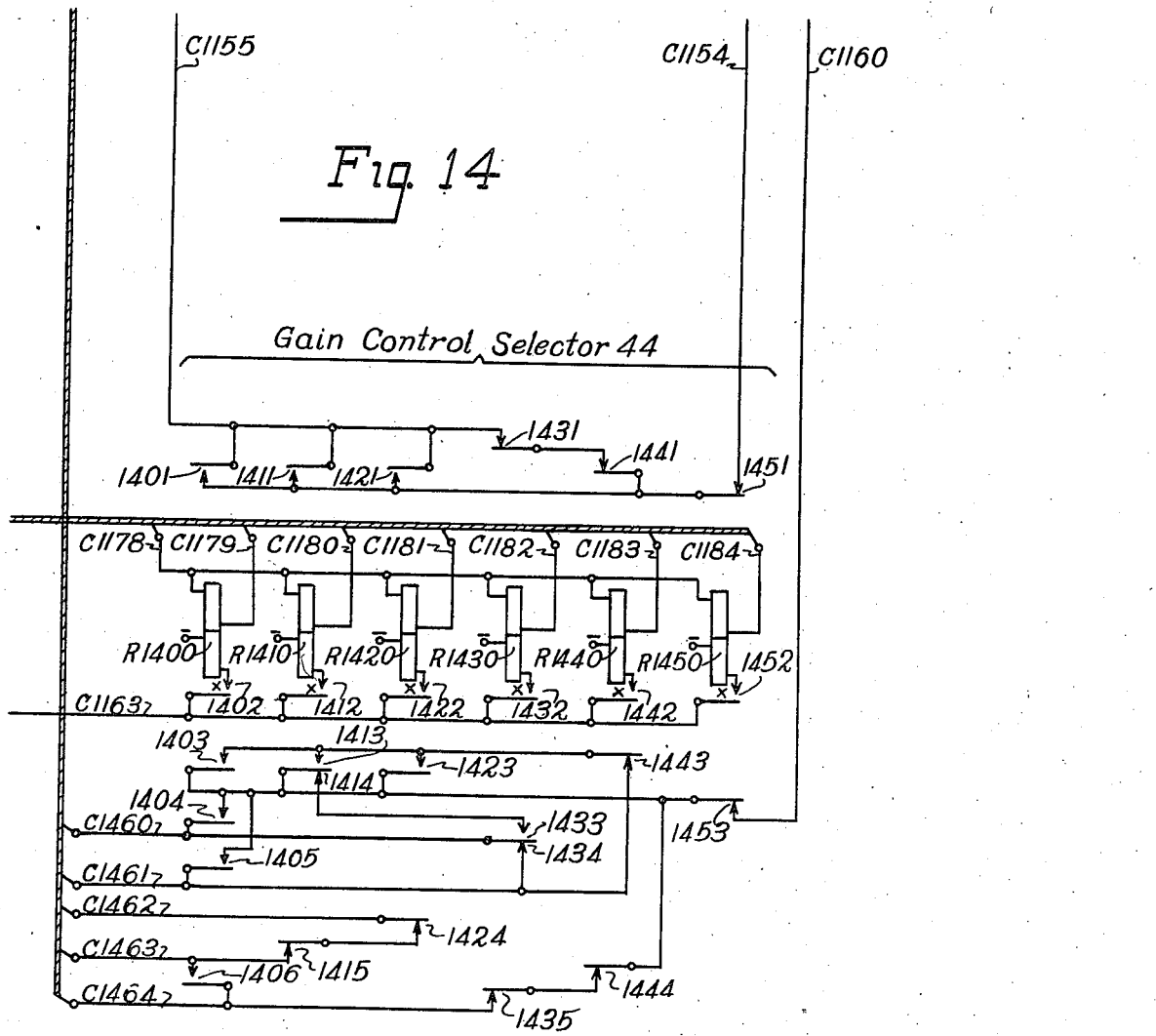
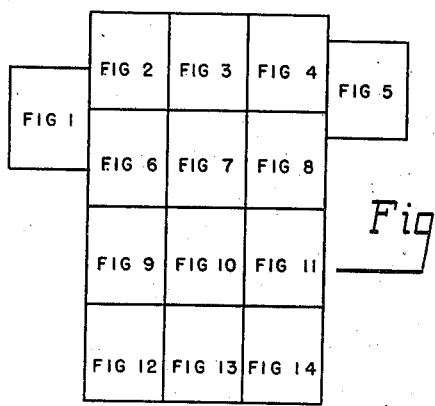
INVENTORS
Seth E. Peterson
Morris E. Griffins
BY
Davis, Lindsey, Smith & Shonts
ATTORNEYS

Patented Feb. 23, 1943

2,311,774

UNITED STATES PATENT OFFICE 2,311,774

TELEPHONE SYSTEM

Seth E. Peterson, Chicago, and Morris E. Griffins, Riverside, Ill., assignors to Associated Electric Laboratories, Inc., Chicago, Ill., a corporation of Delaware Application August 2, 1940, Serial No. 349,928

84 Claims. (Cl. 179—18)

The present invention relates to telephone systems and more particularly to improvements in automatic switching apparatus and voice current repeating equipment of a character adapted for use in an exchange of the automatic type.

In certain areas, such, for example, as small communities having a limited number of telephone subscribers, it is desirable to provide exchanges of the unattended automatic type in order to provide high class service and to minimize operating and maintenance costs. In such areas, subscriber lines frequently have widely different signal current transmission characteristics due to the variations in line length, the condition of the lines, etc. Accordingly, the transmission efficiencies of different connections involving different subscriber lines may vary widely depending upon the signal transmission characteristics and more particularly the signal current losses of the connected lines, with the result that, in certain instances, such, for example, as when two extremely long lines are connected, the speech reproduction at the calling and called substations may be practically unintelligible.

It is an object of the present invention, therefore, to provide, in a telephone system, apparatus for enhancing and maintaining more nearly uniform the transmission efficiencies of connections involving lines having widely different signal current transmission characteristics.

It is another object of the invention to provide improved apparatus of the character described wherein the transmisssion efficiency control equipment, when required, is automatically inserted in each connection incident to the setting up of the connection.

It is a further object of the invention to provide, in an automatic telephone system, improved apparatus of the character described wherein voice current repeaters common to the individual switches of the automatic switching equipment are utilized as the transmission control elements and these repeaters are allotted to calling lines of the system in a predetermined order and without regard to the switches through which the connections are routed.

It is another object of the invention to provide, for use in an arrangement of the character described, improved finder apparatus which functions operatively to associate the allotted repeaters with the switch trains to which the repeaters are respectively assigned.

It is another object of the invention to provide, in an arrangement of the character described, improved apparatus for automatically maintaining the balance of the voice current repeaters in use regardless of the impedance characteristics of the lines with which the repeaters are associated, thereby to minimize singing in the repeater networks.

It is a further object of the invention to provide an arrangement of the character described wherein the repeater balancing networks are individual to the lines of the system and the balancing networks of any two connected lines are automatically selected and automatically connected to the hybrid systems of the repeater serving the two connected lines incident to the setting up of the connection between the two lines.

It is another object of the invention to provide a telephone system wherein the lines extending to an exchange are classified according to the signal current transmission characteristics thereof and provisions are made for automatically raising the signal transmission level over an established connection by any one of several predetermined accounts, the particular amount being determined by the total signal current loss of the connection as indicated by the class or classes in which the calling and called lines of the connection are respectively included.

It is another object of the invention to provide apparatus of the character described wherein provisions are made for automatically determining the gain of each assigned repeater in accordance with the transmission efficiency classification of the calling and called lines served by the repeater, incident to the setting up of the connection in which the repeater is included.

It is a further object of the invention to provide, for use in an arrangement of the character described, improved finder apparatus which performs the dual function of operatively associating the allotted repeaters with the switch trains to which the repeaters are assigned and of selecting the transmission efficiency classes in which the calling and called lines of the connections are included.

It is still another object of the invention to provide an arrangement of the character described wherein provisions are made for automatically excluding a repeater included in a completed connection from the connection when the connection is released at either the calling or the called end thereof.

It is a still further object of the invention to provide in a telephone system of the character described, an improved arrangement wherein the same circuit paths are utilized for line classification testing purposes and for distinguishing between calling lines of the loop circuit control type and calling lines of the simplex type.

The invention is illustrated in its embodiment in the automatic switching equipment provided in a small automatic exchange of the type commonly referred to as a community automatic exchange or C. A. X. The automatic switching equipment provided in the exchange comprises a plurality of finder-connector links, a link distributor, and the usual common equipment provided for ringing, supervisory and other signaling purposes. The signal current losses of the lines extending to the exchange are widely different in character, and, in order to provide for improvement in the signal transmission efficiency of connections involving the lines having transmission characteristics falling in certain classes, a plurality of voice current repeaters are provided. These repeaters are common to the finder-connector links of the exchange and each thereof includes two hybrid systems, one system corresponding to the calling end of a connection and the other hybrid corresponding to the called end of a connection. In order to insure the proper balance of the hybrid systems forming a part of a repeater included in a connection set up between two lines, each of the lines extending to the exchange is terminated in a line circuit which includes a balancing network having impedance characteristics designed to balance the impedance characteristics of the associated line.

An allotter common to the finder-connector links of the exchange is provided for assigning the voice current repeaters to the use of the links in a predetermined order. For the purpose of operatively associating an allotted or assigned repeater with the link to which it is assigned, link finder apparatus is provided. This apparatus also performs the function of determining the transmission efficiency zones or classes in which the calling and called lines of a connection routed through one of the links are included. More specifically, this finder apparatus is of the all-relay type, the test or counting relays thereof operating through a first cycle to select the link with which a particular assigned repeater is to be associated and through a second cycle to determine the transmission efficiency classes of the calling and called lines involved in the connection routed through the selected link. This second cycle of operation of the finder relays is also utilized to determine whether or not the transmission efficiency characteristics of the calling and called lines are such that a repeater is not required in the connection therebetween for satisfactory signal current transmission thereover. Apparatus controlled in accordance with the operation of the test or counting relays is provided for determining the gain of the repeater which is to be included in the particular connection. The setting of this gain control apparatus is determined by the transmission efficiency classification of the calling and called lines included in the connection. After this setting is determined, it is not changed. Moreover, the common equipment including the link finder apparatus is released following the operation of the gain control apparatus. Auxiliary relay equipment is provided in each of the links for so controlling the repeater connecting equipment that, when a connection is released at either the calling or called end thereof, the repeater included in the connection is effectively excluded therefrom, thus preventing the repeater from howling or singing to create a disturbance on the connection. The arrangement of this auxiliary relay equipment is also such that the repeater assigned to the connection is only included therein when the call is answered at the called substation.

Further features of the invention relate to the particular arrangement of the finder-connector links, the repeaters and the control circuits associated therewith, whereby the above-outlined and additional objects are attained.

Figure 5:
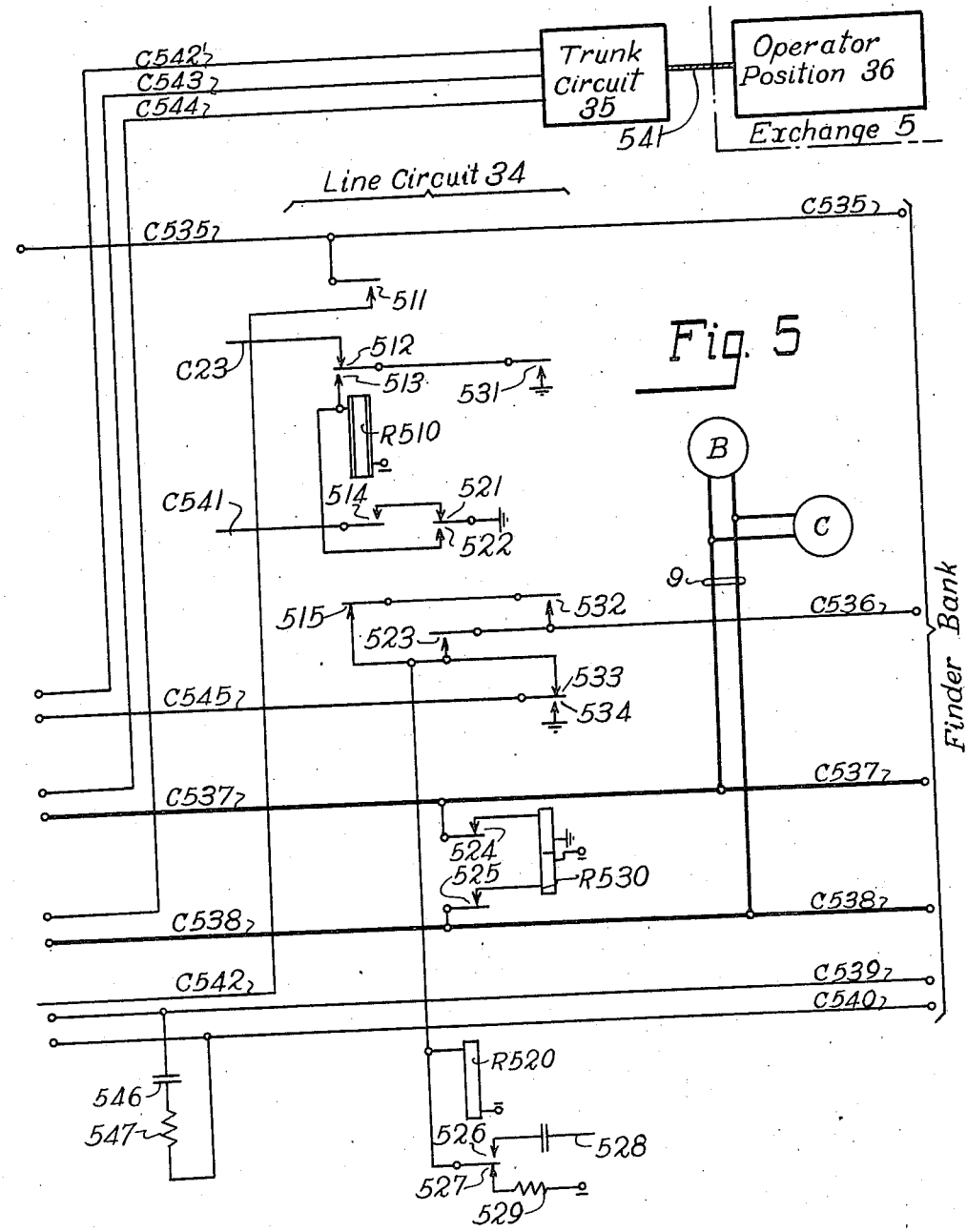
Figure 6:
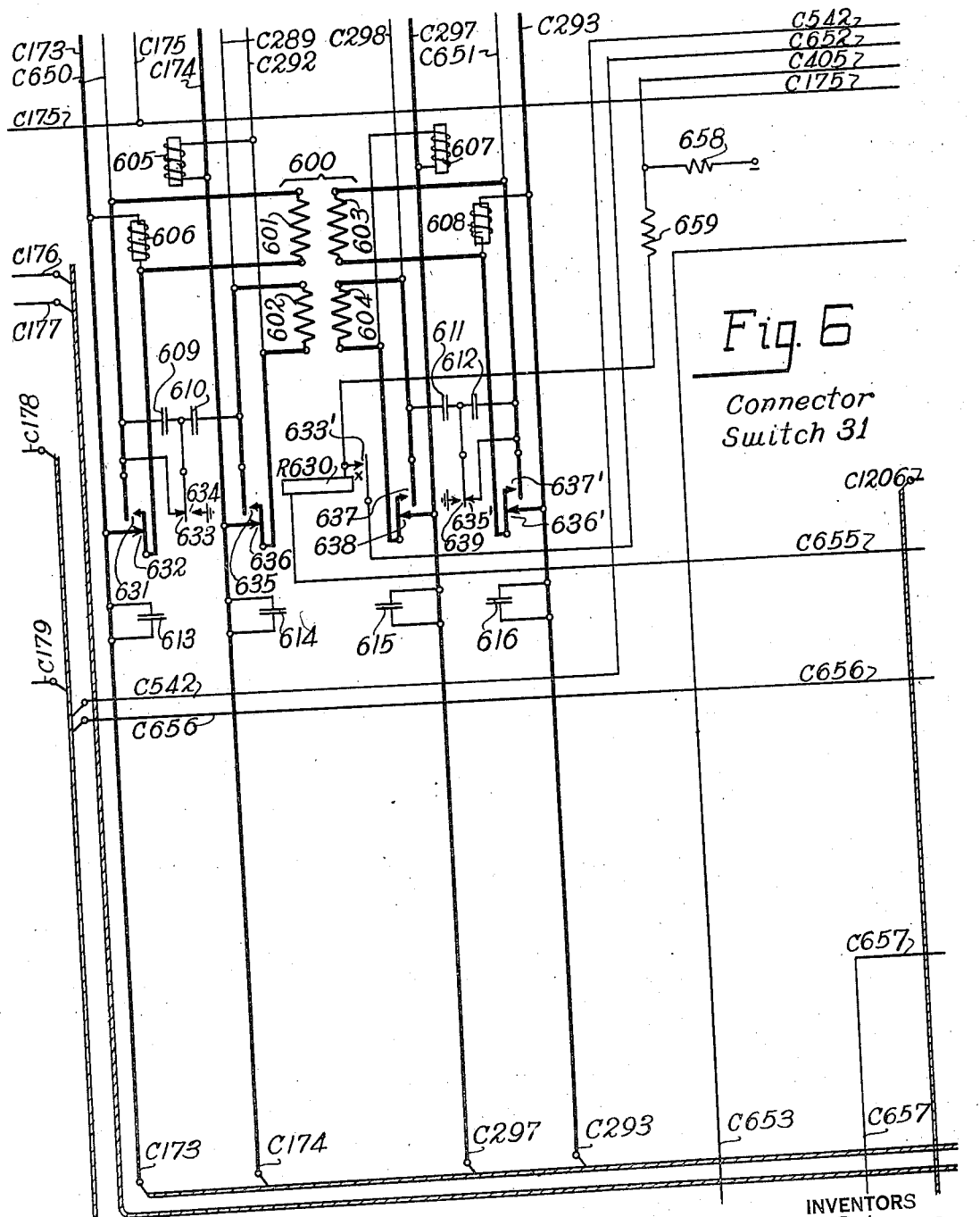
Figure 7:
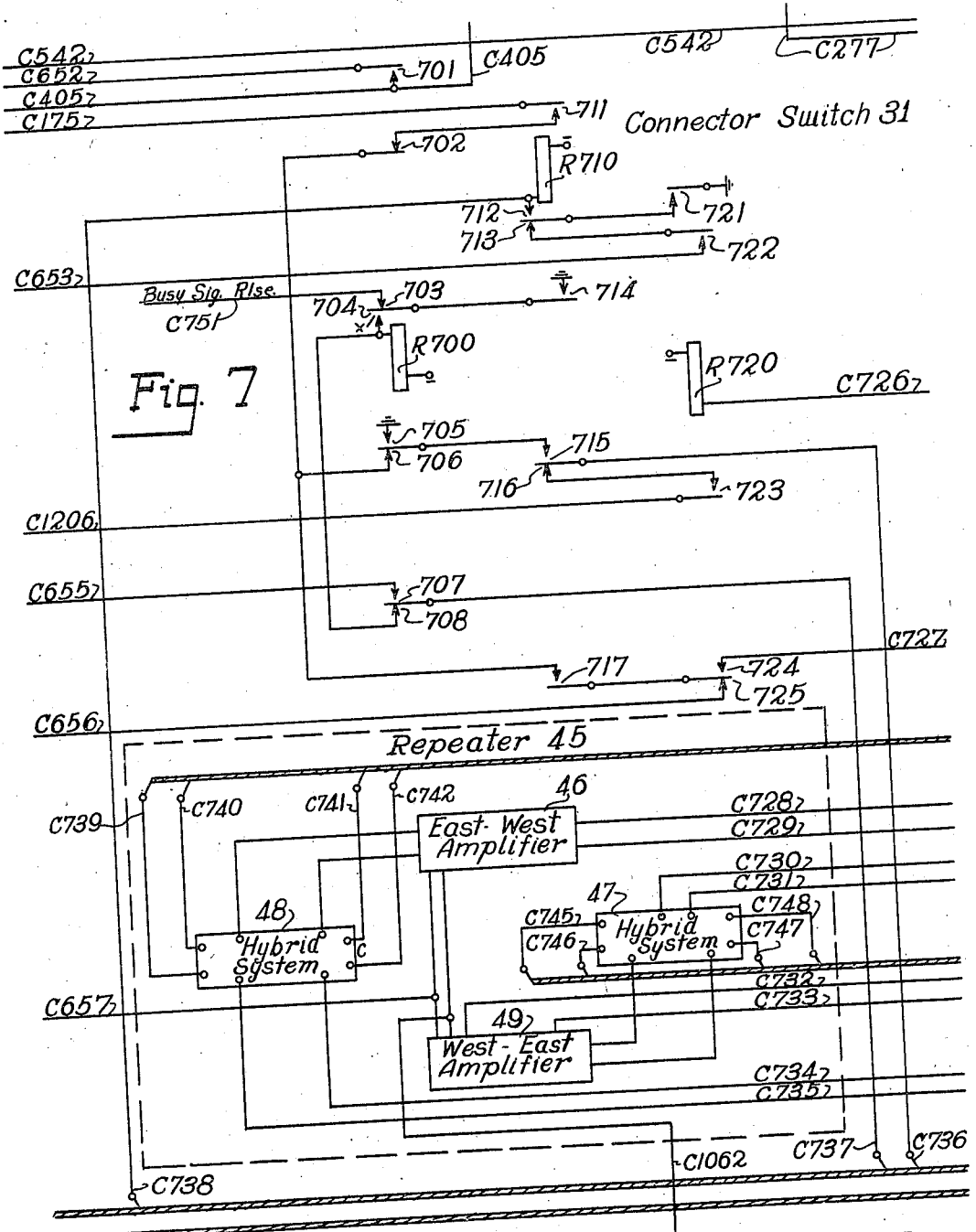
Figure 8:
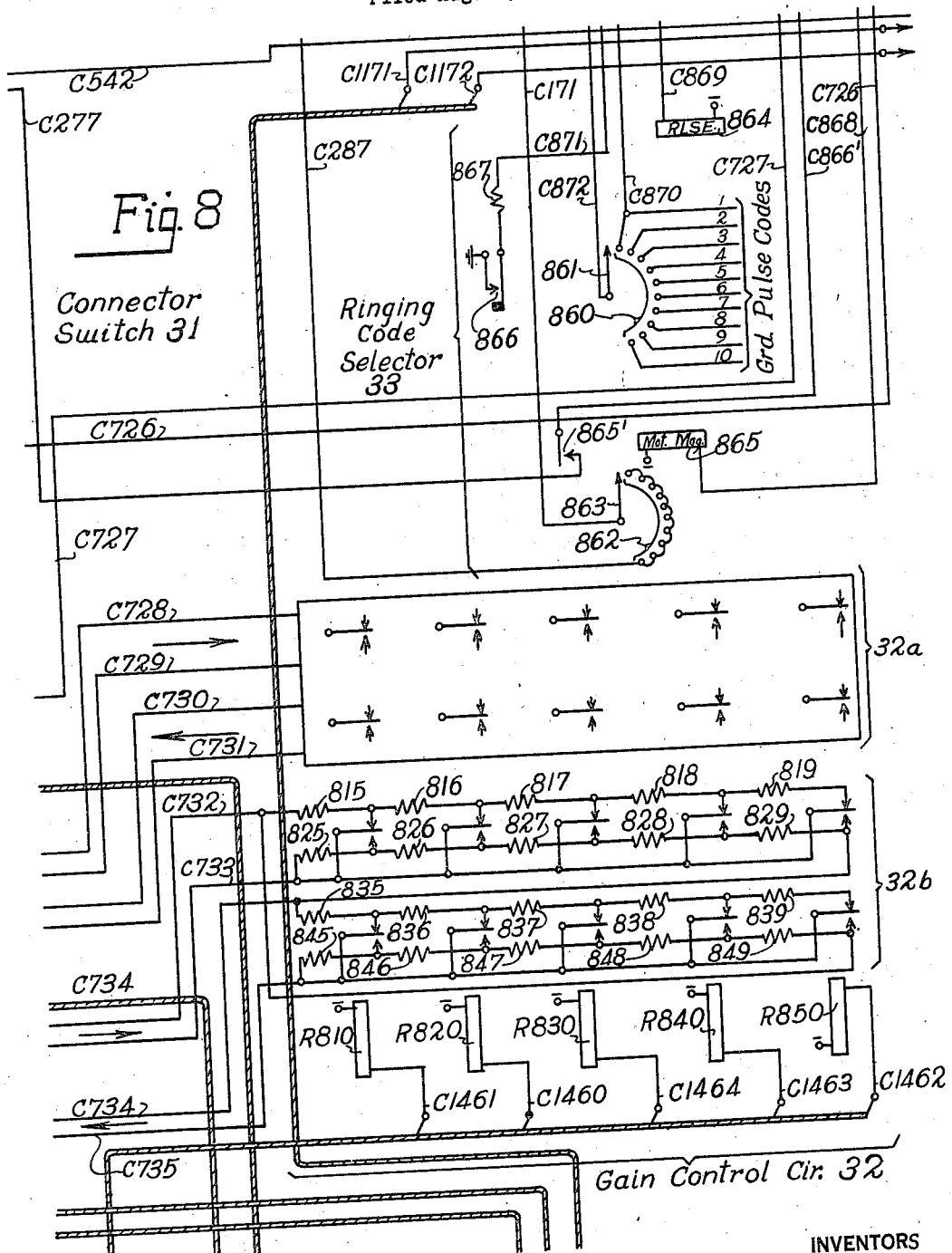
Figure 9:
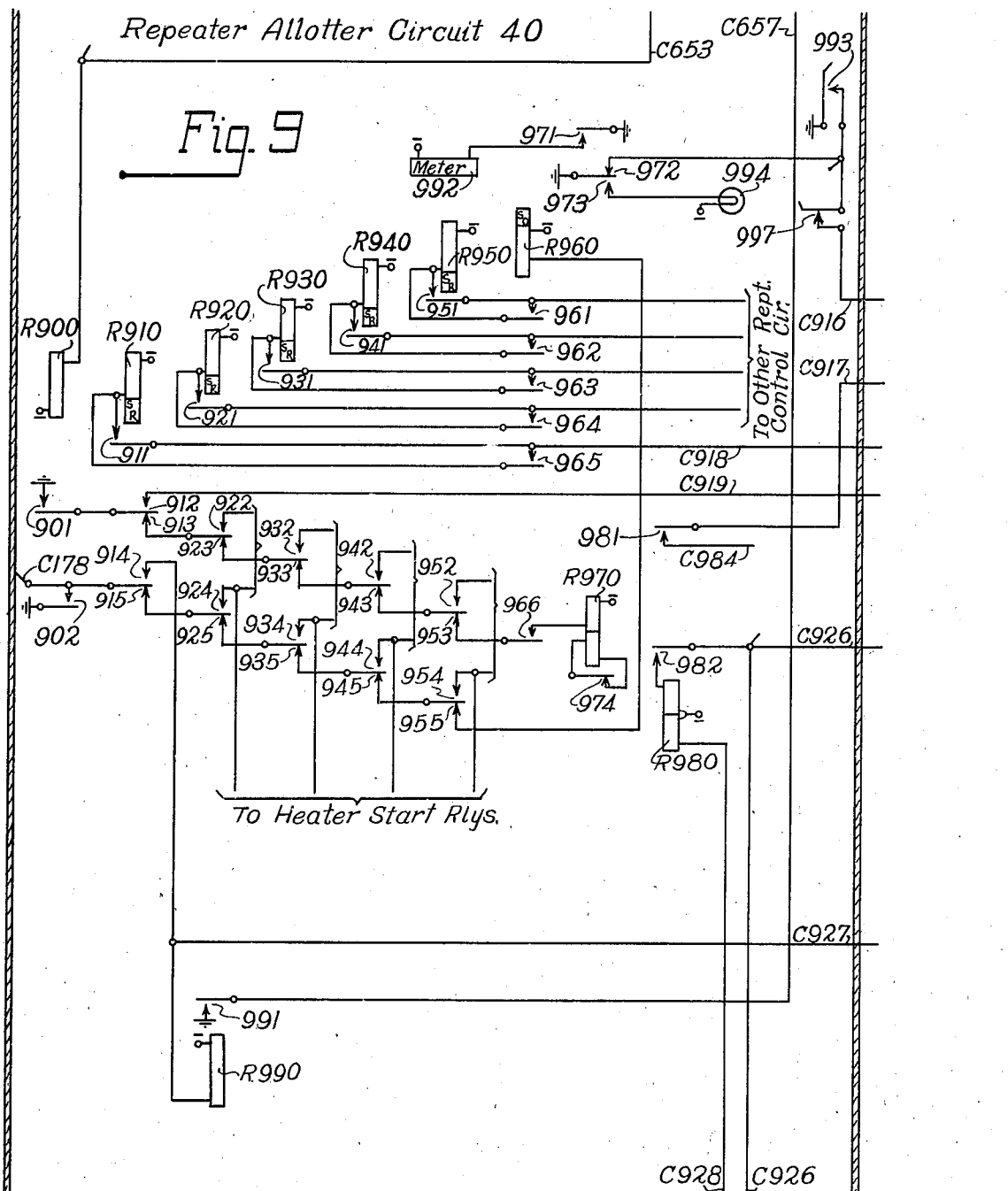
Figure 10:
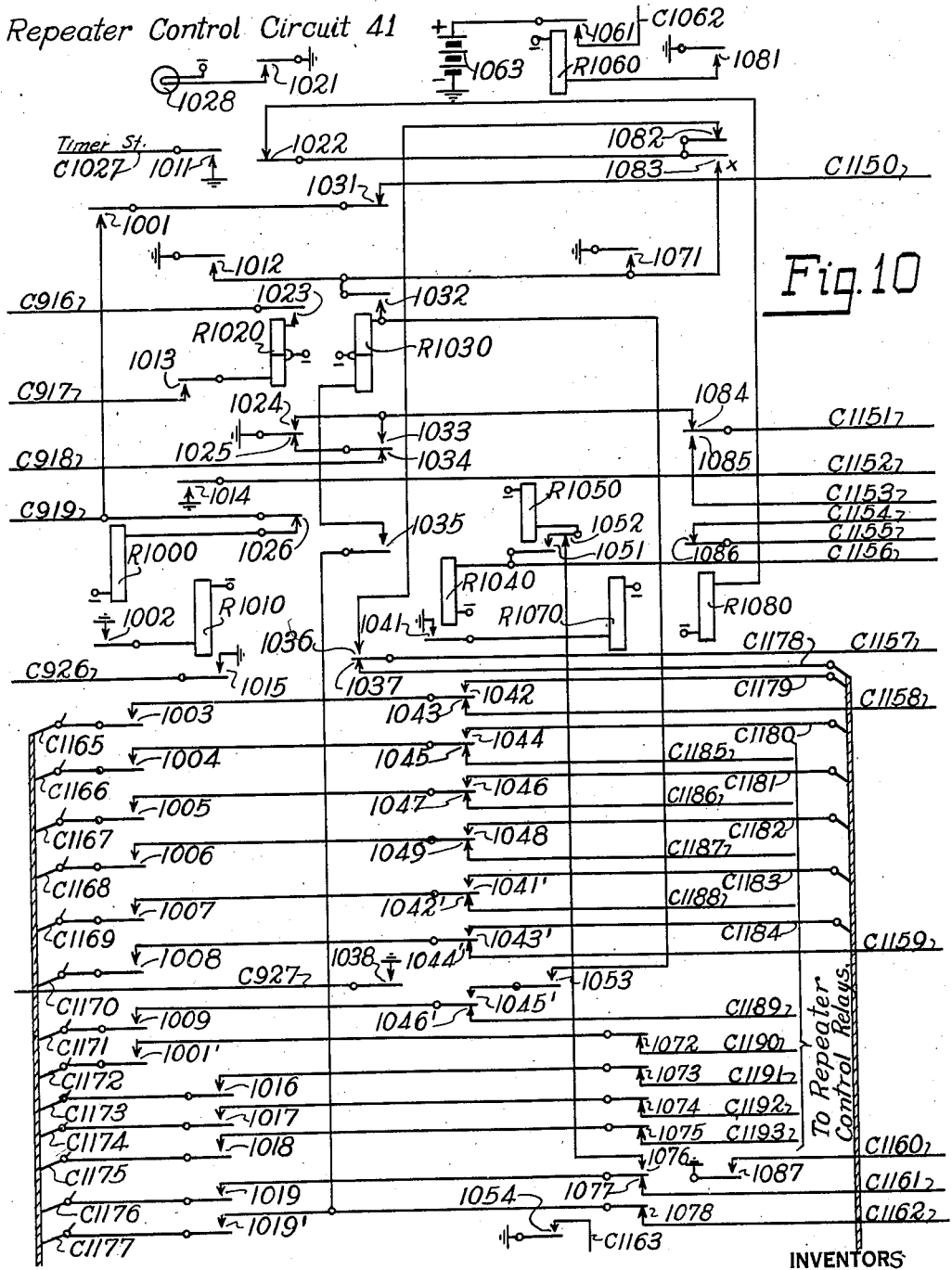
Figure 11:
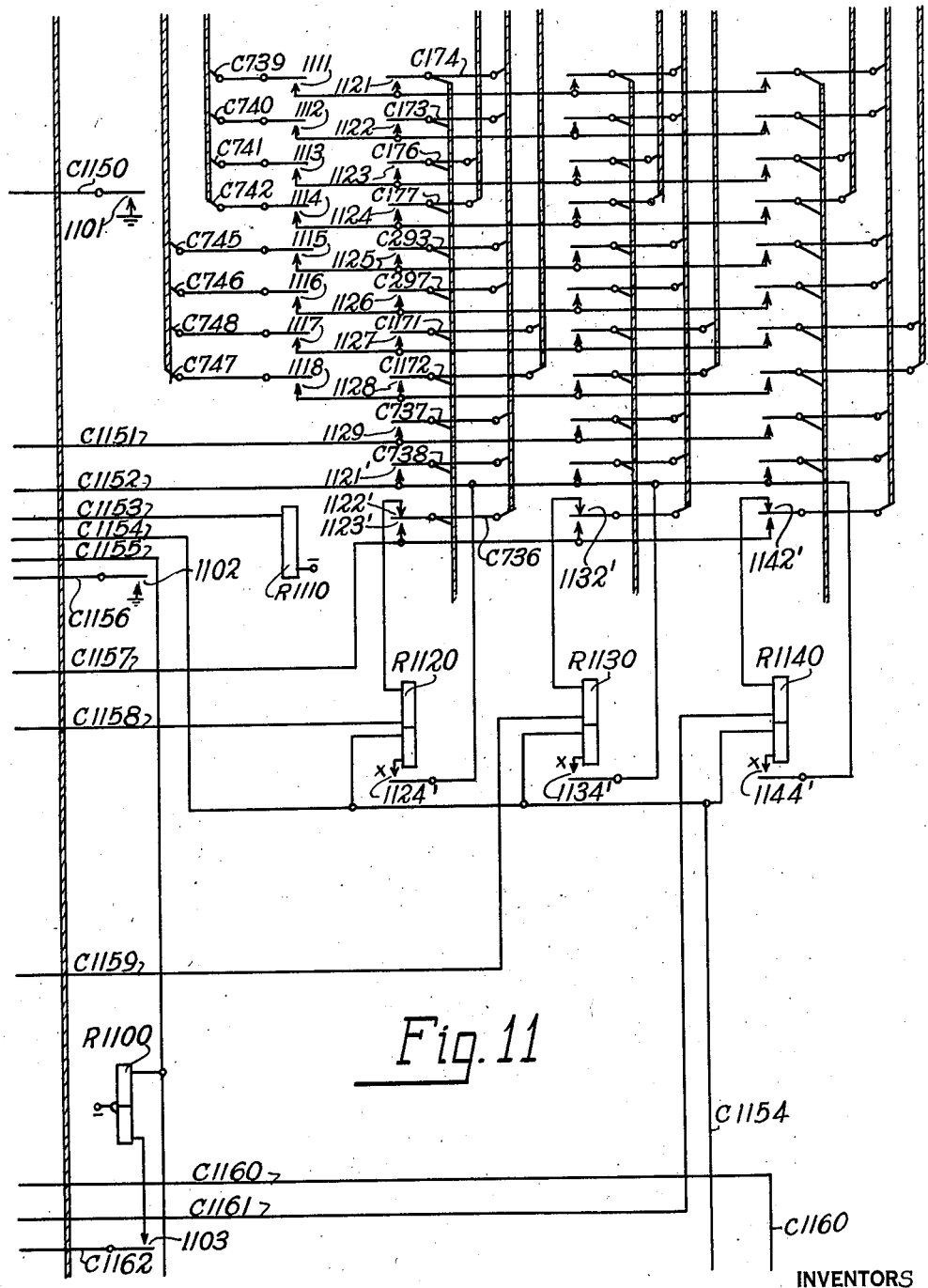

The novel features believed to be characteristic of the invention are set forth with particularity in the appended claims. The invention, both as to its organization and method of operation, together with further objects and advantages thereof, will best be understood by reference to the specification taken in connection with the accompanying drawings, in which Figures 1 to 14, inclusive, when combined in the manner shown in Fig. 15, illustrate an automatic telephone system having incorporated therein the features of the invention briefly outlined above. More specifically, Fig. 1 illustrates one of the lines terminating at the community exchange, the line circuit associated with this line, the finder switch included in one of the finder-connector links, and the distributor common to the several links; Figs. 2, 3, 4, 6, 7 and 8 illustrate the details of the connector switch which operates in conjunction with the finder switch illustrated in Fig. 1 to form one of the finder-connector links; and Fig. 5 illustrates the line equipment associated with one of the inter-office trunks to which the finder and connector switches of the exchange have access, and the line equipment associated with a second subscriber line. One of the voice current repeaters is illustrated in Fig. 7 of the drawings. The gain control network for this repeater is illustrated in Fig. 8 of the drawings. The control equipment associated with the voice current repeaters is illustrated in Figs. 9 to 14, inclusive, of the drawings. More specifically, in Fig. 9 there is shown a repeater allotter circuit, in Figs. 12 and 13 the link and line class finder apparatus is illustrated, and in Figs. 10, 11 and 14 the control equipment individual to the repeater shown in Fig. 7 is illustrated.

Referring now more particularly to the drawings, the system there illustrated comprises a C. A. X. at which are terminated a plurality of subscriber lines including the lines 9 and 11 and a group of ring-down trunks including the trunk 541 extending to a distant exchange 5 of the manual type. The subscriber lines terminating at the C. A. X. may be of the single party or multiparty type, the line 11 being illustrated as a single party line extending to the substation A and the line 9 being illustrated as a multiparty line serving both the substations B and C. Each subscriber line terminates in the exchange in a line circuit individual thereto. Thus, the line 11 extends to a line circuit 10 which conventionally comprises a line relay R130, a cut-off relay R129 and a slow-acting lockout relay R110. This line circuit also includes a line balancing network individual to the line 11 which comprises a resistor 27 connected in series with a condenser 23. The resistance and capacitance values of the two elements 27 and 23 are so proportioned that the frequency-impedance characteristic of the network approximates the frequency-impedance characteristic of the line 11 with the equipment of the substation A connected to this line, at all frequencies within the audio range. In a similar manner, the line 9 which serves the substations B and C is terminated in a line circuit 34 which includes a line relay R530, a cut-off relay R520, a slow-acting lockout relay R510 and a balancing network comprising the series connected resistor 547 and condenser 546. This network, like the corresponding network included in the line circuit 10, is characterized by a frequency-impedance characteristic which approximates the frequency-impedance characteristic of the line 9 with the substation equipment of either of the two substations B and C connected to this line, at all frequencies within the audio range. The trunk 541 interconnecting the C. A. X. with the exchange 5 terminates in the C. A. X. in a trunk circuit 35 which may be of conventional arrangement.

As indicated above, the automatic switching equipment provided in the C. A. X. comprises a plurality of finder-connector links of which only the link comprising the finder switch 20 and the connector switch 31 has been illustrated. For the purpose of assigning these links to the use of calling lines in a predetermined order, there is provided a link distributor 25 which may be of any desired construction and arrangement although preferably is of the type embodying a rotary switch for link selecting purposes. The connection and arrangement of the several finder-connector links provided in the C. A. X. are identical. Further, the finder switches may be of substantially conventional form. Accordingly, the finder switch 20 has, for the most part, been only schematically illustrated. It is noted, however, that this finder switch is equipped with an extra bank of contacts and an extra pair of wipers 165 and 166 which, in cooperation with the contact sets of the extra contact bank, are utilized for the purpose of associating the hybrid balancing networks individual to the various lines with the voice current repeater equipment. In order to facilitate the explanation of the operation of the finder switch 20, the switch-through relay R135 and the finder start relay R140, both of which are conventionally embodied in finder switches of all types, have been illustrated in the drawings. The control circuits for these relays have, however, been omitted in order to shorten the explanation of the operation of the system. The finder switches individual to the various links are arranged to control a repeater start relay R150 which is provided for the purpose of controlling certain of the repeater control circuits referred to more specifically hereinafter.

The connector switch 31, like the finder switch 20, is of the well-known Strowger type and is universal in character in that it includes provisions for automatic trunk selection, automatic ringing on selected trunks of the ring-down variety, selective code ringing of substations served by multiparty lines, revertive call signaling by the directory number dialing method, and testing a called line to determine whether the line is arranged for simplex or loop control of the link and line circuit equipment. More specifically, this connector switch comprises a Strowger switching mechanism, the wipers of which are first stepped vertically and are then rotated under the control of the vertical and rotary magnets 400 and 402, respectively, and are released under the control of a release magnet 405. This switching mechanism also comprises three sets of vertical off-normal springs 409', 411' and 215, tenth step cam springs 418 and two sets of normal post springs 403' and 404', the purpose of which is explained in the following portion of the specification. For the purpose of selecting the code of the ringing current which is to be transmitted over a line seized through the outlet contacts of the connector switch 31, there is provided in this switch a ringing code selector 33. This selector is in the form of a rotary switch of the well-known minor type which comprises two sets of contacts 860 and 862, two wipers 861 and 863, an operating magnet 865 for driving the wipers over the contacts of their associated contact sets, a release magnet 864 and a set of off-normal springs 866 which are operated into engagement when the two wipers 861 and 863 are moved from the positions illustrated in the drawings. In order to perform the circuit control operations necessary to the rendition of the services briefly outlined above, a plurality of relays are provided in the connector switch 31. More specifically, the relay equipment of this switch comprises a pulsing relay R250, a slow-acting hold relay R260, a pair of reverting call relays R240 and R430, a called simplex line identification relay R215, a link release relay R220, and a paystation tone repeating relay R230. This equipment further comprises a hold slave relay R310, a lock pulse relay R320, a calling simplex line identification relay R330, a slow-to-operate answer relay R340, a line relay R350, a pair of back-bridge relays R355 and R360, a pulse circuit transfer and supervisory relay R370, a slow-acting digit relay R380, a busy test relay R390, a digit responsive transfer relay R410, a ring cut-off relay R420, a second slow-acting digit relay R440, a ringing relay R450, a cut-through relay R460, an automatic trunk hunting or cut-in relay R470 of the two-step type, a ring pickup relay R480 and a slow-to-operate cut-through slave relay R490. There is further provided in the connector switch 31 a group of auxiliary relays R700, R710 and R720, illustrated in Fig. 7 of the drawings, which function to control the inclusion and exclusion of an assigned voice current repeater in a communication channel set up by way of this switch. More specifically, the link circuit is so arranged that an assigned voice current repeater may be substituted for the repeating coil 600 in a communication channel established by way of the link. The actual cut-in of the assigned repeater is under the control of a cut-in relay R630 which, in turn, is arranged to be controlled by the ring cut-off relay R420 of the connector switch and certain of the relays embodied in the control circuit associated with the assigned repeater.

In the system arrangement illustrated provisions are made for using any one of five voice current repeaters in conjunction with any one of twelve finder-connector links. Each of these repeaters has individually associated therewith a repeater control circuit and a gain control network. Thus, the repeater 45 is arranged to be controlled by a repeater control circuit 41 which includes a gain control selector 44 for controlling the setting of a gain control network 32 which is provided to determine the gain of the amplifiers in the repeater 45. More specifically, the repeater 45 comprises an east-west amplifier 46, a west-east amplifier 49, and two terminal hybrid systems 47 and 48 which respectively correspond to the calling and called ends of an established connection. The two amplifiers 46 and 49 are of the well-known thermionic type, and the connection and arrangement of these amplifiers with the terminal hybrid systems 47 and 48 and with the gain control circuit 32 may be of any desired type well known in the art. Although not illustrated in the drawings, the repeater 45 is preferably equipped with channel blocking and unblocking control means of the thermionic or loss type such that when the east-west channel amplifier is in use, the west-east channel amplifier 49 is blocked against operation, and vice versa. The gain control circuit 32 is divided into two sections 32a and 32b of identical circuit arrangement which are respectively included in the signal current paths connecting the output circuits of the amplifiers 46 and 49 with the hybrid systems 47 and 48. Each of these sections is of the shunt-series resistance type, the shunt and series resistances included in the respective associated amplifier output paths being controlled by the setting of the relays R810, R820, R830, R840 and R850.

The control circuit 41 individual to the repeater 45 comprises a group of twelve connect relays including the relays R1120, R1130 and R1140, which individually correspond to the twelve finder-connector links, and a group of auxiliary control relays. This latter group of relays includes a start relay R1000, a start slave relay R1010, a control circuit release relay R1020, a finder stop and circuit transfer relay R1030, an anode voltage control relay R1060, and a plurality of circuit transfer relays R1040, R1050, R1070, R1080 and R1100. The auxiliary relay equipment of the circuit 41 also includes a cut-in relay R1110 and the previously mentioned gain control selector relays 44. The relays of the latter group, namely the relays R1400, R1410, R1420, R1430, R1440 and R1450 individually correspond to the six classes of lines and, when energized alone in various combinations, function to determine the setting of the relays in the gain control circuit 32. The sixth relay of the gain control selector group 44, namely, the relay R1450, when operated, indicates that the repeater 45 is not to be included in a communication channel set up by way of the finder-connector link to which it is assigned.

As indicated above, the various repeaters and their associated control circuits are allotted to the use of links assigned to the use of calling lines through operation of the repeater allotter circuit 40. This circuit comprises a start relay R900 and a plurality of slow-to-operate allotter relays R910, R920, R930, R940 and R950 which individually correspond to the five repeaters available. This circuit also includes a repeater start relay R990, a reset relay R960 and an overflow relay R970 which functions to control the all-busy meter 992 and associated signaling lamp 994 in a manner such that these elements are energized when all of the repeaters are busy. The equipment common to the repeaters and their associated control circuits also includes a time pulse relay R980 which functions automatically to initiate the release of an assigned repeater control circuit in the event the circuit is defective.

Figure 12:
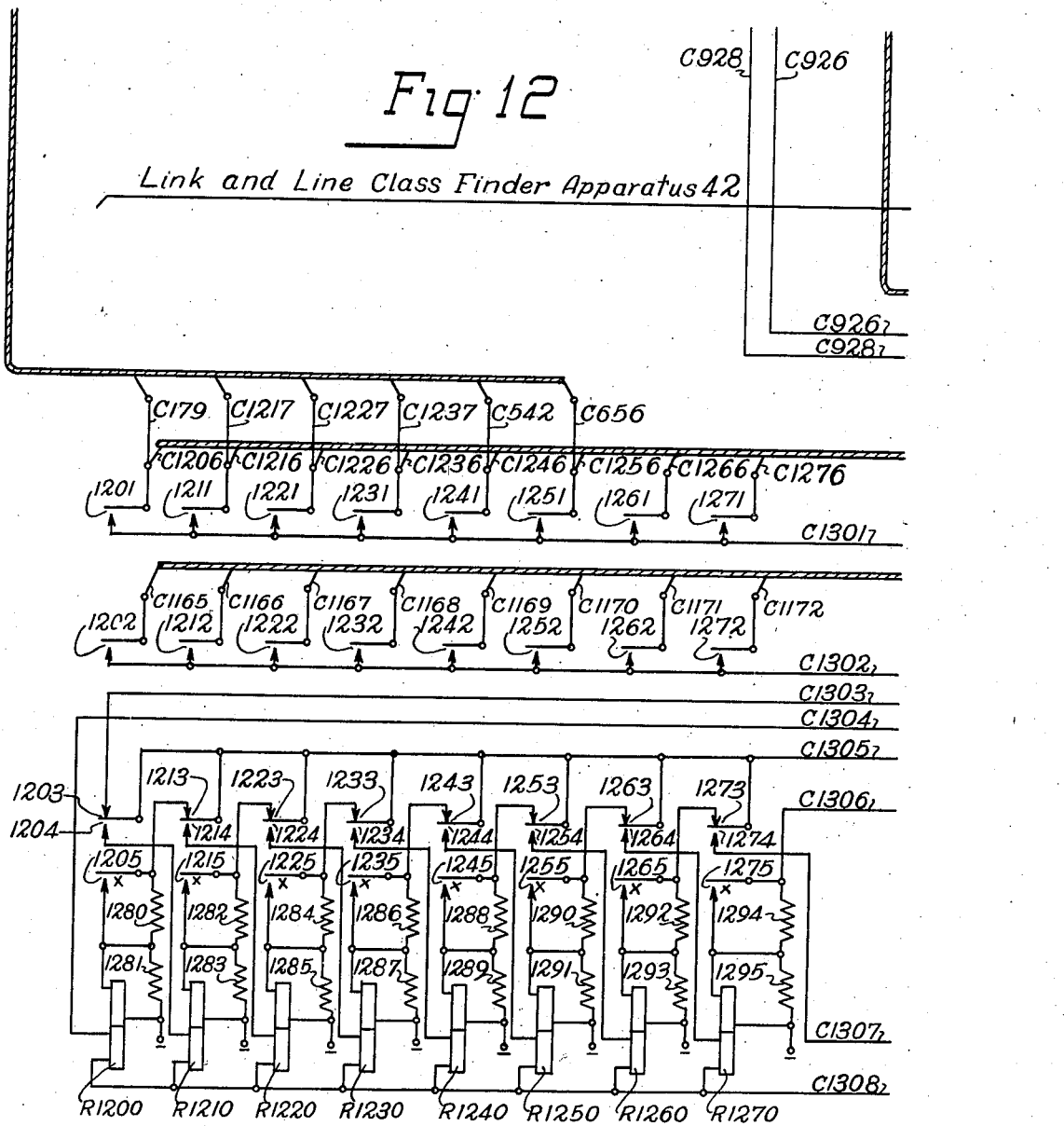
Figure 13:
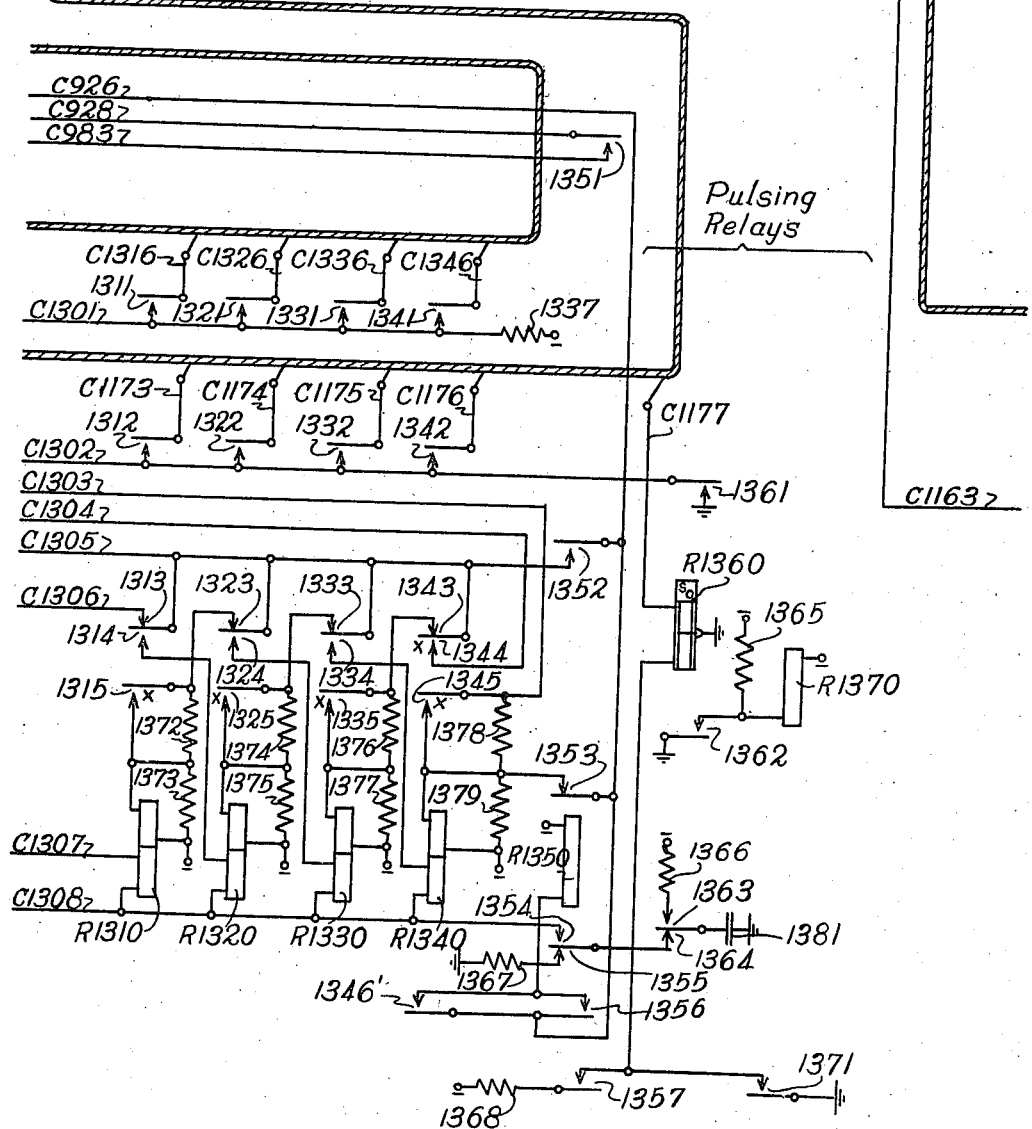

The equipment common to the repeaters and their respective associated control circuits also includes the link and line class finder apparatus 42, illustrated in Figs. 12 and 13 of the drawings. As indicated above, this apparatus performs two functions, namely that of finding the link with which an assigned repeater is to be associated and that of determining the classification of the calling and called lines of the connection. Briefly described, this apparatus comprises twelve counting or test relays R1200 to R1270, inclusive, and R1310 to R1340, inclusive, a start relay R1350 and a pair of pulse control relays R1360 and R1370, the first of which is of the slow-acting type.

In addition to the equipment briefly described above, there is provided in the C. A. X. the usual auxiliary equipment comprising ringing voltage and tone voltage generating equipment, a ringing code interrupter, and suitable supervisory apparatus. This common equipment also includes a timing device 30 which is provided for the purpose of automatically releasing links seized over lines having permanent calling conditions thereon.

The operation of the system will best be understood by considering specific calls initiated on the lines terminating at the C. A. X. and pointing out the differences in the operation of the illustrated finder-connector link and the associated repeater equipment incident to the handling of the calls of different types.

ROUTING A CONNECTION TO THE
CONNECTOR SWITCH 31

Assuming that a call is initiated at the substation A, for example, the line relay R130 is energized when the calling subscriber removes the receiver provided at this substation from its supporting hook or cradle. The line 11 extending to the substation A is illustrated as being provided for simplex control of the link and line circuit equipment and, accordingly, the operating circuit for the relay R130 may be traced as extending from ground through the hook switch provided at the substation A, over the two line conductors C101 and C102, through the contacts 121 and 122, and the upper and lower windings of R130 to battery. When thus energized, the relay R130 operates to complete, at its contacts 131, a path including the contacts 111 for impressing negative battery potential upon the marking lead C104, thereby to mark the line 11 as a calling line in the bank contacts of the various finder switches and to prepare a circuit for energizing the cut-off relay R120 when the finder switch of an assigned link operates to switch the line 11. At its contacts 133, the relay R130 opens a point in an alternative circuit for energizing the cut-off relay R120. At its contacts 132, the relay R130 completes an obvious path for impressing ground potential upon the private conductor C107, thereby to mark the line 11 as busy in the bank contacts of the connector switches having access thereto. At its contacts 134, the relay R130 completes a path including the contacts 112 for impressing ground potential upon the distributor start lead C22.

When the lead C22 is connected to ground, the control equipment of the distributor 25 operates in a well-known manner to complete circuits for initiating the operation of the finder switch of a previously selected link. Assuming that the finder-connector link illustrated is assigned to the use of the line 11, the control equipment of the distributor 25, upon operating, completes a circuit for energizing the finder start relay R140, and a circuit for energizing the vertical magnet of the Strowger switching mechanism included in the finder switch 20. This vertical magnet, operating in conjunction with the pulsing relay conventionally embodied in the distributor 25, functions to elevate the wipers 161 to 166 of the finder switch 20 to a position opposite the level of bank contacts at which the conductors of the line 11 are terminated. This level is marked through the application of ground potential to the distributor start conductor C22, so that, when the wipers of the finder switch 20 are elevated to a position opposite this contact level, the vertical movement thereof is arrested and a circuit transfer operation is effected, whereby the pulsing relay of the distributor 25 operates to transmit current pulses to the rotary magnet of the Strowger switching mechanism. This magnet functions to rotate the wipers 161 to 166, inclusive, until they are operated into engagement with the contacts terminating the conductors of the line 11. At this time, a circuit is completed for energizing the upper or operating winding of the finder switch-through relay R135 in series with the winding of the cut-off relay R120, this circuit extending from ground through the operated contacts of certain of the relays embodied in the distributor 25, the upper or operating winding of R135, the wiper 164, the marking lead C104, the contacts 131 and 111, and the winding of R120 to battery. When its upper winding is energized over this circuit, the finder switch-through relay R135 operates to close its contacts 136, 137, 138 and 139, thus extending the calling line to the connector portion of the link. In operating, the relay R135 also completes a locking circuit for itself, which circuit includes its lower or holding winding and the winding of the rotary magnet of the Strowger switching mechanism embodied in the finder switch 20. At its contacts 139, the relay R135 completes a path including the grounded control conductor C171 for impressing ground potential directly upon the marking lead C104, this path being prepared in response to the operation of the line and hold relays embodied in the connector switch 31, in the manner explained hereinafter. When the lead C104 is grounded, the cut-off relay R120 is energized over an obvious circuit. In operating, the relay R120 first locks to the grounded lead C104 through its preliminary make contacts 123. After this locking circuit is completed, the relay R120 opens its contacts 121 and 122 to disconnect the windings of the line relay R130 from the conductors C101 and C102 of the line 11, thereby to deenergize the line relay and to clear the line 11 of the impedance represented by the windings of this relay. At its contacts 125, the relay R120 opens a point in the resistance path normally short-circuiting its own winding. At its contacts 124, the relay R120 completes a path for impressing paystation tone voltage upon the control conductor C171 of the link circuit in the event the line 11 is of the paystation type. In this regard it will be understood that the paystation tone transmission circuit comprising the condenser 124' and the contacts 124 is only provided in the line circuits terminating lines of the paystation variety. At its contacts 127, the relay R120 opens a point in the path provided for impressing ground potential upon the permanent supervisory lead C181. At its contacts 126, the relay R120 completes a circuit for energizing the slow-acting line lockout relay R110.

The relay R130, upon restoring in response to the operation of the cut-off relay R120, opens its contacts 131 to interrupt the initially completed operating circuit for the cut-off relay R120, opens its contacts 132, and closes its contacts 133 to complete an alternative path for impressing ground potential upon the private conductor C107 of the line 11. This alternative path extends from the grounded control conductor C171 by way of the contacts 139, the wiper 164, C104 and the contacts 123 and 133 to the private conductor C107. At its contacts 134, the relay R130 opens a point in the prepared locking circuit for the lockout relay R110 and disconnects the distributor start lead C22 from ground. When this lead is disconnected from ground, the distributor 25 operates in the usual manner to select another idle link for use in handling the call next initiated on one of the lines terminating at the C. A. X.

The lockout relay R110, upon operating, closes its contacts 113 to prepare a locking circuit for itself, and closes its contacts 114 to prepare the above-mentioned path for impressing ground potential upon the permanent supervisory lead C181. At its contacts 112, the relay R110 opens another point in the above-traced path for impressing ground potential upon the distributor start lead C22. At its contacts 111, the relay R110 opens another point in the above-traced line marking path and the initially completed circuit for energizing the cut-off relay R120. At its contacts 116, the relay R110 disconnects the extra control lead C103 from ground. At its contacts 115, the relay R110 prepares a path for energizing one of the line classification relays included in the gain selector of the repeater control circuit associated with an assigned repeater, all in the manner explained more fully hereinafter.

When the finder start relay R140 operates in the manner pointed out above, it completes a circuit for energizing the relays R250 and R350 in series, this circuit extending from ground by way of the winding of R350, C172, the contacts 141, C174, the contacts 636, the repeating coil winding 602, C289, the contacts 246, C295, the contacts 345, C294 and the winding of R250 to battery. When thus energized, the relays R250 and R350 both operate. Upon operating, the relay R250 completes a circuit for energizing the lock-pulse relay R320, this circuit extending from ground by way of the contacts 313, C277, the contacts 253, C278 and the winding of R320 to battery. At its contacts 251, the relay R250 opens a point in a priming circuit for itself. At its contacts 252, the relay R250 prepares a holding circuit for the slow-acting hold relay R260.

The relay R320, upon operating, completes the prepared operating circuit for the hold relay R260, this circuit extending from ground by way of the contacts 224, C275, the contacts 321, C274 and the winding of R260 to battery. At its contacts 322, the relay R320 opens a point in the common portion of the circuits over which current pulses are transmitted to the vertical and rotary magnets 400 and 405, the relay R380 and the operating magnet 865 of the ringing code selector switch 33. At its contacts 323, the relay R320 completes a locking circuit for itself, this circuit extending from ground by way of the resistor 326, the contacts 323, C277, the contacts 253, C278 and the winding of R320 to battery. At its contacts 324, the relay R320 prepares a circuit for energizing the transfer and supervisory relay R370. At its contacts 325, the relay R320 opens a point in one of the circuits for energizing the reverting call relay R430.

The hold relay R260, upon operating, completes, at its contacts 264, the above-mentioned path for impressing ground potential upon the control conductor C171, this path including the conductor C287 and the contacts 358. At its contacts 265, the relay R260 opens a point in the operating circuit for the relay R240. At its contacts 263, the relay R260 further prepares the above-mentioned priming circuit for the pulsing relay R250. At its contacts 261, the relay R260 prepares the operating circuit for the link release relay R220. At its contacts 262, the relay R260 prepares a test circuit, including the upper winding of the cut-in relay R460, for energizing this relay in the event the line subsequently selected is idle.

When ground potential is impressed upon the conductor C287 by the hold relay R260, the hold slave relay R310 is energized over a circuit including this conductor, the contacts 245 and the conductor C288. Upon operating, the relay R310 closes its contacts 312 to prepare the above-mentioned circuit for transmitting repeated dial pulses to the three magnets 400, 402 and 865, and to the digit transfer relay R380. At the contacts 312, the relay R310 also completes a multiple circuit for energizing the hold relay R260, this circuit extending from ground by way of the contacts 224, C275, the contacts 312, C276, the contacts 252 and the winding of R260 to battery. At its contacts 316, the relay R310 prepares the incomplete operating circuit for the slow-to-release reverting call relay R430. At its contacts 317, the relay R310 opens a point in the common portion of the operating circuits for the two release magnets 405 and 864. At its contacts 315, the relay R310 completes an obvious path for impressing ground potential upon the release conductor C286. At its contacts 313, the relay R310 opens the above-traced operating circuit for the lock-pulse relay R320. At its contacts 311, the relay R310 prepares the operating circuit for the slow-to-operate control relay R340. At its contacts 314, the relay R310 prepares the operating circuit for the reverting call relay R240.

When ground potential is impressed upon the release conductor C286 by the hold slave relay R310, the lower winding of the called simplex relay R210 is energized over a circuit including this conductor and the resistor 216, and the lower winding of the calling simplex relay R330 is energized over a circuit including this conductor and the resistor 332'. These two relays, when thus energized over circuits including the resistors 216 and 332', respectively, do not operate but are rendered exceedingly fast to operate in the event the upper windings thereof are subsequently energized.

When ground potential is impressed upon the release conductor C286 by the hold slave relay R310, a circuit including this conductor and the off-normal springs 411' is completed for energizing the transfer relay R410. Upon operating, the relay R410 closes its contacts 416 to prepare a locking circuit for itself, and closes its contacts 412 to prepare the circuit for transmitting repeated dial pulses to the vertical magnet 400. At its contacts 411, the relay R410 opens a point in the common portion of the circuits for transmitting repeated dial pulses to the rotary magnet 402 and the operating magnet 865 of the ringing code selector switch 33. At its contacts 415, the relay R410 opens a point in the operating circuit for the relay R440. At its contacts 414, the relay R410 opens a point in the circuit for energizing the rotary magnet 402 during a trunk-hunting operation on the part of the connector switch 31. At its contacts 413, the relay R410 prepares one of the operating circuits for the ringing relay R450. At its contacts 417, the relay R410 completes a path for impressing dial tone voltage upon the calling end of the connection, this path extending from one terminal of the dial tone current source, not shown, by way of the contacts 417 and 448, C555, and the condenser 555' to the talking conductor C297. From this point the dial tone current is transmitted out over the calling line and over a return circuit which terminates at the opposite terminal of the dial tone current source in the usual manner. The dial tone signal current traversing the calling line, when reproduced by the receiver provided at the calling substation A, indicates to the calling subscriber that the dialing operation may be started.

As indicated above, the relay R350 is energized in series with the pulsing relay R250 when the finder start relay R140 operates. In operating, the relay R350 completes a circuit for energizing the upper winding of the calling simplex relay R330 in the event the calling line is of the simplex type. In the present case, wherein the line 11 is arranged for simplex control of the line and link circuits, the upper winding of the relay R330 is energized over a circuit which extends from ground by way of the contacts 116, the extra control conductor C103, the wiper 163, the contacts 138, C175, the vertical off-normal springs 215, C280, the contacts 331, the upper winding of R330, the resistor 331' and the contacts 351 to battery. When this circuit is completed, the relay R330 closes only the preliminary make contacts 332 controlled thereby. Thereafter, and when the hold slave relay R310 operates to impress ground potential upon the release conductor C286, the lower winding of the calling simplex relay R330 is directly energized over a circuit including the contacts 332. The relay R330 now completes its operation. At its contacts 331, the relay R330 interrupts its operating circuit as traced above. At its contacts 334, the relay R330 disconnects the positive talking conductor C173 of the link circuit from the grounded resistor 417'. At its contacts 333, the relay R330 completes a simplex pulsing circuit which extends from the substation A through the winding of the pulsing relay R250. One branch of this circuit may be traced as extending from ground by way of the springs of the hook switch at the substation A, C101, the wiper 161, the contacts 136, C173, the contacts 632, the repeating coil winding 601, C650, the contacts 247, C296, the contacts 347 and 333, C294 and the winding of R250 to battery. The other branch of the simplex pulsing circuit extends from ground by way of the springs of the hook switch at the substation A, C102, the wiper 162, the contacts 137, C174, the contacts 636, the repeating coil winding 602, C289, the contacts 246, C295, the contacts 345, C294 and the winding of R250 to battery. The completion of this simplex circuit reduces by approximately 50 percent the resistance of the circuit over which which dial pulses are transmitted to the pulsing relay R250.

In the event the calling line is arranged for loop circuit control of the line relay embodied in its terminating line circuit, the line circuit arrangement illustrated in Fig. 5 of the drawings will be used. It will be noted that in this line circuit the lockout relay R510 is not equipped with a set of break contacts through which ground potential is normally impressed upon the extra control conductor C535. Accordingly, if the finder switch 20, for example, operates to seize the line 9 through the line circuit 34, the circuit for energizing the calling simplex relay R330 is not completed when the line relay R350 operates. In such case, the pulsing relay R250 is energized over a loop circuit which may be traced as extending from ground by way of the resistor 417', the contacts 428', C552, the contacts 334 and 347, C296, the contacts 247, C550, the repeating coil winding 601, the contacts 632, C173, the contacts 136, the wiper 161, C538, the bridge across the conductors of the line 9 at the calling substation associated with this line, C537, the wiper 162, the contacts 137, C174, the contacts 636, the repeating coil winding 602, C299, the contacts 246, C295, the contacts 345, C294 and the winding of R250 to battery. From the above explanation it will be apparent that the circuits over which dial pulses may be transmitted to the pulsing relay R250 are different, depending upon the character of different calling lines.

As indicated by the preceding explanation, the pulsing relay R250 follows the pulses transmitted thereto through operation of the calling device provided at the calling substation A. Each time this relay restores during the dialing of the first digit, it functions to cause the transmission of a current pulse to the relay R380 and the vertical magnet 400. More specifically, when the pulsing relay R250 restores at the beginning of the open-circuit period of the first impulse, it opens its contacts 253 to interrupt the above-traced locking circuit for the lock-pulse relay R320. At its contacts 252, the relay R250 opens one of the completed circuits for energizing the hold relay R260. At its contacts 251, the relay R250 completes the above-mentioned priming circuit for itself, this circuit extending from ground by way of the contacts 224, C275, the contacts 312, C276, the contacts 251 and 263, C291, the resistor 318, C551, the contacts 426', C292, the repeating coil winding 602, C289, the contacts 246, C295, the contacts 345, C294 and the winding of R250 to battery. When this circuit is completed, the relay R250 is rendered exceedingly fast-to-operate when the calling simplex or loop circuit is subsequently recompleted at the end of the open-circuit period of the first impulse. The relay R320, upon restoring, opens its contacts 323 further to interrupt its locking circuit; closes its contacts 325 further to prepare the operating circuit for the reverting call relay R430; and opens its contacts 321 to interrupt the operating circuit for the hold relay R260. At its contacts 322, the relay R320 completes the above-mentioned circuit for transmitting current pulses to the vertical magnet 400 and the relay R380 in parallel, this circuit extending from ground by way of the contacts 224, C275 and the contacts 312, 322 and 394 to the conductor C403 where it divides, one branch extending through the contacts 392 and the winding of R380 to battery, and the other branch extending through the contacts 412 and the winding of the magnet 400 to battery. When thus energized, the relay R380 operates to open, at its contacts 383, a point in the operating circuit for the busy test relay R390. At its contacts 384, the relay R380 completes a path including the conductors C289, C551 and C292, and the contacts 426' for short-circuiting the repeating coil winding 602, thereby to exclude this winding from the circuit over which dial pulses are transmitted to the pulsing relay R250. At its contacts 381, the relay R380 opens a point in one of the incomplete circuits for energizing the relay R440. At its contacts 382, the relay R380 completes a locking circuit for the transfer relay R410, this circuit extending from ground by way of the contacts 382, C439, the contacts 416 and the winding of R410 to battery. At this point it is noted that due to the slow-to-release characteristics thereof, the hold relay R260 and the digit relay R380 remain operated throughout the impulses of each digit dialed at the calling substation.

When the vertical magnet 400 is energized over the above-traced pulsing circuit, it operates to move the wipers of the connector switch 31 one step in the vertical direction, or to a position opposite the first level of bank contacts. In response to this operation, the vertical off-normal springs 411' are disengaged to interrupt the previously traced operating circuit for the transfer relay R410, the off-normal springs 215 are disengaged further to open the previously traced operating circuit for the calling simplex relay R330, and the vertical off-normal springs 499' are operated into engagement to prepare a circuit for energizing the release magnet 405.

The vertical magnet 400, upon operating, also prepares, at its contacts 401, an alternative circuit for energizing the lock-pulse relay R320. This circuit is completed when the pulsing relay R250 operates at the end of the open-circuit period of the first impulse. More specifically, this circuit extends from ground by way of the contacts 401, C277, the contacts 253, C278 and the winding of R320 to battery. Upon operating, the relay R320 closes its locking circuit and performs the other circuit control operations previously described, among which is that of opening its contacts 322 to interrupt the above-traced circuit for energizing the relay R380 and the vertical magnet 400 in parallel. The magnet 400, in releasing, opens its contacts 401 to interrupt the alternative operating circuit for the lock-pulse relay R320.

At the beginning of the open-circuit period of the second impulse of the first digit, the pulsing relay R250 again restores to initiate the sequence of operations just described. From this description it will be apparent that a current pulse is delivered to the vertical magnet 400 each time the pulsing relay R250 releases. Accordingly, at the end of the first digit, the wipers of the connector switch 31 are left standing in a position opposite the contact level which includes the contact set at which the conductors of the desired line are terminated. It will also be apparent that at the end of the digit the pulsing relay R250 and the lock-pulse relay R320 are energized, while the vertical magnet 400 and the digit transfer relay R380 are deenergized. Accordingly, the relay R380 restores shortly following the end of the first digit to interrupt the holding circuit for the transfer relay R410 and to open the path short-circuiting the repeating coil winding 602. In releasing, the relay R410 opens its contacts 417 to interrupt the previously traced path for impressing dial tone signal voltage upon the calling end of the connection, thereby to terminate the dial tone signal being produced by the receiver provided at the calling substation A. At its contacts 412, the relay R410 opens the above-traced circuit for transmitting current pulses to the vertical magnet 400. At its contacts 416, the relay R410 opens a further point in its locking circuit. At its contacts 415, the relay R410 prepares the operating circuit for the second digit relay R440. At its contacts 413, the relay R410 opens a point in one of the operating circuits for the ringing relay R450. At its contacts 414, the relay R410 prepares the circuit over which current pulses are delivered to the rotary magnet 402 during a trunk-hunting operation. At its contacts 411, the relay R410 prepares the circuit for transmitting repeated dial pulses to the rotary magnet 402.

The last-mentioned circuit is completed at the beginning of the open-circuit period of the first impulse of the second digit dialed at the calling substation, this circuit extending from ground by way of the contacts 224, C275, the contacts 312, 322 and 394, C403, the contacts 411 and 461, C404, the contacts 371, C436 and the winding of the magnet 402 to battery. It will be observed that a branch of this circuit extends through the contacts 392 and the winding of the digit relay R380. The relay R380 is thus energized at the beginning of the first impulse of the second digit, and remains operated until shortly after the digit is ended. Upon operating, the relay R380 completes the above-mentioned circuit for energizing the second digit relay R440, this circuit extending from ground by way of the contacts 382, C439, the contacts 415, 424 and 466, and the winding of R440 to battery. The relay R440, upon operating, opens its contacts 448 further to interrupt the above-traced path for impressing dial tone signal voltage upon the calling end of the connection, and to open a point in the path over which busy tone signal voltage may be impressed upon the calling end of the connection. At its contacts 443, the relay R440 completes a path for short-circuiting the winding of the transfer and supervisory relay R370, this path extending by way of the grounded release conductor C286, but winding of R370, C477, the contacts 428, C459, the contacts 378, C458, the contacts 443, 466, 424 and 415, C439 and the contacts 382 back to ground. At its contacts 445, the relay R440 opens a point in one of the operating circuits for the cut-through relay R460. At its contacts 444, the relay R440 prepares the circuit for energizing the busy test relay R390. At its contacts 446, the relay R440 opens a point in the locking circuit for the busy test relay R390. At its contacts 441 and 442, the relay R440 performs certain additional circuit control operations, described with particularity hereinafter with reference to the automatic trunk-hunting operations of the connector switch 31. At its contacts 447, the relay R440 prepares an alternative circuit for energizing the lock-pulse relay R320.

The rotary magnet 402, upon operating, functions to step the wipers of the connector switch 31 into engagement with the contacts comprising the first contact set of the selected level. At its contacts 404, the magnet 402 opens a point in the operating circuit for the ringing relay R450. At its contacts 403, the relay R400 further prepares the above-mentioned alternative circuit for energizing the lock-pulse relay R320. This latter circuit is completed at the end of the open-circuit period of the first impulse of the second digit, and extends by way of the grounded control conductor C287, the contacts 447 and 403, C277, the contacts 253, C278 and the winding of R320 to battery. When thus energized, the relay R320 reoperates to interrupt, at its contacts 322, the circuit for energizing the relay R380 in parallel with the rotary magnet 402, and to perform the other circuit control operations previously described. During each succeeding impulse of the second digit, the two relays R250 and R320 interact with the rotary magnet 402, in the exact manner described above, it being noted that the three relays R260, R380 and R440 remain operated throughout the digit, due to the slow-to-release characteristic thereof. Each time the rotary magnet 402 is energized, it operates to step the connector switch wipers one step in the rotary direction. Accordingly, at the end of the digit, these wipers are left standing in engagement with the contacts terminating the conductors of the desired line. In this regard it may be assumed that the substation B, for example, served by the line 9, is the substation desired by the calling subscriber at the substation A.

*Selecting the ringing code*

The third digit dialed at the calling substation is utilized for the purpose of controlling the ringing code selector 33 to select the ringing code assigned to the desired substation. Thus, shortly following the end of the second digit, the relay R380 restores to open, at its contacts 382, the above-traced path short-circuiting the winding of the transfer relay R370. When this path is interrupted, the relay R370 is energized in series with the relay R440 over a circuit extending by way of the grounded release conductor C286, the winding of R370, C477, the contacts 428, C459, the contacts 378, C458, the contacts 443 and the winding of R440 to battery. When thus energized, the relay R370 operates and completes a locking circuit for itself which extends by way of the grounded release conductor C286, the winding of R370, C477, the contacts 428, C459, the contacts 377 and the resistor 352 to battery. After this locking circuit is completed, the relay R370 opens its contacts 378 to interrupt the circuit for energizing the relay R440, causing the latter relay to restore. At its contacts 373 to 376, inclusive, the relay R370 reversely connects the link talking conductors C553 and C556 to the link talking conductors C293 and C297. At its contacts 371, the relay R370 opens a point in the above-traced circuit for transmitting repeated dial pulses to the rotary magnet 402. At its contacts 372, the relay R370 prepares the previously mentioned circuit for transmitting repeated dial pulses to the operating magnet 865 of the ringing code selector 333. Following the operation of the relay R370 and the release of the relay R440, the control equipment of the connector switch 31 is conditioned to repeat the impulses of the third digit dialed at the calling substation to the operating magnet 865 of the ringing code selector 33.

More specifically, when the pulsing relay R250 restores at the beginning of the open-circuit period of the first impulse of the third digit, the magnet 865 is energized in parallel with the relay R380. The circuit for energizing this magnet extends from ground by way of the contacts 224, C275, the contacts 312, 322 and 394, C403, the contacts 411 and 461, C404, the contacts 372, C406, the contacts 463, C868 and the winding of the magnet 865 to battery. Concurrently with the completion of this circuit, the relay R380 is energized and operates to recomplete the operating circuit for the relay R440. Upon operating, the magnet 865 advances its wipers 861 and 863 into engagement with their respective associated first contacts, and prepares, at its contacts 865′, an alternative circuit for energizing the lock-pulse relay R320. This circuit is subsequently completed when the relay R250 reoperates at the end of the open-circuit period of the impulse, and extends from ground by way of the control conductor C287, the contacts 447, C866', the contacts 865', C277, the contacts 253, C278 and the winding of R320 to battery. During each succeeding impulse of the third digit dialed at the calling substation, the two relays R250 and R320 interact with the operating magnet 865 of the code selector switch 33 in the exact manner just described. Accordingly, at the of the third digit, the wipers of the ringing code selector 33 are left standing in engagement with the contacts corresponding to the code assigned to the desired substation B. For example, if the fourth ringing code is assigned to the substation D, the third digit dialed at the calling substation will comprises four impulses so that at the end of the digit the wipers 861 and 863 are positioned in engagement with their respective associated fourth contacts. When the indicated wipers are moved off normal, the off-normal springs 866 are moved into engagement and a path is completed for short-circuiting the lower winding of the paystation tone repeating relay R230. This path extends from the lower terminal of R230 by way of C171, the wiper 863 and the fourth contact of the associated contact multiple, and C287 to the upper terminal of R230. At the off-normal springs 866, a circuit including the resistor 867 and the conductor C871 is completed for energizing the two-step cut-in relay R470. When this circuit is completed, the relay R470 only partially operates to close its contacts 472 and 476. At the contacts 472, a point is prepared in the common portion of the test circuits over which the busy test and cut-through relays R390 and R460, respectively, are selectively energized, depending upon the condition of the called line 9. At the contacts 476, a circuit is prepared for energizing the release magnet 864 of the ringing code selector 33.

*Busy test*

At the end of the third digit, the selected called line 9 is tested to determine the idle or busy condition thereof. In this regard it will be noted that if the line 9 is occupied with a call, the cut-off relay R520 thereof is operated so that ground potential is impressed upon the private conductor C545. On the other hand, if the line 9 is idle, negative battery potential is impressed upon this private conductor over a path including the winding of the cut-off relay R520 and the contacts 533 of the restored line relay R530.

The line busy test is performed immediately following the end of the third digit and in response to the release of the slow-acting digit relay R380. More specifically, when the relay R380 restores, it completes the prepared busy test circuit, this circuit extending from the private conductor C545 by way of the private wiper of the connector switch, the contacts 472 and 444, C486, the winding of R390 and the contacts 383 to battery. In the event the called line 9 is busy, such that the private conductor C545 is connected to ground, the busy test relay R390 is energized in the circuit just traced, and operates. On the other hand, if the called line 9 is idle, such that the negative battery potential is impressed upon the private conductor C545, the winding of the busy test relay R390 is short-circuited in series with the winding of the cut-off relay R520, and hence does not operate. Assuming that the line 9 is busy, the busy test relay R390 closes its contacts 397 to prepare a locking circuit for itself. At its contacts 391, the relay R390 opens a point in the circuit for energizing the cut-through relay R460. At its contacts 398, the relay R390 further prepares the operating circuit for the reverting call relay R430. At its contacts 394, the relay R390 opens a point in the above-traced circuits for transmitting repeated dial pulses to the magnets 400, 402 and 865. At its contacts 393, the relay R390 prepares the previously mentioned automatic cut-in circuit for the rotary magnet 402. At its contacts 392, the relay R390 opens a point in the previously traced operating circuit for the relay R380. At its contacts 396, the relay R390 prepares the operating circuit for the reverting call relay R240. At its contacts 399, the relay R390 prepares a path for impressing busy tone signal voltage upon the calling end of the connection.

The relay R380, upon restoring, also opens, at its contacts 382, the operating circuit for the relay R440. Accordingly, shortly following the operation of the busy test relay R390, the relay R440 restores to complete the prepared holding circuit for the busy test relay R390, this holding circuit extending by way of the grounded conductor C287, the contacts 469, C488, the contacts 397, C487, the contacts 446, 486, the winding of R390 and the contacts 383 to battery. After this locking circuit is completed, the relay R440 opens its contacts 444 to interrupt the test circuit over which the busy test relay R390 is initially energized. At its contacts 445, the relay R440 prepares the incomplete operating circuit for the cut-through relay R460. At its contacts 448, the relay R440 completes the above-mentioned path for impressing busy tone signal voltage upon the calling end of the connection. This path may partially be traced as extending from one terminal of the busy tone current source, not shown, by way of the contacts 399, C554, the contacts 485 and 448, C555 and the condenser 555' to the link talking conductor C297. From this point the busy tone signal current is transmitted over the calling line to energize the receiver provided at the calling substation A. The reproduction of this current serves to inform the calling party that the desired line is busy. Following the release of the relay R440, no further operation of the apparatus occurs until the call is abandoned at the calling substation A. The manner in which the apparatus is released under the control of the calling subscriber is described in detail hereinafter.

*Ringing the called substation*

As indicated above, in the event the called line 9 is idle, the busy test relay R390 remains in its restored position. Shortly after the end of the third digit, and when the two relays R380 and R440 sequentially restore, the operating circuit for the cut-through relay R460 is completed, this circuit extending from ground by way of the contacts 262, C272, the contacts 391, C402, the upper winding of R460, the contacts 445 and 472, the private wiper of the connector switch 31, C545, the contacts 533 and the winding of the cut-off relay R520 to battery. When energized over this circuit, the relay R460 first closes its preliminary make contacts 467 to complete a circuit including the grounded release conductor C286 for energizing its lower winding. When this winding is energized, the relay R460 completes its operation. Upon fully operating, the relay R460 opens its contacts 461 and 463, further to interrupt the pulsing circuits to the rotary magnet 402 and the operating magnet 865 of the ringing code selector 33. At its contact 466, the relay R460 opens a point in the operating circuit for the relay R440. At its contacts 468, the relay R460 completes an obvious circuit for energizing the slow-to-operate cut-through slave relay R490. At its contacts 469, the relay R460 opens a point in the above-traced locking circuit for the busy test relay R390. At its contacts 466', the relay R460 prepares the operating circuit for the ringing relay R450. At its contacts 465', the relay R460 completes an obvious path for impressing ground potential directly upon the private conductor C545 of the line 9, thereby to mark this line as busy and to increase the energization of the cut-off relay R520. The relay R520 now operates to disconnect the windings of the line relay R530 from the talking conductors C537 and C538 of the line 9. At its contacts 522, the relay R520 completes an obvious circuit for energizing the lockout relay R510. At its contacts 523, the relay R520 completes a path including the grounded private conductor C545 for impressing ground potential upon the control conductor C536. At its contacts 521, the relay R520 opens a point in the path for impressing ground potential upon the permanent supervisory lead C541. The lockout relay R510, upon operating, closes its contacts 511 to connect the extra control conductor C535 of the line 9 to the class marking lead C542. At its contacts 515, the relay R510 opens a point in one of the operating circuits for the cut-off relay R520. At its contacts 513, the relay R510 prepares a locking circuit for itself. At its contacts 512, the relay R510 opens a point in the path for impressing ground potential upon the distributor start and group marking lead C23.

The relay R460, upon operating, also completes a test circuit over which the called simplex line relay R310 is energized in the event the called line is arranged for simplex control of the line and link circuit equipment. In the case under consideration, wherein the called line 9 is arranged for loop circuit control of the line and link circuit equipment, this circuit is not completed. If, however, the line 9 were of the simplex type, ground potential would be impressed upon the extra control lead C535 through break contacts controlled by the lockout relay R510. Accordingly, the relay R210 would be energized in response to operation of the relay R460 over a circuit extending by way of the grounded lead C535, the extra control wiper of the connector switch 31, the contacts 492 and 465, C279, the upper winding of R210 and the resistor 215 to battery. When thus energized, the relay R210 immediately operates. At its contacts 212, the relay R210 short-circuits the resistor 216, thereby to exclude this resistor from the circuit for energizing its lower winding. At its contacts 211, the relay R210 prepares the operating circuit for the slow-to-operate relay R340. At its contacts 213 and 214, the relay R210 conditions the back-bridge relay R355 for energization over a line of the simplex type.

The relay R490, upon operating, opens, at its contacts 491, a point in the operating circuit for the link release relay R220. At its contacts 498 and 499, the relay R490 prepares a talking circuit between the calling and called substations and, in so doing, prepares a circuit for transmitting ringing current over the called line 9. At its contacts 494, the relay R490 prepares the operating circuit for the pickup relay R480. At its contacts 492, the relay R490 opens a point in the above-traced test circuit over which the called simplex relay R210 is energized when a called line of the simplex type is selected. At its contacts 496, the relay R490 prepares a locking circuit for the ring cut-off relay R420. At its contacts 497, the relay R490 prepares one of the operating circuits for the reverting call relay R430. At its remaining contacts, the relay R490 performs additional circuit control operations which are described with particularity hereinafter.

Shortly following the operation of the cut-through slave relay R490, the ringing interrupter, not shown, but common to the finder-connector links of the C. A. X., operates at the beginning of a code cycle to impress a pickup ground pulse upon the pickup lead C486, thereby to complete a circuit for energizing the pickup relay R480. This circuit extends by way of the grounded pickup lead C486, the contacts 482, 426, and 494, and the winding of R480 to battery. When thus energized, the relay R480 operates and locks to ground over a circuit including the contacts 481, 426 and 494. After this locking circuit is completed, the relay R480 opens its operating circuit at the contacts 482, thus preventing ground potential from being continuously applied to the pickup lead C486. At its contacts 485, the relay R480 opens a point in the previously traced path for impressing busy tone signal voltage upon the calling end of the connection. At its contacts 484, the relay R480 prepares a path for impressing ringing voltage upon the calling end of the connection in order to produce the usual ring-back tone signal at the calling substation. At its contacts 483, the relay R480 completes a circuit for energizing the ringing relay R450 in accordance with the coded ground pulses impressed upon the selected fourth ringing interrupter lead by the ringing interrupter. Thus, each time the interrupter operates to impress ground potential upon this interrupter lead, the relay R450 is energized over a circuit including this lead, the wiper 861, C872, the contacts 475 and 483, the lower winding of R450, the contacts 466' and 404, and the upper winding of R450 to battery. Each time the relay R450 operates, it closes its contacts 455 to complete the above-mentioned path for impressing ringing voltage upon the calling end of the connection. This path may partially be traced as extending from one terminal of the ringing current generator, not shown, by way of the resistor 487, the contacts 455, 484 and 448, C555, and the condenser 555' to the link talking conductor C297. From this conductor, the ringing current is transmitted over the calling line 11 to energize the receiver provided at the calling substation A, whereby the usual ring-back tone signal is produced.

Each time the ringing relay R450 operates, it also completes the prepared operating circuit for the reverting call relay R430, this circuit extending from ground by way of the contacts 497 and 452, and the winding of R430 to battery. At its remaining contacts, the relay R450 performs additional circuit control operations which are of no effect at the present time.

It will be apparent from the above explanation that the reverting call relay R430 follows the operation of the relay R460. More specifically, these two relays are concurrently operated during each ground pulse impressed upon the selected ringing interrupter lead and are released during the spacing intervals between the coded ground pulses impressed upon this lead. Each time the relay R430 operates, it closes its contacts 431 to complete an obvious multiple path for impressing ground potential upon the private wiper of the connector switch 31. At its contacts 432 and 434, the relay R430 completes the prepared circuit for transmitting ringing current over the called line 9. The path traversed by this current may be traced as extending from one terminal of the ringing current generator by way of the resistor 487, the contacts 455, 434 and 499, C538, the ringers bridged across the conductors of the line 9 at the substations served by this line, C537 and the contacts 498 and 432 to the opposite terminal of the ringing current generator. This ringing current circuit is obviously interrupted at the contacts 455, 432 and 434 each time the two relays R460 and R430 restore during a spacing interval between two ringing current pulses. Thus, coded signals are produced by the ringers respectively provided at the substations served by the line 9. The coded character of these signals indicates that only the substation B is being called. It will be noted that at the end of each ringing period, the ringing relay R450 first restores and thereafter, at the expiration of the slow-to-release period of the relay R430, the latter relay restores. During this period, the exchange battery is bridged across the conductors C537 and C538 of the called line in series with the resistor 488, thus providing a low resistance discharge path through which the energy stored in the distributed capacitance between the conductors of the line 9 may be discharged. Thus, the accumulation of a high voltage potential across the conductors of the line 9, which, incident to the release of the reverting call relay R430, would be reproduced as a click by the receiver provided at the calling substation, is prevented.

*The called subscriber answers*

The desired communication connection between the calling and called substations is completed when the call is answered at the called substation B. The relay operations which occur in the connector switch 31 incident to the answering of the call are slightly different depending upon whether the called line 9 is arranged for simplex or loop operation. In this regard, it will be recalled from the preceding explanation that, in the event the line 9 is of the simplex type, the called simplex relay R210 will occupy its operated position at the time the call is answered at the called substation. With this arrangement, a circuit is completed for energizing the relay R355 during the first silent or ring pulse spacing period following the answering of the call at the called substation. This circuit has two branches, one of which extends from ground by way of C537, the negative line wiper of the connector switch 31, the contacts 498 and 433, C553, the contacts 373, C293, the contacts 636', the repeating coil winding 603, C651, the contacts 213, C298 and the winding of R355 to battery. The other branch of the simplex circuit over which the back-bridge relay R355 is energized extends from ground by way of the conductor C538, the positive line wiper of the connector switch 31, the contacts 499 and 435, C556, the contacts 375, C297, the contacts 638, the repeating coil winding 604, C298 and the winding of R355 to battery. When energized over this circuit, the relay R355 operates to open its contacts 357 and thus open a point in one of the paths for short-circuiting the winding of the relay R360 but the latter relay is now open-circuited at the contacts 214 and hence does not operate. At its contacts 358, the relay R355 opens one of the paths short-circuiting the lower winding of the paystation tone repeating relay R230. At its contacts 356, the relay R350 completes the prepared operating circuit for the slow-to-operate relay R340, this circuit extending from ground by way of the contacts 224 and 211, C273, the contacts 356 and 311, and the winding of R340 to battery.

The relay R340, upon operating, further opens, at its contacts 341, the circuit for energizing the link release relay R220. At its contacts 344 to 347, inclusive, the relay R340 reverses the direction of current flow over the calling end of the connection in an obvious manner. At its contacts 343, the relay R340 completes another path including the grounded conductor C287 for short-circuiting the winding of the paystation tone repeating relay R230. At its contacts 342, the relay R340 completes a circuit including the grounded release conductor C286 and the conductor C489 for energizing the ring cut-off relay R420.

The relay R420, upon operating, locks to ground over a path including the contacts 429 and 496. At its contacts 427 and 428, the relay R420 first completes an auxiliary locking circuit for the transfer and supervisory relay R370 and then opens the initially completed locking circuit for this relay. The auxiliary locking circuit for the relay R370 extends by way of the grounded release conductor C286, the winding of R370, C477, the contacts 427, C457, the contacts 324, and the resistor 352 to battery. At its contacts 426, the relay R420 interrupts the above-traced locking circuit for the pickup relay R480, causing the latter relay to restore. At its contacts 424, the relay R420 opens a further point in the operating circuit for the relay R440. At its contacts 421, the relay R420 prepares an alternative circuit for energizing the link release relay R220. At its contacts 425', the relay R420 opens one of the parallel locking circuits for the hold slave relay R310. At its contacts 427' and 428', the relay R420 transfers the positive side of the calling line battery feed circuit from ground through the resistance 417' to ground through the winding of the line relay R350. At its contacts 422, 423, 425 and 426', the relay R420 performs additional circuit control operations described more fully hereinafter.

As indicated above, the pickup relay R480 is deenergized and restores in response to the release of the ring cut-off relay R420. The pickup relay, upon restoring, opens its contacts 484 to interrupt the above-traced path for transmitting ringing current over the calling end of the connection, and opens its contacts 483 to interrupt the circuit over which coded ground pulses are transmitted from the ringing interrupter to the ringing relay R450. Thus, the two relays R450 and R430 are prevented from reoperating following the release of the pickup relay R480.

In the event the called line 9 is arranged for loop circuit control of the link and line circuit equipment, the back-bridge relay R355 is energized in response to the answering of the call at the called substation B over a circuit which extends from ground by way of the contacts 357, C290, the contacts 214 of the restored called simplex relay R210, C651, the repeating coil winding 603, the contacts 636', C293, the contacts 373, C553, the contacts 433 and 498, the negative line wiper of the connector switch 31, C537, the bridge across C537 and C538 at the called substation, C538, the positive line wiper of the connector switch 31, the contacts 499 and 435, C556, the contacts 375, C297, the contacts 638, the repeating coil winding 604, C298 and the winding of R355 to battery. In this case, the relay R355, upon operating to interrupt the path short-circuiting the relay R360, includes the winding of the latter relay in the loop circuit just traced. Accordingly, the relay R360 operates after an interval to complete an alternative circuit for energizing the slow-to-operate relay R340, this alternative circuit extending from ground by way of the contacts 224, C275, the contacts 362 and 311, and the winding of R340 to battery. The relay operations which occur incident to the operation of the relay R340 are exactly the same as described above.

Following the release of the pickup relay R480 in the manner set forth above, the desired conversational circuit between the calling and called substations is fully completed. In this regard, it will be understood that, if the calling line is of the simplex type, current for energizing the transmitter provided at the calling substation is furnished locally through the provision of a battery at this substation. Similarly, if the called line is of the simplex type, talking battery is furnished locally at the called substation. On the other hand, if the calling line is arranged for loop circuit control of the link and line circuit equipment, transmission current is supplied to the transmitter provided at the calling substation over the calling loop circuit which extends through the winding of the pulsing relay R250 to the negative terminal of the exchange battery and through the winding of the line relay R350 to the positive terminal of the exchange battery. In a similar manner, if the called line is of the loop type, talking battery is supplied to the transmitter provided at the called substation over the above-traced loop circuit which includes the called line and the windings of the relays R355 and R360. The voice current transmission channel between the calling and called substations includes the windings of the repeating coil 600. Thus, it will be noted that following the relay operations described above, a voice current transmission path is set up between the conductors of the line 9 which includes the conductor C537, the negative line wiper of the connector switch, the contacts 498 and 433, C553, the contacts 373, C293, the contacts 636', the repeating coil winding 603, the contacts 635', the condenser 611, the repeating coil winding 604, the contacts 638, C297, the contacts 375, C556, the contacts 435 and 499, the positive line wiper of the connector switch 31 and C538. The calling portion of the signal current transmission channel extends from the positive talking conductor C101 by way of the wiper 161, the contacts 136, C173, the contacts 632, the repeating coil winding 601, the contacts 633, the condenser 610, the repeating coil winding 602, the contacts 636, C174, the contacts 137 and the wiper 162 to the negative line conductor C102. Since these two portions of the communication channel are inductively related through the coupling between the windings of the repeating coil 600, it will be understood that voice currents may be transmitted in either direction between the calling and called lines through the finder switch 20 and the connector switch 31.

The manner in which the connection is released under the control of the calling party at the substation A is described with particularity hereinafter.

AUTOMATIC TRUNK SELECTION

In the event the above-described call originating at the substation A and routed through the finder switch 20 to the connector switch 31 is intended for a substation served by the exchange 5, the calling party, after initiating the call, dials a single digit comprising ten impulses in order to cause the connector switch to select the group of trunks extending to the distant exchange. In response to the dialing of this digit, the wipers of the connector switch 31 are elevated to a position opposite the tenth level of bank contacts in the exact manner described above with reference to the call routed to the substation B. When these wipers are raised to the tenth vertical off-normal position, the normal post springs 404' and 403' are respectively operated into engagement. At the contact springs 403', a circuit is prepared for energizing the relay R450. At the contact springs 404', a circuit is completed for energizing the cut-in relay R470, this circuit extending from ground by way of the contacts 264, C287, the contacts 425', the contact springs 404' and the winding of R470 to battery. In operating, the relay R470 closes its contacts 471 to complete an alternative circuit for energizing the relay R450, this circuit extending from ground by way of the contacts 264, C287, the contacts 469, 413, 471, 454, 467' and 404 and the upper winding of R450 to battery. At its contacts 474, the relay R470 prepares a circuit for energizing the relay R450 in accordance with the coded ground pulses impressed upon the first ringing interrupter lead. At its contacts 473, the relay R470 further opens the incomplete operating circuit for the release magnet 405. At its contacts 476, the relay R470 prepares the operating circuit for the release magnet 864. At its contacts 472, the relay R470 prepares the previously traced circuit for energizing the busy test relay R390.

The relay R450, upon operating, first locks to ground over a path including the contacts 404, 467' and 453, and the grounded conductor C287. After this locking circuit is completed, the relay R450 opens its contacts 454 to interrupt its alternative operating circuit as traced above. At its contacts 455, the relay R450 prepares the previously traced ringing current circuit. At its contacts 451, the relay R450 prepares the automatic cut-in circuit to the rotary magnet 402.

Shortly following the end of the single digit dialed at the calling substation A, the slow-acting relay R380 restores, in the manner ponted out above, further to prepare the operating circuits for the relays R390 and R440, and to interrupt the locking circuit for the relay R410. The relay R410, upon restoring, opens its contacts 413 further to interrupt the above-traced alternative operating circuit for the relay R450 and closes its contacts 414 to complete the above-mentioned automatic cut-in circuit to the rotary magnet 402. This latter circuit extends from ground by way of the contacts 264, C287, the contacts 469, 414 and 451, and the winding of the magnet 402 to battery. In releasing, the relay R410 also completes a circuit for energizing the slow-acting relay R440, this circuit extending from ground by way of the contacts 264, C287, the contacts 469, 414, 451 and 423, C437, the contacts 381, C438, the contacts 424 and 466 and the winding of R440 to battery. When thus energized, the relay R440 operates to prepare, at its contacts 444, the previously traced circuit for energizing the busy test relay R390.

When the rotary magnet 402 is energized over the automatic cut-in circuit, it operates to rotate the wipers of the connector switch 31 into engagement with the contacts forming the first contact set of the seleced tenth level. At its contacts 404, the magnet 402 interrupts the above-traced locking circuit for the relay R450, causing the latter relay to restore. The relay R450, upon restoring, further interrupts its holding circuit at the contacts 453 and reprepares its operating circuit at the contacts 454. At its contacts 451, the relay R450 interrupts the above-traced automatic cut-in circuit extending to the rotary magnet 402 and the alternative circuit for energizing the relay R440. The magnet 402 now releases further to prepare, at its contacts 404, the alternative operating circuit for the relay R450.

The operations which occur following the first rotary step of the connector switch wipers depend upon the condition of the trunk terminating at the first contact set in the tenth level of bank contacts of this switch. Thus, if this trunk is busy, it is marked against seizure through the application of ground potential to the private conductor thereof. On the other hand, if this first trunk is idle, the private conductor thereof is marked with negative battery potential. Assuming that the trunk terminated at the first set of contacts in the tenth level of bank contacts is busy, a circuit including the grounded private conductor thereof, the private wiper of the connector switch and the contacts 472, 444 and 383 is completed for energizing the busy test relay R390 immediately the rotary magnet 402 operates to advance the connector switch wipers into engagement with this contact set. Upon operating, the relay R390 opens, at its contacts 392, the incomplete operating circuit for the relay R380 and prepares, at its contacts 397, the previously traced holding circuit for itself. At its contacts 393, the relay R390 completes an alternative circuit for energizing the relay R450, this circuit extending from the grounded private wiper of the connector switch 31 by way of the contacts 472, the normal post springs 403', the contacts 442, C409, the contacts 393, C419, the cam springs 418, the contacts 454, 467', and 404 and the upper winding of R450 to battery. The relay R450, upon reoperating, again locks to the grounded conductor C287 and recompletes, at its contacts 451, the above-traced circuit for energizing the rotary magnet 402. The magnet 402, in reoperating, interrupts the locking circuit for the relay R450, causing this relay to restore, and steps the connector switch wipers into engagement with the contacts forming the second set of the tenth level, namely, the contacts terminating the conductors of the second trunk in the selected group. The relay R450, upon restoring in response to the operation of the rotary magnet 402, opens its contacts 451 to interrupt the circuit for energizing this magnet and further interrupts its own locking circuit at the contacts 453. In the event the second trunk of the selected group is also busy, the busy test relay R390 is held in its operated position and the relay R450 interacts with the rotary magnet 402 to advance the connector switch wipers another step into engagement with the contacts forming the contact set terminating the third trunk of the selected group. More generally stated, the interaction between the relay R450 and the rotary magnet 402 continues until an idle trunk of the selected group is found or until all of the trunks of the group are tested and found to be in a busy condition. It will be noted that each time a current pulse is delivered to the rotary magnet 402, a current pulse is also transmitted to the slow-acting relay R440 over a circuit including the contacts 451 and 423, C437, the contacts 381, C438, and the contacts 424 and 466. This relay, due to its slow-to-release characteristic, remains operated throughout the trunk hunting operation of the connector switch.

Assuming that all of the trunks of the selected group are tested and found busy, the wipers of the connector switch 31 are rotated through ten steps to the tenth rotary off-normal position thereof, wherein they engage the contacts forming the contact set at which are terminated the conductors of the last trunk in the selected group. In response to the tenth rotary step of these wipers, the cam springs 418 are disengaged to interrupt the above-traced alternative operating circuit for the relay R450. Thus, further operation of the relay R450 and the rotary magnet 402 is prevented and no further current pulses are transmitted to the slow-acting relay R440. If the selected tenth trunk of the group is busy, the busy test relay R390 is held operated over a circuit including the grounded private wiper of the connector switch. With the relay R450 in its restored position, the operating circuit for the relay R440 is held open at its contacts 451. Accordingly, the relay R440 restores shortly after the tenth trunk is selected. In releasing, the relay R440 completes the prepared locking circuit for the busy test relay R390 and completes the previously traced path for transmitting busy tone current over the calling end of the connection, thereby to signal the calling subscriber that all of the interoffice trunks are busy. Following the release of the relay R440, no further operation of the link circuit apparatus occurs until the connection is abandoned at the calling substation A.

Assuming now that the trunk 541 extending to the operator's position 36 in the distant exchange 5 is the first idle trunk of the selected group, the trunk hunting operation of the connector switch continues until the wipers of the switch are positioned in engagement with the contacts terminating the conductors C542', C543 and C544. When these contacts are engaged by the connector switch wipers, no further circuit is available for energizing the busy test relay R390 due to the absence of ground potential from the private or test conductor C542'. Accordingly, the relay R390 restores. In releasing, the relay R390 opens its contacts 393 further to interrupt the previously traced alternative operating circuit for the relay R450. Thus, further interaction between the relay R450 and the rotary magnet 402 is positively prevented.

Shortly following the release of the busy test relay R390, the slow-acting relay R440 restores to prepare, at its contacts 441, a C. L. R. holding circuit for the hold relay R260. At its contacts 445, the relay R440 completes the previously traced operating circuit for the cut-through relay R460, this circuit originating at ground at the contacts 262 and terminating at the negative terminal of the exchange battery in the trunk circuit 35. When thus energized, the relay R460 operates and locks to the grounded release conductor C286 through its preliminary make contacts 467. After this locking circuit is completed, the relay R460 closes its contacts 465' to short-circuit its upper winding and to impress ground potential upon the private conductor C542 of the trunk 541. The trunk 541 is thus marked against seizure in the other connector switches in the C. A. X., and the trunk circuit 35 is conditioned for unimpeded ringing and voice current transmission over the trunk 541. The relay R460, upon operating, also initiates the ringing operation in the manner explained above with reference to the call routed to the substation B, it being pointed out that the ringing relay R450 is energized in accordance with the coded ground pulses impressed upon the first ringing interrupter lead over a circuit including this lead, C870, the contacts 474 and 483, the lower winding of R450, the contacts 466' and 404, and the upper winding of R450 to battery. It will be noted that this ringing control circuit is completed, even though the wipers of the ringing code selector switch 33 occupy their respective normal positions. The ringing current transmitted over the trunk 541 from the connector switch 31 serves to energize a drop or other signal device associated with the trunk 541 at the operator's position 36, thereby to signal the operator attending this position that a call is present on the trunk 541 which should be answered.

*The operator answers*

When the operator attending the operator's position 36 in the distant exchange 5 answers the call, a loop circuit substantially similar to that traced above is completed for energizing the back-bridge relay R355, whereby this relay, the relay R360 and the relay R340 are caused sequentially to operate in the order named and in the manner previously explained. In this regard it is pointed out that the trunk circuits individually associated with the inter-office trunks are all arranged for loop circuit control of the relay equipment embodied therein and, accordingly, the called simplex relay R210 is not energized when one of the inter-office trunks is seized by the connector switch 31. Provisions are made in the trunk circuit 35, whereby, when a call routed over the trunk 541 to the operator's position 36 is answered at this position, multiple ground potential is impressed upon the private conductor C542 by the relay equipment of this circuit. This ground path is utilized to maintain the hold relay R260 energized after the call is answered in order that the switchhook provided at the calling substation may be operated to transmit supervisory signals over the inter-office trunk to the operator's position 36 without releasing the link. More specifically, when the call is answered to cause the operation of certain of the relays in the trunk circuit 35, a C. L. R. holding circuit is completed for the relay R260, this circuit extending by way of the grounded conductor C542', the private wiper of the connector switch 31, the contacts 472, the normal post springs 403', the contacts 441, C408, the contacts 361, C274 and the winding of R260 to battery. It will be noted that this circuit is completed at the contacts 361 in response to the operation of the back-bridge relay R360.

The relay R355, in operating to complete the operating circuit for the relay R360, also functions to complete a circuit for transmitting paystation tone signal voltage to the answering operator's position 36 in the event the calling line 11 is of the paystation type. Thus, when the relay R355 operates, it opens its contacts 358 to interrupt the path short-circuiting the winding of the paystation tone repeating relay R230. In this regard it will be noted that the lower winding of the relay R230 is, on a call routed to a subscriber substation, also short-circuited over a path including the conductor C171, the ringing code selector switch wiper 863 and the multipled contacts of the associated contact set 862, and the conductor C287. However, in handling a trunk call of the character under consideration, the wipers of the ringing code selector switch 33 are not moved off normal and, accordingly, the short-circuiting path just described is not completed. As a result, the relay R355, upon operating, permits the flow of paystation tone signal current through the lower winding of R230. The circuit traversing this current may be traced as extending from the ungrounded terminal of the paystation tone current source by way of the condenser 124', the contacts 124 and 123, C104, the wiper 164, the contacts 139, C171, the lower winding of R230 and the contacts 264 to the grounded terminal of the paystation tone current source. The lower winding of the relay R230 is also energized by direct current over a circuit which extends from ground by way of the contacts 264, the lower winding of R230, C171, the contacts 139, the wiper 164, C104, the contacts 123 and the winding of R120 to battery. When thus energized with direct current, the relay R230 operates to bridge its upper winding across the repeating coil windings 601 and 602 in series with the condenser 232 and the contacts 231. The induced paystation tone voltage developed in the upper winding of the relay R230 causes a corresponding current to traverse the repeating coil windings 601 and 602, which is repeated by induction to the called end of the connection. This current as transmitted over the trunk 541 is reproduced by the receiver of the operator's telephone set in use at the operator's position 36 to inform the answering operator that the calling substation is of the paystation type. It will be understood that only the line circuits associated with lines of the paystation type are equipped with circuits for impressing paystation tone signal voltage upon the control wipers of the link finder switches. Accordingly, the operation of the paystation tone repeating relay R230 is of no consequence in the handling of calls originating at flat rate or metered call subscriber substations.

When the relay R340 operates a short time interval following the operation of the back-bridge relay R355, it closes its contacts 343 to complete an obvious alternative path for short-circuiting the lower winding of the paystation tone repeating relay R230. The relay R230 is thus deenergized and restores to open, at its contacts 231, the path for bridging its upper winding across the repeating coil windings 601 and 602. Thus, the paystation tone signal transmitted to the operator's position 36 is terminated.

If the operator atending the position 36 desires to verify the call as one originating at a paystation, she may do so by momentarily opening the loop circuit established by way of the trunk 541, thereby to cause the deenergization and release of the three relays R355, R360 and R340 followed by the sequential reoperation of these relays in the manner explained above. During the interval between the reoperation of the relay R355 and the reoperation of the relay R340, the path short-circuiting the lower winding of the paystation tone repeating relay R230 is interrupted, and this relay reoperates to again impress paystation tone signal voltage upon the called end of the connection. Thus, a check signal is transmitted to the operator handling the call at the position 36, indicating that the calling substation is of the paystation type. Obviously, this check signal is terminated in response to the release of the paystation tone repeating relay R230 which occurs when the relay R340 reoperates. If desired, the trunk circuit at which the trunk 541 is terminated at the operator's position 36 may be equipped with a paystation verification key for grounding the negative side of the trunk, thereby to short-circuit the relay R360 without deenergizing the relay R355. With this arrangement, the relays R360 and R340 may be caused to restore to open the path short-circuiting the lower winding of the paystation tone repeating relay R230 so that a steady paystation tone signal is transmitted over the trunk 541. In such case, the relays R360 and R340 are caused to reoperate to short-circuit the operating winding of the relay R230 and thus terminate the paystation tone signal, when the paystation verification key provided in the trunk circuit terminating the trunk 541 at the operator's position 36 is restored to normal to disconnect the negative side of this trunk from ground.

*Supervision*

After the connection has been extended from the calling substation A to the operator's position 36 in the manner explained above, the operator attending this position may route the connection to the desired substation in the manner conventionally followed in manual office practice. After the desired connection is fully established between the calling and called substations, the operator attending the position 36 may retire from the connection and rely upon the supervisory signals associated therewith for information regarding the condition of the connection. In this regard it is pointed out that the circuit arrangement of the finder-connector links provided in the C. A. X. is such that flashing recall signals may be transmitted to the operator handling the call at the operator's position 36. Thus, it is pointed out above that so long as the connection is not cleared out at this operator's position, the slow-acting hold relay R260 is held operated over a C. L. R. holding circuit which is independent of the line relay R250 and the lockpulse relay R320. With this arrangement if the calling party at the substation A operates the hook-switch at this substation to open the calling loop circuit, the relay R250 is deenergized and restores. In releasing, the relay R250 interrupts the locking circuit for the relay R320 at its contacts 253. The relay R320, upon restoring, opens its contacts 321 to interrupt the operating circuit for the hold relay R260, and opens its contacts 324 to interrupt the previously traced locking circuit for the transfer and supervisory relay R370. The relay R370 is thus deenergized and restores reversely to connect the link talking conductors C553 and C556 to the talking conductors C293 and C297 at its contacts 373 to 376, inclusive. In response to this operation, the direction of current flow over the established loop circuit extending to the operator's position 36 is interrupted, causing the supervisory relay associated with the trunk 541 at this position to operate and energize its associated supervisory signal lamp. Obviously, if the calling party operates the hook-switch provided at the substation A to recomplete the calling loop circuit, the relays R250, R320 and R370 are caused sequentially to reoperate in the order named. The relay R370, in operating, again reverses the direction of current flow over the loop extending to the operator's position 36 so that the supervisory relay associated with the trunk 541 at this position restores to deenergize the associated supervisory signal lamp. From the above explanation it will be apparent that the three relays R250, R320 and R370 cooperate to transmit a flashing recall supervisory signal to the operator attending the position 36, in response to operation of the hook-switch provided at the calling substation A repeatedly to interrupt and recomplete the calling loop circuit extending from this substation to the connector switch 31. It will also be apparent that these three relays remain in their respective restored positions when the calling party at the substation A hangs up to terminate the call. With these three relays deenergized, the supervisory signal lamp associated with the trunk 541 at the operator's position 36 is steadily energized, indicating to the operator attending this position that the call has been cleared out at the calling substation.

RELEASE

The release of a connection set up between two substations served by the C. A. X., such, for example, as the above-described connection routed through the finder switch 20 and the connector switch 31 from the substation A to the substation B, is entirely under the control of the calling subscriber. In this regard it will be recalled from the preceding explanation that so long as the connection is held at both the calling and called substations, the relays R250, R260, R310, R320, R340, R355, R370, R420, R460, R470 and R490 are operated in the connector switch 31. It will further be recalled that one or more of the relays R210, R350, R330 and R360 may be operated, depending upon the character of the calling and called lines. With the above-enumerated relays operated, if the connection is cleared out at the called substation prior to the release of the connection at the calling substation, the relays R355 and R340 are caused sequentially to restore in an obvious manner. If operated, the relay R360 is also deenergized and restores in response to the release of the connection at the called substation, this relay being short-circuited when the relay R355 releases. At its contacts 344 to 347, inclusive, the relay R340, upon restoring, reverses the direction of current flow over the calling loop circuit. At its contacts 341, the relay R340 reprepares the operating circuit for the link release relay R220. Following the release of the relays R355 and R340, and possibly the relay R360, no further operation of the connector switch control equipment occurs until the connection is released at the calling substation. When the calling party hangs up, the two relays R250 and R320 are caused sequentially to restore in the manner pointed out above. If operated, the line relay R350 is also deenergized and restores when the calling loop circuit is interrupted at the calling substation. The relay R320, upon restoring, opens its contacts 321 to interrupt the circuit for energizing the hold relay R260, whereby the latter relay and its slave relay R310 are caused sequentially to restore. The relay R260, in restoring, opens its contacts 264 to disconnect the control conductor C171 from ground, thus permitting the finder switch 20 to release in a manner well understood in the art. The relay R310, upon restoring, disconnects the release conductor C286 from ground, thereby to interrupt the holding circuits for the relays R210, R330, R370, R460 and R390, causing the operated ones of these relays to restore. The relay R460, upon restoring, opens its contacts 468 to deenergize the cut-through slave relay R490. Thus, the relays R490 and R420 are caused to restore. At its contacts 465', the relay R460 disconnects the private conductor of the called line 9 from ground, thereby to cause the sequential deenergization and release of the cut-off relay R520 and lockout relay R510 embodied in the line circuit 34. Following the release of the two last-mentioned relays, the line circuit 34 is fully restored to normal, and the private conductor C545 is marked with negative battery potential through the winding of the cut-off relay R520, thus rendering the line 9 accessible to the connector switches in the C. A. X.

When the relay R310 restores in the manner pointed out above, it also functions to complete the prepared circuit for energizing the release magnet 864 of the ringing code selector 33, this circuit extending from ground by way of the contacts 317, C557, the contacts 476, C869 and the winding of the magnet 864 to battery. The magnet 864, in operating, attracts its holding pawl in a manner well known, permitting the spring biased wipers 861 and 863 to be restored to their respective normal positions. When these wipers are restored to normal, the off-normal springs 866 are disengaged to interrupt the circuit for energizing the cut-in relay R470. The cut-in relay R470, in releasing, opens its contacts 476 to interrupt the above-traced operating circuit for the release magnet 864. At its contacts 473, the relay R470 completes the prepared operating circuit for the release magnet 405, this circuit extending from ground by way of the contacts 317, C557, the contacts 473, the off-normal springs 499' and the winding of the release magnet 405 to battery. When thus energized, the release magnet 405 attracts its holding pawl, permitting the wipers of the connector switch 31 to be returned to rotary and vertical normal in the usual manner. When these wipers are restored to their respective normal positions, the off-normal springs 499' are disengaged to interrupt the operating circuit for the release magnet 405, and the off-normal springs 411' and 215 are respectively operated into engagement. Following the release of the Strowger switching mechanism embodied in the connector switch 31 in the manner just explained, this connector switch is fully restored to normal.

When the hold relay R260 restores in the manner explained above to disconnect the control conducor C171 from ground, the cut-off relay R120 is deenergized, and guarding ground potential is removed from the private conductor C107. The relay R120, upon restoring, opens the operating circuit for the lockout relay R110, causing the latter relay to restore. Following the release of the two relays R120 and R110, the line circuit 10 is fully restored to normal and the private conductor C107 is marked with negative battery potential through the winding of the cut-off relay R120, thus permitting seizure of the line 11 by the connector switches having access thereto.

In the event the connection is cleared out at the calling substation A prior to its release at the called substation B, the back-bridge relays R335 and R340, and possibly the relay R360, are operated at the time the release of the connector switch is initiated. Accordingly, the relay release sequence is slightly different from that described above. More specifically, the relay R355 and the relay R360, if operated, are held energized over a loop circuit extending to the called substation until the cut-through slave relay R490 restores to open this loop circuit at the contacts 498 and 499. Also, when the cut-through relay R460 restores to deenergize the cut-off relay R520 in the manner explained above, the cut-off relay releases to reconnect the windings of the line relay R530 to the conductors of the line 9. The relay R530 is thus energized and operates to complete, at its contacts 531, the locking circuit for the lockout relay R510. These two relays, namely, the relays R530 and R510, remain operated until the connection is released at the called substation. With the relay R530 operated, ground potential is impressed upon the private conductor C545 through the contacts 534 to guard the line 9 against seizure by the connector switches having access thereto. With the lockout relay R510 operated, the path for impressing ground potential upon the distributor start lead C23 is held open at the contacts 512, thus preventing the seizure of one of the finder-connector links. Obviously, when the connection is cleared out at the called substation, the relays R530 and R510 sequentially restore in the order named, at which time the line circuit 34 is fully released and the private conductor C545 is marked with negative battery potential.

*Release of trunk call connections*

As indicated in the preceding explanation, the release of a trunk call connection, such, for example, as that routed from the substation A through the finder switch 20 and the connector switch 31 to the operator's position 36 in the exchange 5 is partially under the control of the calling subscriber and partially under the control of the operator attending the position 36. Thus, when the connection is cleared out at the calling substation A, the relays R250, R320 and R370 cooperate to transmit a disconnect supervisory signal to the operator attending the position 36 in the manner pointed out above. Following the release of the connection at the calling substation A, the switch train is held operated due to the continued energization of the hold relay R260 over the C. L. R. holding circuit which extends to the trunk circuit 35. When the operator attending the position 36 clears out the connection, certain of the relays embodied in the trunk circuit 35 are caused to operate to disconnect the control or private conductor C542' from ground and thus interrupt the C. L. R. holding circuit. As a result, the hold relay R260 and the hold slave relay R310 are caused sequentially to restore. The manner in which the finder switch 20, the connector switch 31 and the line circuit 10 are released in response to the release of the two relays R260 and R310, is exactly the same as described above with reference to the release of the connection set up between the substations A and B. It will be understood that if the connection is cleared out at the operator's position 36 before it is released at the calling substation A, the C. L. R. holding circuit extending from the trunk circuit 35 to the hold relay R260 is interrupted and, accordingly, the switch train is held operated over the calling loop or simplex circuit from the substation A. When, therefore, the connection is cleared out at the calling substation A, the finder switch 20, the connector switch 31 and the line circuit 10 are all released in the manner pointed out above.

*Forced disconnect*

As pointed out in the general description of the system, the timing equipment 30, operating in conjunction with the link release relay R220, functions to release a seized link a predetermined time interval following the seizure thereof in the event a talking or communication circuit is not established therethrough. More specifically, this apparatus is provided forcibly to release links which are seized over lines having a permanent calling condition thereon and calling lines on which calls are initiated but are not completed or abandoned. This apparatus also functions automatically to release connections which are not promptly released at the calling substations after the called parties hang up. In this regard it will be recalled from the preceding explanation of the operation of the link 20, 31 that the operating circuit for the link release relay R220 is prepared when the hold relay R260 operates, this circuit extending by way of the time pulse lead, the contacts 222 and 261, C271, the contacts 341, C401, the contacts 421 or 491, C270 and the winding of R220 to battery. This circuit is interrupted at the contacts 491 in response to operation of the cut-through slave relay R490 which occurs at the time the signaling of a called substation is initiated. This circuit is reprepared at the contacts 421 when the ring cut-off relay R420 operates in response to the answering of the call, and is concurrently opened at the contacts 341 of the answer relay R340. It will be noted, however, that the ring cut-off relay R420 is locked energized after the call is answered, whereas the relay R340 is arranged to respond to switchhook operations at the called substation, so that if the call is released at this substation the relay R340 is deenergized to reprepare the circuit for energizing the link release relay R220.

If this circuit is held completed for a predetermined time interval, a ground pulse is transmitted thereover by the timing equipment to energize the relay R220. In operating, the relay R220 locks to ground over a path including the contacts 221 and 261, C271, the contacts 341, C401, the contacts 421 or 491, C270 and the winding of R220 to battery. After this locking circuit is completed, the relay R220 opens its contacts 222 to disconnect the time pulse lead from ground as applied to the contacts 221. At its contacts 223, the relay R220 completes an alternative circuit for energizing the hold relay R260, this alternative circuit extending by way of the normally grounded time cut-off lead, the contacts 223, C275, the contacts 321, C274 and the winding of R260 to battery. After this circuit is completed, the relay R220 opens its contacts 224 to interrupt the initially completed operating circuit for the hold relay R260.

The arrangement of the timing equipment 30 is substantially conventional. Briefly described, this equipment is so arranged that it impresses ground pulses upon the time pulse lead at evenly spaced intervals, and normally maintains ground potential upon the time cut-off lead. A predetermined time interval after the application of each ground pulse to the time pulse lead, the equipment operates to disconnect the time cut-off lead from ground for a short time interval.

Following the operation of the link release relay R220, if the control equipment of the connector switch is shifted to its ringing setting during the interval which elapses between the application of the operating ground pulse to the time pulse lead and the removal of ground potential from the time cut-off lead, the locking circuit for the link release relay R220 is interrupted at the contacts 491, and the link release relay restores to terminate the timing operation by recompleting the operating circuit for the hold relay R260 and by excluding the time cut-off lead from this circuit. The locking and operating circuits for the link release relay R220 are further interrupted at the contacts 341 when the relay R340 operates in response to the answering of the call at the called substation. Thus, it will be apparent that if a timing operation is started following the initiation of a call, and the call is successfully completed before the elapse of the timing period, the timing operation is terminated and the call proceeds in the intended manner. Moreover, if the desired connection is obtained, the called subscriber hangs up to initiate a timing operation, and then reenters the connection to cause the reoperation of the relay R340, the timing operation in progress is terminated and the relay R220 is rendered ineffective forcibly to release the link. If, however, the relay R220 is held in its operated position for the duration of a timing period, the timing equipment 30, upon operating to disconnect the time cut-off leads from ground, deenergizes the hold relay R260. The relay R260, upon restoring, disconnects the control conductor C171 from ground, thereby to initiate the release of the finder switch 20 in the manner pointed out above. During the release of the finder switch 20, the established simplex or loop circuit extending from the substation A to the connector switch 31 is interrupted to cause the deenergization and release of the relays R250, R320 and R350. The relays R320 and R310, upon restoring, further open the circuit for energizing the hold relay R260. With the hold relay R260 and its slave relay R310 in their respective restored positions, the remaining operated relays of the connector switch 31 and the Strowger switching mechanism of this switch are caused to release in the manner pointed out above with reference to the release of the connection set up between the substations A and B. It will be noted that the relay R260, upon restoring, opens its contacts 261 to interrupt the locking circuit for the link release relay R220, whereby the latter relay is caused to restore, but only after the relays R250 and R320 are released to open the circuits for energizing the hold relay R260.

When ground potential is removed from the control conductor C171, the cut-off relay R120 is denergized and restores to recomplete, at its contacts 121 and 122, the operating circuit for the line relay R130. The relay R130, accordingly, reoperates to complete, at its contacts 134, the prepared locking circuit for the lockout relay R110. Thus, the two relays R110 and R130 are held operated until the calling condition present on the line 11 is terminated. With these two relays operated, a path including the contacts 132 is completed for impressing ground potential upon the private conductor C107 to prevent seizure of the line 11 on calls incoming thereto, and the distributor start circuit including the lead C22 is held open at the contacts 112, thus preventing another of the finder-connector links from being assigned to the use of the line 11. Obviously, the two relays R130 and R110 are deenergized and sequentially restore when the calling condition of the line 11 is cleared.

REVERTING CALLS

As indicated in the introductory portion of the specification, the link circuit arrangement is such that reverting call signaling between two substations served by the same line is accomplished by the directory number dialing method. Thus, if the above-described call initiated at the substation A is intended for a second substation served by the line 11, the calling party, after initiating the call, dials the three digits of the directory number designating the second substation. The first two of these digits correspond to the first two digits of the directory number designating the calling substation, so that the wipers of the connector switch 31 are positioned in engagement with the contacts terminating the conductors of the line 11. After the third or code-selecting digit is dialed, which digit designates the ringing code assigned to the desired substation, the control equipment of the connector switch 31 operates to test the condition of the line 11 in the manner explained above. Obviously, this line is marked busy, and accordingly, the usual busy tone signal is transmitted to the calling subscriber. Upon receiving this signal, the calling subscriber restores the receiver provided at the substation A to its supporting hook or cradle. In response to this operation the calling simplex or loop circuit is interrupted to cause the deenergization and release of the pulsing relay R250 and the line relay R350, if operated. Upon restoring, the relay R250 opens its contacts 252 to interrupt one of the circuits for energizing the hold relay R260, and opens its contacts 253 to interrupt the locking circuit for the lock-pulse relay R320. The relay R320, upon restoring, interrupts the other completed circuit for energizing the hold relay R260, and completes the prepared operating circuit for the reverting call relay R430, this latter circuit extending from ground by way of the contacts 316, 325 and 398, C550 and the winding of R430 to battery. Upon operating, the relay R430 closes its contacts 431 to complete an obvious alternative path for impressing ground potential upon the private wiper of the connector switch 31 and thus provide a holding circuit for the cut-off relay R120 of the line circuit 10. At the contacts 431, the reverting call relay R430 also completes a holding circuit for the hold slave relay R310, this circuit extending from ground by way of the contacts 431, the private wiper of the connector switch 31, C107, the contacts 133 and 123, C104, the wiper 164, the contacts 139, C171, the contacts 358, C287, the contacts 245, C288 and the winding of R310 to battery. A branch of this holding circuit also extends from the control conductor C171 by way of the contacts 358, C287, the contacts 425', C288 and the winding of R310, so that the hold slave relay R310 is held operated until the ring cut-off relay R420 is caused to operate. Thus, the hold slave relay R310 is prevented from restoring to initiate the release of the link. The application of ground potential to the control conductor C171 also prevents the deenergization and release of the operated relays in the finder switch 20.

Shortly following the operation of the reverting call relay R430, the hold relay R260 opens its contacts 264 to interrupt the initially completed path for impressing ground potential upon the control conductor C171. At its contacts 262, the relay R260 opens a point in the operating circuit for the relay R460. At its contacts 261, the relay R260 opens a point in the previously traced operating circuit for the link release relay R220. At its contacts 265, the relay R260 completes the prepared operating circuit for the reverting call relay R240, this circuit extending from ground by way of the contacts 431, the private wiper of the connector switch 31, C107, the contacts 133 and 123, C104, the wiper 164, the contacts 139, C171, the contacts 358, C287, the contacts 265, C282, the contacts 314 and 396, C281 and the winding of R240 to battery.

In operating, the relay R240 locks to the grounded control conductor C171 over a path including its contacts 244, the conductor C287 and the contacts 358. At its contacts 241, the relay R240 completes a circuit for energizing the called simplex relay R210, this circuit extending by way of the grounded release conductor C286, the contacts 332 or the resistor 332', depending upon the position of the calling simplex relay R330, C283, the contacts 241 and the lower winding of R210 to battery. It will be apparent that the called simplex relay R210 is sufficiently energized over this circuit to operate only when the calling simplex relay R330 is operated, indicating that the line 11 is of the simplex type. In the event the relay R210 is caused to operate, it adapts the answering circuits for simplex control of the back-bridge relays R355 and R360 in the manner pointed out above. On the other hand, if the line 11 is arranged for loop circuit control of the link and line circuits, the called simplex relay R210 remains in its restored position, wherein the answering circuits are arranged for loop control of the two back-bridge relays R355 and R360. At its contacts 245, the relay R240 opens one of the branches of the above-traced holding circuit for the hold slave relay R310. At its contacts 246 and 247, the relay R240 opens further points in the previously traced calling simplex and loop circuits over which the pulsing relay R250 and the line relay R350 are controlled. At its contacts 243, the relay R240 disconnects the repeater hold lead C126 from ground for a purpose described hereinafter. At its contacts 242, the relay R240 completes a circuit for energizing the lower winding of the cut-through relay R460, this circuit extending from ground by way of the contacts 315, C286, the contacts 242, C284 and the lower winding of R460 to battery.

The relay R460, upon operating, locks to the grounded release conductor C286 through its contacts 467, completes the operating circuit for the cut-through slave relay R490, and closes its contacts 465' to complete an obvious multiple path for impressing ground potential upon the private wiper of the connector switch 31. At its contacts 469, the relay R460 opens the previously traced locking circuit for the operated busy test relay R390, causing the latter relay to restore. In releasing, the relay R390 opens its contacts 398 to interrupt the previously traced operating circuit for the reverting call relay R430. The relay R430, upon restoring, opens its contacts 431 to interrupt one of the paths over which ground potential is impressed upon the private wiper of the connector switch.

The cut-through slave relay R490, upon operating, closes its contacts 494 to prepare the operating circuit for the pickup relay R480. Thus, the ringing operation is initiated in the exact manner pointed out previously with reference to the call routed to the substation B.

When a call answering operation is performed at the calling substation or the called substation associated with the line 11, the relays R355, R340 and R420 are caused to operate in the manner explained above with reference to the call routed to the substation B. The relay R420, upon operating, opens its contacts 425' to interrupt the only established holding circuit for the hold slave relay R310. The relay R310 is thus deenergized and restores to disconnect the release conductor C286 from ground and thus initiate the release of the connector switch 31 in the manner previously explained. During the release of the connector switch 31, and when the cut-through relay R460 restores, ground potential is removed from the private wiper of the connector switch, and incident thereto, from the private conductor C107 of the line 11, thereby to cause the deenergization and release of the cut-off relay R120 and the reverting call relay R240, and to initiate the release of the finder switch 20 in a manner clearly apparent from the preceding explanation. The cut-off relay R120, upon restoring, closes its contacts 121 and 122 to recomplete the operating circuit for the line relay R130. The line relay, upon reoperating, completes the prepared locking circuit for the lockout relay R110. These two relays, namely, the relays R130 and R110, are held operated until the connection is cleared out at both the calling and called substations served by the line 11. With these relays operated, the distributor start circuit individual to the line 11 is held open at the contacts 112, and ground potential is applied to the private conductor C107 through the contacts 132 to guard the line 11 against seizure on incoming calls. The line and lockout relays R130 and R110 are sequentially deenergized and restore when the calling loop or simplex operating circuit for the line relay is opened at the calling and called substations.

TRANSMISSION EFFICIENCY CONTROL

An understanding of the manner in which transmission efficiency of the connections established between the different lines terminating at the C. A. X. is controlled, is facilitated by considering somewhat more fully the general arrangement of the repeater control circuits and the classification of the different lines. In this regard it will be recalled that the lines are classified according to the signal current transmission characteristics thereof. More specifically, these lines are divided into six classes according to the signal current loss characteristics thereof. These classes are individually designated by the relays R1400, R1410, R1420, R1430, R1440 and R1450 of the gain control selector 44 and the corresponding relays of the gain control selectors individual to the other repeater control circuits. The indicated relays of the gain control selector 44, operating singly or in various combinations of two in accordance with the classification of the calling and called lines included in a connection, serve selectively to control the relays of the gain control circuit 32 so that an appropriate gain control setting, determined by the combined signal current transmission losses of the calling and called lines, is imparted to the amplifiers of the associated repeater 45.

*Assigning a repeater*

Each time operation of the finder portion of an assigned link is initiated to seize a calling line, the repeater allotter circuit 40 operates to assign an idle one of the five available repeaters to the use of the calling line. Thus, in the course of setting up the above-described connection between the substations A and B, certain of the relays embodied in the finder switch 20 operate to complete a circuit for energizing the start relay R150 which is common to the twelve available links. This relay, in operating, closes its contacts 151, to complete an obvious path for impressing ground potential upon the start lead C178. Assuming that all of the repeater control circuits are idle and that none of the allotter relays are operated, the master control relay R960 of the allotter circuit 40 is energized over a circuit including the chain-connected contacts 915, 925, 935, 945 and 955 when the start lead C178 is connected to ground. Upon operating, the relay R960 closes its contacts 961 to 965, inclusive, to associate the allotter relays R910, R920, R930, R940 and R950 with the test conductors C918, etc., respectively extending to the five available repeater control circuits. Those of the allotter relays which correspond to idle repeaters are energized over circuits respectively including their associated test conductors when the master control relay R950 operates. On the other hand, the allotter relays which correspond to busy repeaters are not energized when the master control relay R960 operates. Thus, if the repeater 45 and associated control circuit 41 are busy, the operating circuit for the relay R910, individual thereto, is held open at the contacts 1025 or 1034 of the relays R1020 and R1030. On the other hand, if the repeater 45 and its associated control circuit 41 are idle, the allotter relay R910 corresponding thereto is energized over a circuit which extends from ground by way of the contacts 1025 and 1034, C918, the contacts 965 and the winding of R910 to battery. The four other allotter relays are similarly energized over their associated test circuits in the event the repeaters corresponding thereto are idle. Upon operating, the relay R910 opens its contacts 915 to interrupt the above-traced operating circuit for the master control relay R960. At its contacts 911, the relay R910 locks to ground over a path including the conductor C918 and the contacts 1034 and 1025. At its contacts 914, the relay R910 completes a circuit including the grounded start conductor C178 for energizing the heater start relay R990. At its contacts 912, the relay R910 prepares a circuit for energizing the start relay R1000 of the repeater control circuit 41.

In the event the first repeater 45 is busy and the remaining four available repeaters are idle, the four relays R920, R930, R940 and R950 are locked energized in response to the application of ground potential to the start lead C178, whereas the relay R910 remains in its restored position. In such case the second repeater, namely, that corresponding to the allotter relay R910, is assigned to the use of the calling line, the heater start circuit which extends to the heater start relay individual to this repeater being completed through the contacts 915 and 924 of the allotter relays R910 and R920. In a similar manner, if the first two repeaters are busy and the other available repeaters are idle, the heater start circuit is extended through the contacts 915, 925 and 934 to the heater start relay individual to the third repeater.

From the above explanation it will be apparent that when the master control relay R960 operates to complete the test circuits extending to the various allotter relays, those of these relays which correspond to idle repeaters are operated and locked energized. These relays remain in their respective operated positions until assigned for use. As the respective associated repeaters are assigned for use, the allotter relays are deenergized. After all of the assigned repeaters have been used, such that all five of the allotter relays have been caused to restore, the chain contact operating circuit for the master relay R960 is again prepared. Accordingly, the call which next succeeds the seizure of the last allotted repeater results in the energization of the master control relay R960, whereby the allotter relays which correspond to repeaters that have been released are again energized. Thus, it will be apparent that the repeaters are preselected for use in a predetermined order.

In the present case, wherein the repeater 45 is assumed to be idle, the heater start relay R990 is energized and operates to complete a path including the contacts 991 for impressing ground potential upon the heater start conductor C657, whereby the cathode heaters of the thermionic tubes embodied in the amplifiers 46 and 49 are energized in the usual manner. Thus, the amplifiers of the assigned repeater are conditioned for operation immediately after the call is initiated and prior to the completion of the desired connection, in order that the amplifiers will be fully operative when the call is answered at the called substation. As indicated above, the operating circuit for the master control relay R960 is opened in response to operation of the relay R910 and the other relays which correspond to idle repeaters. Following the operation of the relay R990 and the release of the relay R960, no further operation of the repeater control equipment occurs until the control equipment of the connector switch 31 is shifted to its ringing setting to transmit ringing current over the called line. It will be apparent, therefore, that, if the connection is routed to a busy called line, the only relay operation which normally occurs in the repeater control equipment is the operation of the heater start relay corresponding to the assigned link. At most, the operations which may occur are those of resetting the allotter relays corresponding to idle repeaters, and the energization of the heater start relay which corresponds to the first available idle link. In this regard, it will be recalled from the preceding explanation that, in the event the call originating at the substation A is routed to a busy called line, the control equipment of the connector switch 31 is not operated to its ringing setting and, accordingly, all of the control circuits for the assigned repeater are held open. In such case the heater start relay associated with the assigned link, such, for example, as the relay R990, is deenergized and restores in response to the release of the finder switch 29, which switch is released incident to the abandonment of the call at the calling substation.

Assuming that the called line 9 is idle, the control equipment of the connector switch 31 is shifted to its ringing setting to complete a circuit for energizing the relay R720. More specifically, this relay is energized in response to the operation of the cut-through slave relay R490 over a circuit which extends from ground by way of the contacts 315, C286, the contacts 243, C285, the contacts 495, C726 and the winding of R720 to battery. When energized over this circuit, the relay R720 operates to complete a circuit for energizing the start relay R900, this circuit extending from ground by way of the contacts 721, 713 and 722, C653 and the winding of R900 to battery. At its contacts 723, the relay R720 completes a path including the contacts 716 for connecting the marking lead 1205 to the class marking lead C736, whereby a circuit is prepared for energizing the connector or link select relay R1120 individual to the connector switch 31 through which the call is routed. At its contacts 724, the relay R720 prepares a marking path for controlling the gain control selector 44 in accordance with the classification of the called line 9.

When the start relay R900 is energized, it operates to complete a locking circuit for the heater start relay R990 individual to the assigned repeater 45, this circuit extending from ground by way of the contacts 902 and 914, and the winding of R990 to battery. At its contacts 901, the relay R900 completes a circuit for energizing the start relay R1000, this circuit extending from ground by way of the contacts 901 and 912, C919, the contacts 1026 and the winding of R1000 to battery. In this regard it will be understood that if the second available repeater is assigned to the use of the calling line, the allotter relay R910 will occupy its restored position and the allotter relay R920 will be operated so that the start circuit just described is extended to the winding of the start relay individual to the second repeater control circuit. More generally stated, this start circuit may be connected through the upper make and break contact spring combinations of the allotter relays to the start relay individual to any one of the five repeaters, depending upon the setting of the allotter relays.

When energized over the start circuit traced above, the relay R1000 operates to complete, at its contacts 1002, an obvious circuit for energizing the start slave relay R1010. At its contacts 1001, the relay R1000 prepares a locking circuit for itself. At the contacts 1003 to 1009, inclusive, 1001' and 1016 to 1019, inclusive, of the relays R1000 and R1010, test circuits are prepared over which the twelve connector select relays R1120, R1130, R1140, etc., are selectively controlled to associate the allotted repeater 45 with any one of the twelve available links to which this repeater is assigned. The relay R1010, in operating, also closes its contacts 1014 to impress ground potential upon the hold conductor C1152 commonly included in the locking circuits for the connector or link selector relays R1120, R1130, R1140, etc. At its contacts 1013, the relay R1010 prepares the operating circuit for the repeater control circuit release relay R1020. At its contacts 1012, the relay R1010 prepares a locking circuit for the control relay R1030. At its contacts 1011, the relay R1010 completes an obvious path for impressing ground potential upon the timer start lead C1027, thereby to initiate the operation of the timer, not shown, but which is provided for forcibly releasing any one of the repeater control circuits which fails to operate in its intended manner. At its contacts 1015, the relay R1010 completes a circuit for energizing the twelfth relay R1340 of the link and line class finder apparatus 42, whereby the operation of this apparatus is initiated. More specifically, the circuit for energizing the relay R1340 extends from ground by way of the contacts 1015, the start lead C926, the contacts 1353, and the shunt-connected resistor 1379 and upper winding of R1340 to battery. When its upper winding is thus energized, the relay R1340 first operates to close its preliminary make contacts 1345 and thus short-circuit the resistor 1378. Thereafter, the relay R1340 closes its contacts 1346' to complete a circuit including the grounded start conductor C926 for energizing the relay R1350.

The relay R1350, upon operating, locks to the grounded start conductor C926 through its contacts 1356, and completes, at its contacts 1357, a circuit including the resistor 1368 for energizing the lower winding of the slow-acting pulse control relay R1360. At its contacts 1352, the relay R1350 completes a locking circuit for the relay R1340, this circuit extending by way of the grounded start conductor C926, the contacts 1352, C1305, the contacts 1203, C1303, the contacts 1345 and the shunt-connected resistor 1379 and upper winding of R1340 to battery. At its contacts 1351, the relay R1350 prepares a circuit for energizing the release relay R980. At its contacts 1353, the relay R1350 opens the above-traced operating circuit for the relay R1340. At its contacts 1355, the relay R1350 opens the normally completed discharge path which extends from the condenser 1381 through the grounded resistor 1367. At its contacts 1354, the relay prepares the circuits over which the condenser 1381 is successively discharged to energize the pulse-counting relays R1200, R1210, etc.

At its contacts 1352, the relay R1350 also completes a circuit for energizing in parallel the respective upper windings of the first eleven pulse-counting relays of the finder apparatus 42. One branch of this circuit extends from the grounded start conductor C926 by way of the contacts 1352, C1305, the contacts 1343, the resistor 1376 and the shunt-connected resistor 1377 and upper winding of R1330 to battery. A second branch of this circuit extends from the grounded start conductor C926 by way of the contacts 1352, C1305, the contacts 1213, the resistor 1280 and the shunt-connected resistor 1281 and upper winding of R1200 to battery. Similar branches of this circuit, readily apparent from the circuit illustration, extend through the respective upper windings of the other nine of the first eleven counting relays. Due to the resistance values of the resistors 1280, 1282, 1284, etc., included in these branch circuits, the first eleven counting relays are insufficiently energized to operate when these circuits are completed. They are, however, rendered exceedingly fast-to-operate when their respective lower windings are subsequently energized in the manner explained below.

Shortly following the operation of the relay R1350, the slow-acting relay R1360 operates to complete a path including the resistor 1366 and the contacts 1363 for charging the condenser 1381 to the full potential of the exchange battery. At its contacts 1364, the relay R1360 opens the discharge path provided for this condenser. At its contacts 1361, the relay R1360 impresses ground potential upon the pulsing lead C1302. At its contacts 1362, the relay R1360 completes an obvious circuit for energizing the associated pulse control relay R1370. The relay R1370, upon operating, closes its contacts 1371 to complete an obvious path for short-circuiting the lower winding of the relay R1360. The latter relay, accordingly, restores after an interval to open the charging path for the condenser 1381, to open the operating circuit for the relay R1370, to disconnect the pulsing lead C1302 from ground, and to complete a discharge circuit for the condenser 1381 which includes the lower winding of the first pulse-counting relay R1200. The last-mentioned circuit may be traced as extending from the high potential terminal of the condenser 1381 by way of the contacts 1364 and 1354, C1308, the lower winding of R1200, C1304, the contacts 1344 and 1352, and the start conductor C926 to the grounded terminal of the condenser 1381. When this circuit is completed, the condenser 1381 discharges through the lower winding of R1200. When its lower winding is thus energized, the relay R1200 closes its preliminary make contacts 1205 to short-circuit the resistor 1280 and thus increase the energization of its upper winding. After this short-circuiting path is completed, the relay R1200 fully operates to interrupt, at its contacts 1203, the previously traced locking circuit for the relay R1340, causing the latter relay to restore. At its contacts 1204, the relay R1200 prepares the operating circuit for the relay R1210. At its remaining contacts, the relay R1200 performs additional circuit control operations described more fully hereinafter.

The relay R1370, upon restoring in response to the release of the relay R1360, opens its contacts 1371 to interrupt the path short-circuiting the lower winding of the latter relay. The relay R1340, accordingly, reoperates to perform the functions described above. It will be apparent that the two relays R1360 and R1370 continue to interact in the exact manner just described so long as negative battery potential is withheld from the stop conductor C1177. Each time the relay R1360 operates, it completes the above-described path for charging the condenser 1381. Each time this relay restores, it completes a path for discharging this condenser through the lower winding of one of the twelve pulse-counting relays. Thus, when the relay R1360 restores following the operation of the first counting relay R1200, the discharge circuit is transferred to include the lower winding of the second counting relay R1210, the conductor C1308, the contacts 1204, C1305, the contacts 1352 and the grounded start conductor C926. In a similar manner, when the relay R1360 restores after the second counting relay R1210 has been operated, the condenser discharge circuit is extended through the closed make contacts 1214 of the relay R1210 to include the lower winding of the relay R1220. Similarly, with the third counting relay R1220 operated, the condenser discharge circuit is extended through the operated make contacts 1224 of this relay to include the lower winding of the fourth counting relay R1230. Thus, the twelve counting relays are energized and operate in order in response to succeeding cycles of operation of the two pulse control relays R1360 and R1370. It will be noted that each pulse-counting relay is deenergized and restores when the succeeding pulse-counting relay operates. Thus, the relay R1210, upon operating, opens its contacts 1213 to interrupt the locking circuit for the relay R1200. Similarly, the relay R1220, upon operating, opens its contacts 1223 to interrupt the locking circuit for the relay R1210. It will also be noted that, each time one of the pulse-counting relays restores in response to the operation of the succeeding relay, it functions to interrupt the condenser discharge circuit through the lower winding of the succeeding relay. Thus, the relay R1200, upon restoring in response to operation of the relay R1210, opens its contacts 1204 to interrupt the condenser discharge circuit through the lower winding of the latter relay. Similarly, the relay R1210, upon restoring in response to operation of the relay R1220, opens its contacts 1214 to interrupt the discharge circuit through the lower winding of the relay R1220. It is apparent, therefore, that the condenser 1381 is discharged through the respective lower windings of the twelve counting relays one at a time.

As indicated above, the twelve pulse-counting relays continue to operate until the cyclic operation of the two pulse control relays R1340 and R1370 is arrested. Thus, when the twelfth counting relay R1340 operates, it opens its contacts 1343 to interrupt the locking circuit for the eleventh counting relay R1330 and closes its contacts 1344 to reprepare the condenser discharge circuit through the lower winding of the first counting relay R1200. Accordingly, the condenser 1381 is discharged through the lower winding of R1200 in response to the next cycle of operation of the two relays R1360 and R1370. The relay R1200, upon operating, opens its contacts 1203 to interrupt the previously traced locking circuit for the relay R1340 and closes its contacts 1204 to prepare the condenser discharge circuit through the lower windings of the second counting relay R1210. Thus, a second operating cycle of the relays R1200, R1210, etc., is initiated.

The first cycle of operation of the twelve counting relays is utilized for the purpose of selecting the link which has been assigned to the use of the calling line 10. More specifically, each of the twelve counting relays corresponds to a different one of the twelve available finder-connector links, and these relays function individually to control the link or connector select relays R1120, R1130, R1140, etc., over the associated link or connector marking leads C1206, C1216, C1226, etc. In the case under consideration, wherein the finder-connector link illustrated is the first link, the link or connector select relay R1120 is energized during the interval when the counting relay R1200 corresponding to this link occupies its operated position. The circuit for energizing this link select relay is prepared at the contacts 1201 when the counting relay R1200 operates and is completed when the pulse control relay R1360 next operates to impress ground potential upon the pulsing lead C1302. More specifically, the operating circuit for the relay R1120 may be traced as extending from ground by way of the contacts 1361, C1302, the contacts 1202, C1165, the contacts 1003 and 1043, C1158, the upper winding of R1120, the contacts 1122', C736, the contacts 716 and 723, C1205, the contacts 1201, C1301 and the resistor 1337 to battery. As indicated by the bracketed conductors C1185 to C1188, inclusive, and C1190 to C1193, inclusive, and by the conductors C1159 and C1161, respectively extending to the sixth and twelfth connector select relays R1130 and R1140, similar test circuits are provided over which the other link or connector select relays R1130, R1140, etc., are energized during a first cycle of operation of the impulse-counting relays when the links respectively corresponding to these select relays are assigned for use. Thus, if the sixth link, for example, is assigned to the use of a calling line, a circuit is completed for energizing the sixth select relay R1130 under the joint control of the sixth counting relay R1250 and the pulse control relay R1360. This circuit may partially be traced as extending from ground by way of the contacts 1361, C1302, the contacts 1252, C1170, the contacts 1008 and 1044', C1159, the upper winding of R1130, the contacts 1132', the contacts of the auxiliary relays in the sixth link which correspond to the relays R710 and R720 of the link illustrated, C1256, the contacts 1251, C1301 and the resistor 1337 to battery. A similar test circuit is also completed for the twelfth select relay R1140 when the twelfth link corresponding to this select relay is assigned for use, this circuit extending from ground by way of the contacts 1361 and 1342, C1176, the contacts 1019 and 1077, C1161, the upper winding of R1140, the contacts 1142', the contacts of the auxiliary relays in the twelfth link which correspond to the relays R710 and R720 of the link illustrated, C1346, the contacts 1341 and the resistor 1337 to battery. From the above explanation it will be clear that, in any case where a link is assigned to the use of a calling line, the corresponding select relay of the repeater control circuit associated with the assigned repeater is caused to operate during the first cycle of operation of the counting relays embodied in the link and line class finder apparatus 42. It will further be understood that these counting relays are operatively associated with the select relays of the assigned repeater control circuit through operation of the start and start slave relays embodied in this circuit. Thus, the leads C1165 to C1170, inclusive, are multipled to the corresponding make contacts of the start and start slave relays embodied in each of the repeater control circuits. Similarly, the marking lead C736 individual to the link illustrated and the other marking leads individual to the other eleven links are multipled to the corresponding armatures of the six corresponding select relays in each of the six repeater control circuits.

In the case under consideration, wherein the link illustrated is assigned to the use of the calling line 11, the relay R1120 corresponding thereto is energized over the test circuit traced above. In operating, the relay R1120 closes its preliminary make contacts 1124' to complete a locking circuit for itself which extends by way of the grounded hold conductor C1152, the contacts 1124', the lower winding of R1120, C1154, the contacts 1086, C1155 and the upper winding of R1100 to battery. After this circuit is completed, the relay R1120 opens its contacts 1122' to interrupt its operating circuit as traced above. At its contacts 1123', the relay R1120 prepares a point in the common portion of the operating or test circuits over which the relays of the gain control selector 44 are selectively energized. At its contacts 1129, the relay R1120 prepares a circuit for energizing the relay R700. At its contacts 1121', the relay R1120 completes a circuit including the grounded hold conductor C1152 and the conductor C738 for energizing the auxiliary relay R710. At its contacts 1121 to 1128, the relay R1120 prepares circuits for operatively connecting the line terminals of the repeater 45 to the calling and called ends of the connection, and for connecting the line-balancing networks individual to the calling and called lines to the calling and called hybrid systems of the repeater.

The relay R710, upon operating, locks to ground over a path including the contacts 712 and 721, and in so doing completes a multiple path for impressing ground potential upon the hold conductor C1152, this multiple path including the contacts 721 and 712, C738 and the contacts 1121'. Thus, a multiple locking circuit is completed for the two relays R1120 and R1100. At its contacts 713, the relay R710 opens the previously traced operating circuit for the allotter start relay R900, causing the latter relay to restore. At its contacts 714, the relay R710 prepares a locking circuit for the relay R700, and completes a path including the contacts 703 for impressing ground potential upon the busy signal supervisory lead C751. At its contacts 716, the relay R710 opens a further point in the previously traced operating circuit for the select relay R1120. At its contacts 711, 715 and 717, the relay R710 further prepares the test circuits over which the relays of the gain control selector 44 are selectively energized.

The relay R1100 operates when its upper winding is energized in series with the lower winding of the select relay R1120. In operating, this relay completes a locking circuit for the start relay R1000, this circuit extending from ground by way of the contacts 1101, C1150, the contacts 1031, 1001 and 1026, and the winding of R10000 to battery. Thus, the relay R1000 is prevented from releasing in response to the restoration of the allotter start relay R900. At its contacts 1102, the relay R1100 completes a circuit including the conductor C1156 for energizing the transfer relay R1040. At its contacts 1103, the relay R1100 completes the prepared circuit for energizing the relay R1360 to arrest the operation of the finder apparatus 42. This stop circuit extends from ground by way of the upper winding of R1360, C1177, the contacts 1019' and 1078, C1162, the contacts 1103 and the lower winding of R1100 to battery, and when completed serves to maintain the relay R1360 in its operated position independently of the relay R1370. Thus, the sequential operation of the counting relays embodied in the finder apparatus 42 is arrested.

The transfer relay R1040, upon operating, closes its contacts 1041 to complete an obvious circuit for energizing its slave relay R1070. At its contacts 1043, 1045, 1047, 1049, 1042', 1044' and 1046', the relay R1040 opens points in the respective operating circuits for the first seven connector or link select relays of the repeater control circuit 41. At its contacts 1042, 1044, 1046, 1048, 1041' and 1043', the relay R1040 further prepares the operating circuits for the six relays of the gain control selector 44. At its contacts 1045', the relay R1040 prepares a circuit for energizing the relay R1030. The relay R1070, upon operating, closes its contacts 1071 to prepare locking circuits for the relays R1030 and R1080. At its contacts 1072, 1073, 1074, 1075 and 1077, the relay R1070 further opens the operating circuits for the remaining five link or connector select relays of the repeater control circuit 41. At its contacts 1076, the relay R1070 prepares the operating circuit for the relay R1050. At its contacts 1078, the relay R1070 opens the previously traced stop circuit over which the upper winding of the pulse control relay R1360 is energized in series with the lower winding of the transfer relay R1100. When this stop circuit is interrupted, the relay R1360 restores, whereby the cyclic operation of the relay R1360 and the relay R1370, and the step-by-step operation of the pulse-counting relays in the finder apparatus 42 is again started. Thereafter, and when the twelfth counting relay R1340 and the pulse control relay R1360 are concurrently operated, the operating circuit for the relay R1050 is completed. This circuit extends from ground by way of the contacts 1361 and 1342, C1176, the contacts 1019, 1076 and 1052, and the winding of R1050 to battery. Upon operating, the relay R1050 locks to ground over a path including the contacts 1051, C1156 and the contacts 1102. After this locking path is completed, the relay R1050 opens its contacts 1052 to interrupt its operating circuit as traced above. At its contacts 1054, the relay R1050 completes an obvious path for impressing ground potential upon the hold conductor C1163, thereby to prepare the locking circuits for the gain control selector relays R1400, R1410, R1420, R1430, R1440 and R1450. At its contacts 1053, the relay R1050 further prepares the operating circuit for the control relay R1030.

The pulse control relays R1360 and R1370, and the counting relays of the finder apparatus 42 continue to operate following the operation of the relay R1050. The operating cycle of the counting relays which immediately follows the operation of the relay R1050, namely, the second cycle, is utilized for the purpose of setting the relays of the gain control selector 44 in accordance with the classification of the calling and called lines 11 and 9, respectively. In the case under consideration, the calling line 11 is assumed to be in the first class and, accordingly, the lockout relay R110 of the line circuit 10 is arranged to connect the extra control conductor C103 to the first class marking lead C179 when the line 11 is occupied with a call. The called line 9, on the other hand, is assumed to have signal current transmission characteristics such that it falls in the fifth line class. Accordingly, the lockout relay R510 of the line circuit 34 associated with this line is arranged to connect the extra control lead C535 to the fifth class marking lead C542. With the lines 11 and 9 in these two classes, a circuit is completed for energizing the first gain control selector relay R1400 when the first counting relay R1200 and the pulse control relay R1360 are concurrently operated during the second cycle of operation of the pulse-counting relays. This circuit extends from ground by way of the contacts 1361, C1302, the contacts 1202, C1165, the contacts 1003 and 1042, C1179, the upper winding of R1400, C1178, the contacts 1037, C1157, the contacts 1123', C736, the contacts 715, 706, 702 and 711, C175, the contacts 138, the wiper 163, C103, the contacts 115, C179, the contacts 1201, C1301 and the resistor 1337 to battery. When thus energized, the relay R1400 locks to the grounded hold conductor C1163 through its preliminary make contacts 1402. At its contacts 1401, the relay R1400 completes a multiple locking circuit for the relays R1100 and R1120, this circuit extending by way of the grounded hold conductor C1152, the contacts 1124', the lower winding of R1120, C1154, the contacts 1451 and 1401, C1155 and the upper winding of R1100 to battery.

As the counting relays of the finder apparatus 42 continue to operate following operation of the gain control selector relay R1400, a circuit is completed for energizing the gain control selector relay R1440 corresponding to the fifth class of lines. More specifically, the operating circuit for the relay R1440 is completed when the relays R1240 and R1360 are concurrently operated during the second cycle of operation of the finder apparatus counting relays. This circuit extends from ground by way of the contacts 1361, C1302, the contacts 1242, C1169, the contacts 1007 and 1041', C1183, the upper winding of R1440, C1178, the contacts 1037, C1157, the contacts 1123', C736, the contacts 715, 706, 717 and 724, C727, the contacts 493 of the operated cut-through slave relay in the connector switch 31, the extra control wiper of this switch, C535, the contacts 511, C542, the contacts 1241, C1301, and the resistor 1337 to battery. Upon operating, the relay R1440 locks to the grounded hold conductor C1163 through its preliminary make contacts 1442.

From the above explanation it will be understood that the wiring of the line circuits terminating the lines falling in different classes is different, depending upon the signal current transmission characteristics of the associated lines. More specifically, the lockout relay of each line circuit is arranged to connect the extra control conductor of the line circuit to the one of the six line class leads C179, C1217, C1227, C1237, C542 and C656 which corresponds to the line class in which the associated line falls. Thus, the enumerated six leads, which are individually included in the control circuits for the relays R1400, R1410, R1420, R1430, R1440 and R1450, individually correspond to the six different classes of lines. With this wiring arrangement it will be understood that if the line 11, for example, were classified in the third line class instead of the first line class, the relay R1420 would be energized during the second cycle of operation of the finder apparatus counting relays in lieu of the first gain control selector relay R1400. Alternatively, if this line were included in the fourth line class, the relay R1430 would be energized during the second cycle of operation of the counting relays embodied in the finder apparatus 42.

The operation of the impulse-counting relays embodied in the finder apparatus 42 continues until all six of the line class leads C179, C1217, C1227, C1237, C542 and C656 have been connected to the battery pulsing lead C1301. Thereafter, and when the seventh counting relay R1260 is concurrently operated with the pulse control relay R1360, the prepared operating circuit for the relay R1030 is completed, this circuit extending from ground by way of the contacts 1361, C1302, the contacts 1262, C1171, the contacts 1009, 1045' and 1053, and the upper winding of R1030 to battery. Upon operating, the relay R1030 locks to ground over paths including the contacts 1012 and 1071 in parallel, and the contacts 1032. At its contacts 1034, the relay R1030 disconnects the repeater marking lead C918 from ground and, in so doing, interrupts the locking circuit for the allotter relay R910, causing the latter relay to restore. The repeater 45 is thus marked as busy in the allotter circuit 40. At its contacts 1035, the relay R1030 completes an alternative circuit for energizing the relay R1360, this circuit extending from ground by way of the upper winding of R1360, C1177, the contacts 1019' and 1035, and the lower winding of R1030 to battery. When this circuit is completed, the relay R1360 remains in its operated position, whereby the operation of the counting relays embodied in the finder apparatus 42 is arrested. At its contacts 1038, the relay R1030 completes a circuit including the lead C927 for maintaining the heater start relay R990 energized. At its contacts 1037, the relay R1030 opens a point in the common portion of the above-traced test circuits over which the relays of the gain control selector 44 are respectively energized. At its contacts 1036, the relay R1030 prepares the operating circuit for the relay R1080. At its contacts 1031, the relay R1030 opens the locking circuit for the start relay R1000, thereby to cause the sequential release of the relays R1000 and R1010 in the order named. At its contacts 1033, the relay R1030 completes a circuit for energizing the relay R700 of the connector switch 31, this circuit extending from ground by way of the contacts 1025, 1033 and 1084, C1151, the contacts 1129, C737, the contacts 708 and the winding of R700 to battery.

The relays R1000 and R1010, upon restoring, disconnect the marking leads C1165 to C1176, inclusive, from the repeater control circuit 41 individual to the repeater 45. At its contacts 1015, the relay R1010 disconnects the start lead C926 from ground, thereby to cause the deenergization and release of the relay R1350 and any operated one of the twelve counting relays embodied in the finder apparatus 42. The relay R1350, upon restoring, opens its contacts 1357 to interrupt the operating circuit for the pulse control relay R1360. At its contacts 1019', the relay R1010 opens the above-traced circuit for energizing the upper winding of the relay R1360 and the lower winding of the relay R1030 in series. Thus, the two pulse control relays R1360 and R1370 are caused sequentially to restore in the order named. When these relays restore, the link and line class finder apparatus 42 is fully released.

The relay R1010, in releasing, also opens its contacts 1012 to interrupt one of the multiple locking circuits for the relay R1030, and opens its contacts 1014 to interrupt one of the multiple paths over which ground potential is impressed upon the hold conductor C1152. At its contacts 1011, the relay R1010 disconnects the timer start lead C1027 from ground. At its contacts 1013, the relay R1010 opens the prepared operating circuit for the control circuit release relay R1020. The relay R1000, upon restoring, opens its contacts 1001 further to interrupt its own locking circuit, and opens its contacts 1009 to interrupt the previously traced operating circuit for the relay R1030. Following the release of the two relays R1000 and R1010, the equipment common to the repeaters and their associated control circuits is fully released. In this regard it will be noted that when the allotter relay R910 restores, the heater start lead C178 is connected through the break contacts 915 and the make and break contacts of one or more of the other allotter relays to the heater start relay individually corresponding to the first idle repeater, so that this repeater will be conditioned for use when another call is initiated.

The relay R700, upon operating in response to operation of the relay R1030, first locks to ground over a path including its preliminary make contacts 704 and the contacts 714. After this locking circuit is completed, the relay R700 opens its contacts 708 to interrupt its operating circuit as traced above. At its contacts 703, the relay R700 disconnects the busy signal supervisory lead C751 from ground. At its contacts 702 and 706, the relay R700 further opens the operating circuits for the relays of the gain control selector 44. At its contacts 707, the relay R700 further prepares the series operating circuit for the repeater cut-in relay R630 of the connector switch 31 and the cut-in relay R1110 of the control circuit 41. At its contacts 705, the relay R700 completes the prepared operating circuit for the relay R1080, this circuit extending from ground by way of the contacts 705 and 715, C736, the contacts 1123', C1157, the contacts 1036, 1082 and 1022, and the winding of R1080 to battery. When thus energized, the relay R1080 first locks to ground over a path including its preliminary make contacts 1083 and the contacts 1071 and 1022. After this locking circuit is completed, the relay R1080 opens its operating circuit at the contacts 1082. At its contacts 1081, the relay R1080 completes an obvious circuit for energizing the plate voltage control relay R1060. At its contacts 1084 and 1085, the relay R1080 disconnects the check and switch-through lead C1151 from ground, and further prepares the series operating circuit for the cut-in relay R1110 of the control circuit 41 and the cut-in relay R630 of the connector switch 31. At its contacts 1086, the relay R1080 opens one of the multiple locking circuits for the series counting relays R1120 and R1100. The two last-mentioned relays are, however, held energized over the previously traced locking circuit which extends from the grounded hold lead C1152 through the contacts 1451 and 1401, and the upper winding of R1100 to battery. At its contacts 1087, the relay R1080 completes an obvious path for impressing ground potential upon the gain control lead C1160. The relay R1060, upon operating, connects the positive terminal of the plate voltage source 1063 to the plate supply lead C1062, whereby the positive potential of this source is impressed upon the anodes of the amplifier tubes embodied in the amplifiers 46 and 49. These two amplifiers are thus rendered active to transmit signal currents in the respective two directions of transmission.

The lead C1160 is commonly included in the operating circuits for the gain control relays R810, R820, R830, R840 and R850. Accordingly, when this lead is grounded, one or more of the enumerated relays is energized, depending upon the setting of the relays in the gain control selector 44. In the case under consideration, the relays R1400 and R1440 of the gain control selector 44 are operated and, accordingly, the grounded lead C1160 is connected to the gain control marking leads C1460 and C1461 only. These leads extend to the terminals of the gain control relays R810 and R820, so that these two relays are energized and operate. More specifically, the operating circuit for the relay R810 extends from the grounded lead C1160 by way of the contacts 1453 and 1404, C1460 and the winding of R820 to battery. The operating circuit for the relay R810 extends by way of the grounded lead C1160, the contacts 1453 and 1405, C1461 and the winding of R810 to battery. It will be noted that with only the relays R1100 and R1420 of the gain control selector 44 operated, the remaining marking leads C1462, C1463 and C1464 are disconnected from the grounded lead C1160. The two relays R810 and R820, upon operating, alter the circuit arrangement of the four-terminal loss network 32b, so that the signal current gain through the west-east repeater 49 is reduced from a normal value of 16 decibels to a value of 10 decibels. In a similar manner, the two relays R810 and R820 alter the setting of the loss network 32a, so that the signal current gain through the repeater 45 in the east-west direction and, more particularly, through the amplifier 46, is reduced from a normal value of 16 decibels to a value of 10 decibels.

From the above explanation it will be apparent that the two amplifiers 46 and 49 are normally adjusted to provide a gain of 16 decibels therethrough, and that the gain through these amplifiers is reduced, in accordance with the setting of the gain control selector 44, to introduce the required amount of signal current gain into a connection in which the repeater 45 is included to compensate for the signal current loss over the connected calling and called lines. It will further be apparent that the network 32b is one well-known embodiment of the series shunt type of loss network. Thus, one or more of the series connected resistors 825 to 829, inclusive, is arranged to be included in one side of the signal current channel extending from the output terminals of the west-east amplifier 49 to the corresponding set of line terminals of the hybrid system 48. Similarly, one or more of the series connected resistors 845 to 849 is arranged to be included in the other side of the signal current channel extending from the output terminals of the west-east amplifier 49 to the indicated set of line terminals of the hybrid system 48. The series connected resistors 815 to 819 are arranged to be connected across the signal current channel just described on the input side of the network 32b. The remaining series connected resistors 835 to 839, inclusive, are arranged to be connected across the indicated signal current channel on the output side of the network 32b. Thus, with the relays R810 and R820 operated, the three serially related resistors 847, 848 and 849 are inserted in the side of the signal current channel which includes the conductors C732 and C735; the serially related resistors 827, 828 and 829 are included in the other side of the channel, namely, that which includes the conductors C733 and C734; a shunt path including the serially related resistors 815, 816 and 817 is connected across the channel between the conductors C732 and C733; and a second shunt path including the series connected resistors 835, 836 and 837 is connected across the channel between the conductors C734 and C735. Thus, a 6 decibel loss is introduced in the east-west channel of the repeater 45 between the output terminals of the west-east amplifier 49 and the associated line terminals of the hybrid system 48.

More generally considered, the manner in which the signal current gain through the repeater 45 is controlled by the gain control selector 44 and the associated gain control relays R810, R820, R830, R840 and R850 is clearly apparent from the following table considered in light of the above explanation:

| Repeater gain | Operated gain control selector relays | Marked gain control leads | Operated gain control relays | Number of series pad arms included in signal channel | Number of shunt pad arms across signal channel |
|---|---|---|---|---|---|
| 16 db | R1400 | All | All | None | None. |
| 14 db | R1400 and R1410 or R1400 and R1420 | C1460, C1461, C1463 and C1464. | R810, R820, R830 and R840. | One | Five. |
| 12 db | R1410 or R1420 or R1410 and R1420 | C1460, C1461 and C1464. | R810, R820 and R830. | Two | Four. |
| 10 db | R1400 and R1430 or R1420 and R1430 or R1400 and R1440. | C1460 and C1461 | R810 and R820 | Three | Three. |
| 9 db | R1410 and R1430 | C1461 | R810 | Four | Two. |
| 6 db | R1420 and R1440 or R1410 and R1440 | None | None | Five | One. |
| None, repeater not required. | R1450 and any other relay or R1450 or R1430 or R1440 or R1430 and R1440. | None | None | None | None. |

From the above table it will be apparent that for maximum gain through the repeater 45, all of the gain control relays R810, R820, etc., are energized, so that the conductors C732 and C735 are directly connected together, the conductors C733 and C734 are directly connected together, and no shunt resistance is connected across the channel. A similar circuit arrangement prevails in the loss network 32a when all of the gain control relays are energized. On the other hand, for minimum gain through the repeater, namely, a gain of 6 decibels, none of the gain control relays are operated, so that the shunt legs of the networks 32a and 32b are reduced to minimum resistance, and the series legs of the networks are increased to a maximum resistance. The manner in which the relays of the circuit wiring between the marking contacts of the relays comprising the gain control selector.

After the gain through the repeater 45 has been determined in the manner explained above, this repeater is conditioned to be included in the established connection. The actual insertion of this repeater in the connection set up between the calling line 11 and the called line 9 is under the control of the ring cut-off relay R420. More specifically, when the call is answered at the called substation to cause the sequential operation of the relays R350, R340 and R420 in the manner previously explained, the prepared series operating circuit for the cut-in relay R630 of the connector switch 31 and the cut-in relay R1110 of the control circuit 41 is completed. This circuit may take either of two forms, depending upon whether the called line 9 is of the loop or simplex type. In the event the line 9 is arranged for simplex control of the line and link circuit equipment, the call simplex relay R210 will occupy its operated position at the time the call is answered and, accordingly, the circuit for energizing the two cut-in relays R630 and R1110 may be traced as extending from ground by way of the contacts 224 and 211, C273, the contacts 356 and 311, C407, the contacts 464, C406, the contacts 372, C404, the contacts 462 and 422, C405, the resistor 659, the winding of R630, C655, the contacts 707, C737, the contacts 1129, C1151, the contacts 1085, C1153 and the winding of R1110 to battery. On the other hand, if the called line is arranged for loop circuit control of the line and link circuit equipment, the circuit for energizing the two cut-in relays R630 and R1110, when completed, extends from ground by way of the contacts 224, C275, the contacts 362 and 311, C407, the contacts 464, C406, the contacts 372, C404, the contacts 462 and 422, C405, the resistor 659, the winding of R630, C655, the contacts 707, C737, the contacts 1129, C1151, the contacts 1085, C1153 and the winding of R1110 to battery. When either of these two circuits is completed, the cut-in relay R630 partially operates to close its preliminary make contacts 633' and thus complete a path including the conductor C652 and the contacts 701 for short-circuiting the resistor 659, thereby to increase the energization of the two series connected relays R630 and R1110. When thus fully energized, the relays R630 and R1110 jointly operate to substitute the repeater 45 for the repeating coil 600 in the established connection between the calling line 11 and the called line 9. More specifically, the relay R630, upon operating, opens its contacts 632 and 636 to disconnect the line terminals of the repeating coil windings 601 and 602 from the link talking conductors C173 and C174. At its contacts 638 and 636', the relay R630 similarly disconnects the repeating coil windings 603 and 604 from the link talking conductors C297 and C293. At the contacts 632, 636, 638 and 636', the paths normally short-circuiting the retard coils 606, 605, 607 and 608 are also respectively interrupted. At its contacts 631, 635, 637 and 637', the relay R630 completes obvious paths for short-circuiting the repeating coil windings 601, 602, 603 and 604, respectively. It will be apparent that after the above-described switching operations are performed, the retard coils 607 and 608 are respectively substituted for the repeating coil windings 604 and 603 in the loop or simplex circuit extending to the called substation B, whereby the continued energization of one or both of the back-bridge relays R355 and R360 is maintained. It will also be apparent that the retard coils 605 and 606 are respectively substituted for the repeating coil windings 602 and 601 in the loop or simplex circuit extending to the calling substation A, thereby to provide direct current paths over which the energization of one or both of the relays R250 and R350 is maintained.

The relay R1110, upon operating, closes its contacts 1111 and 1112 to connect the calling line terminals of the hybrid system 48 to the link talking conductors C173 and C174. At its contacts 1115 and 1116, the relay R1110 connects the called line terminals of the repeater 45 to the link talking conductors C297 and C293. At its contacts 1113 and 1114, the relay R1110 connects the line-balanced network comprising the resistor 27 and the condenser 23 across the line-balancing terminals of the calling hybrid system 48. This balancing circuit, when established, may be traced as extending from the upper balancing terminal of the hybrid system 48 by way of C741, the contacts 1113 and 1123, C176, the wiper 165, C105, the condenser 23, the resistor 27, C106, the wiper 166, C177, the contacts 1124 and 1114, and C742 to the opposite line-balancing terminal of the hybrid system 48. The resistance and capacitance values of the circuit elements 27 and 23 are proportioned to balance the resistance and capacitance components of the equivalent impedance of the line 11 so that the hybrid system 48 is substantially balanced at all frequencies within the audio band. Thus undesired coupling through the hybrid system 48 between the two channels of the repeater 45 is prevented. At its contacts 1117 and 1118, the relay R1110 connects the balancing circuit individual to the called line 9 and comprising the resistor 547 and the condenser 546 across the line-balancing terminals of the called hybrid system 47. This balancing circuit may be traced as extending from the upper balancing terminal of the hybrid system 47 by way of C748, the contacts 1117 and 1127, C1171, the upper network wiper of the connector switch 31, the condenser 546, the resistor 547, the lower network wiper of the connector switch 31, C1172, the contacts 1128 and 1118, and C747 to the other line-balancing terminal of the hybrid system 47. The resistance and capacitance values of the circuit elements 547 and 546 are proportioned to balance the resistance and capacitance components of the equivalent impedance of the called line 9 so that the called hybrid system 47 is substantially balanced at all frequencies within the audio range. Thus, undesired coupling through the hybrid system 47 between the two channels of the repeater 45 is prevented.

Following the relay switching operations described above, signal current transmission channels are established through the repeater 45 for transmitting signal currents in the east-west and west-east direction. More particularly, the signal current channel over which signal currents are transmitted from the calling substation A to the called substation B includes the line conductors C101 and C102, the wipers 161 and 162, the contacts 136 and 137, C173 and C174, the contacts 1122 and 1121, the contacts 1112 and 1111, C740 and C739, the hybrid system 48, the east-west amplifier 46, C728 and C729, the loss network 32a, C730 and C731, the hybrid system 47, C745 and C746, the contacts 1115 and 1116, the contacts 1125 and 1126, C293 and C297, the contacts 373 and 375, C553 and C556, the contacts 433 and 435, the contacts 498 and 499, the line wipers of the connector switch 31, and the conductors C537 and C538. The west-east signal current channel is similar to that described above but extends from the link talking conductors C297 and C293 to the link talking conductors C173 and C174 over a channel portion which includes the contacts 1125 and 1126, the contacts 1115 and 1116, C745 and C746, the hybrid system 47, the west-east amplifier 49, C732 and C733, the loss network 32b, C734 and C735, the hybrid system 48, C739 and C740, the contacts 1111 and 1112, and the contacts 1121 and 1122. As indicated previously, if desired, the repeater 45 may be equipped with voice control switching means of conventional design for rendering the east-west repeater 46 inactive when signal currents are traversing the west-east amplifier 49, and for rendering the latter amplifier inactive when signal currents are traversing the east-west amplifier 46, thereby to prevent echoes and regenerative howling of the repeater 45. In the arrangement illustrated, wherein the hybrid systems 47 and 48 are utilized as the termini for the repeater 45, the condensers 613, 614, 615 and 616 are not included in the talking leads C173, C174, C297 and C293. In the event, however, a capacitance type of talking bridge is utilized in the repeater 45, the talking conductors C173, C174, C297 and C293 are opened, and the condensers 613, 614, 615 and 616 are respectively inserted therein.

As indicated previously, the repeater is excluded from the established connection in response to a connection release operation performed at the called substation. Thus, if the answering party at the substation B restores the receiver provided at this substation to its supporting hook or cradle to interrupt the previously traced circuit for energizing the relay R355, or this relay and the relay R360 in series, one or both of these relays restores so that the previously traced series operating circuits for the cut-in relays R630 and R1110 are interrupted at the contacts 356 and 362. The relay R1110, in releasing, opens its contacts 1111 to 1118, inclusive, to exclude the repeater 45 from the established communication connection. The relay R630, in releasing, substitutes the repeating coil 600 in the connection for the repeater 45. The manner in which this substitution is accomplished will be clearly apparent from the preceding explanation. Obviously, if the answering party at the substation B again removes the receiver provided at this substation from its supporting hook or cradle to recomplete the operating circuit for one or both of the back-bridge relays R355 and R360, these two relays reoperate to cause the reoperation of the two cut-in relays R630 and R1110, whereby the repeater 45 is again substituted for the repeating coil 600 in the established communication connection extending between the substations A and B.

*Repeater not required*

In the event the signal current transmission characteristics of one or both of the calling and called lines are such that voice current amplification for satisfactory conversation over the connected lines is not required, the assigned repeater control circuit 41 and the associated repeater 45 are automatically released under the control of the gain selector 44 incident to the classification of the calling and called lines. A case of this character most frequently arises when one of the calling and called lines is extremely short and the conductors thereof are well insulated from each other and from ground, so that the signal current transmission efficiency of the line is high. A line of this character is classified in the class to which the relay R1450 of the gain control selector 44 and the relay R1240 of the finder apparatus 42 correspond. Another instance in which no voice current amplification may be required is where two lines, both possessed of reasonably good signal current transmission characteristics are connected together as the calling and called lines of an established connection. Lines of this character are included in the line classes which respectively correspond to the gain control selector relays R1430 and R1440, and to the relays R1230 and R1240 of the finder apparatus 42.

In any one of the cases mentioned in the preceding paragraph, the finder apparatus 42, during its second cycle of operation to find the line classes in which the calling and called lines of the connection are included, causes the operation of the relay R1450 or one or both of the relays R1430 and R1440, depending upon the classification of the calling and called lines. The manner in which these three relays are selectively energized under the control of the finder apparatus 42, and in accordance with the line classification of the calling and called lines, will be clearly apparent from the preceding explanation. After the line classification is completed, the relay R700 is caused to operate in the manner pointed out above. This relay, upon operating, completes the previously traced operating circuit for the relay R1080 of the control circuit 41. The relay R1080, upon operating, opens its contacts 1086 to interrupt the previously traced locking circuit for the transfer relay R1100 and the operated connector or link select relay R1120. In this regard it will be noted that with the relay R1450 of the gain control selector 44 operated, the previously traced auxiliary locking circuit for the two relays R1100 and R1120 is held open at the contacts 1451. Similarly, with either or both of the gain control selector relays R1430 and R1440 operated, and with the relays R1400, R1410 and R1420 restored, this auxiliary locking circuit is held open at the contacts 1401, 1411, 1421, 1431 and/or 1441. Thus, in any case where the gain control selector relay R1450 is operated, the operated relays R1120 and R1100 are deenergized and restore in response to the operation of the relay R1080. Similarly, in any case where one or both of the two gain control selector relays R1330 and R1440 are operated, and none of the three relays R1400, R1410 and R1420 are operated, the locking circuit for the relays R1100 and R1120 is opened in response to the operation of the relay R1080.

The relay R1120, upon restoring, opens its contacts 1121 to 1129, inclusive, and 1121' to 1123', inclusive, to disassociate the repeater 45 and the repeater control circuit 41 from the connector switch 31 and, in so doing, interrupts the previously traced operating circuits for the auxiliary relays R700 and R710 of the connector switch 31. These two relays and the other auxiliary relay R720 are, however, held energized under the control of the cut-through slave relay R490 and the hold slave relay R310, until the connector switch 31 is released, at which time they are deenergized and restore in an obvious manner. The relay R1100, upon restoring, opens its contacts 1102 to interrupt the operating and locking circuits for the relays R1040 and R1050. The relay R1040, upon restoring, opens the operating circuit for its slave relay R1070. The relay R1070, upon restoring, opens its contacts 1071 to interrupt the locking circuits for the relays R1030 and R1080. The relay R1030, upon restoring, opens its contacts 1038 to interrupt the locking circuit for the heater start relay R990. When the relay R990 restores the cathode heaters of the vacuum tubes included in the amplifiers 46 and 49 are deenergized. The relay R1080, upon restoring, opens its contacts 1087 to disconnect the gain control lead C1160 from ground, and thus interrupt the common portion of the operating circuits for the gain control relays R810, R820, R830, etc. At its contacts 1081, the relay R1080 opens the operating circuit for the plate voltage control relay R1060. The relay R1050, upon restoring, opens its contacts 1054 to interrupt the common portion of the locking circuits for the relays of the gain control selector 44, thereby to cause the deenergization and release of the operated relays in this selector. Following the release of the relays R1120, R1100, R1030, R1040, R1050, R1060, R1070 and R1080, one or two of the relays in the gain control selector 44, and the operated relays of the gain control circuit 32, the repeater control circuit 41 is fully restored to normal. In this regard it will be noted that when the relay R1030 restores, it causes its contacts 1034 to impress ground potential upon the marking lead C918, thereby to identify the repeater 45 and its associated control circuit 41 as idle in the allotter circuit 40.

*Release*

The release of the repeater control circuit 41 is normally under the control of the auxiliary relays R700, R710 and R720 embodied in the connector switch 31. More specifically, when the above-described connection set up between the substations A and B is cleared out at the calling substation A, the connector switch 31 is caused to release in the manner previously described. During the release of the control equipment of this switch, and when the hold slave relay R310 restores to disconnect the release conductor C286 from ground, the relay R720 is deenergized and restores. Upon restoring, the relay R720 opens its contacts 721 to interrupt the locking circuit for the relay R710. At its contacts 721, the relay R720 also opens the previously traced path over which ground potential is impressed upon the hold lead C1152, thereby to cause the deenergization and release of the relays R1120 and R1100. The relay R710, upon restoring, opens its contacts 714 to interrupt the locking circuit for the relay R700. The relay R700 now restores.

The relay R1100, upon restoring, opens its contacts 1102 to interrupt the previously traced locking circuits for the relays R1040 and R1050. The relay R1040, upon restoring, opens its contacts 1041 to interrupt the operating circuit for the relay R1070. The relay R1070 now releases to open its contacts 1071 and thus interrupt the previously traced locking circuits for the relays R1030 and R1080. The relay R1080, in releasing, opens the operating circuit for the plate voltage control relay R1060 and disconnects the gain control lead C1160 from ground, thereby to cause the deenergization and release of the two gain control relays R810 and R820. The relay R1050, upon restoring, opens its contacts 1054 to disconnect the lead C1163 from ground and thus cause the deenergization and release of the gain control selector relays R1400 and R1440. Thus, the repeater control circuit 41 is fully restored to normal.

It will be understood that if the connection is cleared out at the calling substation A prior to its release at the called substation B, the cut-in relays R630 and R1110 are held operated until the hold slave relay R310 of the connector switch 31 restores. When this relay restores, the operating circuit for the two cut-in relays R630 and R1110 is interrupted at the contacts 311, causing these two relays to release. In the event the connection set up by way of the finder-connector link 20, 31 is extended to the operator's position 36 in the distant exchange 5, and the connection is released at the calling substation prior to its release at the operator's position 36, the repeater control circuit 41 is held operated under the control of the hold slave relay R310 so long as the connector switch 31 is maintained in its operated condition. The manner in which this control circuit is released, when the connection is cleared out at the operator's position 36 to cause the release of the connector switch 31, is exactly the same as set forth above.

As indicated previously, if the connection extended to the connector switch 31 is routed through this switch to a busy called line, the cut-through slave relay R490 is not operated incident to the handling of the call. Accordingly, in such case no operation of the relay equipment embodied in the repeater control circuit 41 and the link and line class finder apparatus 42 occurs. This is true for the reason that with the cut-through relay R490 in its restored position, no circuit is provided for energizing the auxiliary relay R720, and hence this relay is prevented from operating to complete the operating circuit for the start relay R900. The link and line class finder apparatus 42 and the repeater control circuit 41 are also prevented from operating incident to the setting up of a reverting call connection between two substations served by the same multiparty line. In this regard it will be noted that the reverting call relay R240 is operated to open its contacts 243 and thus prevent the energization of the relay R720 prior to the operation of the cut-through slave relay R490 to prepare the operating circuit for the relay R720. Accordingly, the relay R720 is at no time energized during the setting up of a reverting call connection, and hence the start relay R900 of the allotter circuit 40 is prevented from operating to initiate the operation of the finder apparatus 42 and the repeater control circuit 41.

Assuming that the call routed to the connector switch 31 is abandoned before the relay R1120 is caused to operate in the manner pointed out above to associate the repeater control equipment of the circuit with the connector switch 31, the relay R720 is the only auxiliary relay of the connector switch 31 which is operated, and the start relays R1000 and R1010 are the only operated relays of the control circuit 41 at the time the release of the connection is initiated. In such case the relay R720 is deenergized and restores to interrupt the operating circuit for the start relay R900 in response to the removal of ground potential from the release conductor C286 under the control of the hold slave relay R310. The start relay R900, upon restoring, opens the operating circuit for the start relay R1000, thereby to cause the sequential release of the latter relay and its slave relay R1010. The relay R1010, upon restoring, opens its contacts 1015 to disconnect the start conductor C926 from ground and thus cause the release of the operated relays in the link and line class finder apparatus 42.

In the event the call routed to the connector switch 31 is abandoned after the repeater control circuit 41 is operatively associated with this connector switch, but before the line classification has been completed to cause the operation of one or two of the relays in the gain control selector 44, the relays R720 and R710 are the only auxiliary control relays operated in the connector switch 31 at the time the release of the connection is initiated. In such case the relay R720 is deenergized and restores in response to the release of the hold slave relay R310, but the auxiliary relay R710 is held energized over its previously traced holding circuit which extends to ground through the operated make contacts 1014 of the start slave relay R1010. During the release of the finder switch 20 and the connector switch 31, the line class marking paths are interrupted at the contacts 138 and 493 when the relays R135 and R490 restore. Thus, the relays of the gain control selector 44 which respectively correspond to the classes of the calling and called lines are prevented from operating. When the relay R720 restores, it prepares a circuit for energizing the relay R1450 of the gain control selector 44. This circuit is completed when the relays R1360 and R1250 are concurrently operated during the line classification cycle of operation of the finder apparatus 42 which is in progress at the time the connection is released. More specifically, this circuit extends from ground by way of the contacts 1361, C1302, the contacts 1252, C1170, the contacts 1008 and 1043', C1184, the upper winding of R1450, C1178, the contacts 1037, C1157, the contacts 1123', C736, the contacts 715, 706, 717 and 725, C656, the contacts 1251, C1301 and the resistor 1337 to battery. When energized over this circuit, the relay R1450 locks to the grounded hold conductor C1163 and opens, at its contacts 1451, the previously traced branch locking circuit for the relays R1100 and R1120. At the end of the second cycle of operation of the finder counting relays, the relay R1030 is energized and operates in the manner previously explained. In operating, the relay R1030 completes the operating circuit for the relay R700 and further prepares the operating circuit for the relay R1080. The relay R1080, upon operating, completes the operating circuit for the relay R700. The relay R1080 now operates to interrupt, at its contacts 1086, the locking circuit for the relays R1100 and R1120. When thus deenergized, the relays R1100 and R1120 restore to initiate the release of the control circuit 41 and the release of the auxiliary relays R710 and R700 in the manner pointed out above with reference to the release of this equipment when a voice current repeater is not required in a connection established between two of the lines terminating at the C. A. X.

*Forced release of the repeater control circuit*

As indicated above, the operating circuit for the release relay R980 is prepared in response to operation of the finder apparatus start relay R1350 and the operating circuit for the control circuit release relay R1020 is prepared in response to operation of the start slave relay R1010. The release relay R1020 is arranged to be controlled by timing apparatus of conventional design, the operation of which is initiated in response to the application of ground potential to the timer start lead C1027. A predetermined time interval after the operation of the timing apparatus is initiated, it functions to impress a ground pulse upon the pulsing lead C983. A second predetermined time interval thereafter, the apparatus functions to impress a ground pulse upon the pulsing lead C984. It will also be recalled from the preceding explanation that when the relay R1030 operates, following the classification of the calling and called lines of a connection with which the control circuit 41 is associated, it functions to cause the deenergization and release of the start relays R1000 and R1010, whereby the operating circuit for the release relay R1020 is opened at the contacts 1013. Under normal conditions, therefore, the release relay R1020 is not operated. A predetermined time interval after the operating circuit for the relay R980 is prepared, the timing equipment transmits a ground pulse over the lead C983, through the contacts 1351 and over the lead C928 to energize the lower winding of this relay. In operating, the relay R980 locks to ground over a path including its contacts 982 and the grounded start conductor C926. At its contacts 981, the relay R980 further prepares the operating circuit for the release relay R1020 individual to the repeater control circuit 41. In the event the assigned functions of the repeater control circuit 41 and the finder apparatus 42 are completed in the normal manner described above, the two start relays R1000 and R1010 restore to cause the release of the finder apparatus 42, to interrupt the locking circuit for the relay R980 and to open the prepared operating circuit for the relay R1020. Accordingly, the operation of the relay R980 is without effect. If, however, the finder apparatus 42 or the equipment of the control circuit 41 fails to operate properly to cause the release of the two start relays R1000 and R1010, the timing equipment in continuing its operation connects the pulsing lead C984 to ground to complete a circuit including this lead, the contacts 981, C917 and the contacts 1013 for energizing the lower winding of the release relay R1020. This relay, in operating, locks to ground over a path including the contacts 1023, C916, the contacts of the release key 997 and the contacts 972. At its contacts 1026, the relay R1020 opens the operating and locking circuits for the start relay R1000. At its contacts 1022, the relay R1020 opens a point in the previously traced operating circuit for the relay R1080. At its contacts 1021, the relay R1020 completes an obvious circuit for energizing the signal lamp 1028 individual to the control circuit 41, whereby a visual signal is produced indicating that the repeater control circuit 41 or the finder apparatus 42 is defective. At its contacts 1024, the relay R1020 completes a circuit for energizing the auxiliary relay R700 of the associated connector switch 31, providing the repeater 45 has been assigned to the use of the connector switch 31 and the relays R710 and R1120 have been previously operated. This circuit extends from ground by way of the contacts 1024 and 1084, C1151, the contacts 1129, C737, the contacts 708 and the winding of R700 to battery. The relay R700, upon operating, locks to ground through the contacts 704 and 714, and is thus held operated under the control of the relays R720 and R710 until the connector switch 31 is released. At its contacts 1025, the relay R1020 interrupts the previously traced locking circuit for the allotter relay R910 and, in so doing, disconnects the marking lead C918 from ground to indicate that the repeater control circuit 41 is busy.

The relays R1000 and R1010, upon restoring, disconnect the start conductor C926 from ground, thereby to cause the deenergization and release of the relay R980, and the operated relays of the link and line class finder apparatus 42. Thus, the operation of the finder apparatus 42 is arrested and this apparatus is released for further use.

The relay R1010, upon restoring, also disconnects the hold lead C1152 from ground to open one of the multiple locking circuits for the two relays R1120 and R1100 in the event these two relays are operated. It will be noted, however, that if the auxiliary relays R710 and R720 of the connector switch 31 are operated, the two relays R1120 and R1100 are, if operated, held energized over the previously traced holding circuit extending to ground at the contacts 721, until the connector switch 31 is released. During the reelase of this switch, when the auxiliary relays R720, R710 and R700 sequentially restore, ground potential is removed from the hold lead C738 to cause the deenergization and release of the two relays R1120 and R1100, if operated, whereby the release of the other operated relays in the control circuit 41 is initiated in the manner previously explained.

The allotter relay R910, upon restoring, opens its contacts 912 and 914 to disconnect the start leads from the repeater control circuit 41 and the heater start relay R990, and closes its contacts 913 and 915 to extend the start leads to the control equipment of the next available idle repeater control circuit. In this regard it will be noted that with the auxiliary relays of the connector switch 31 operated, the repeater control circuits and the circuit for energizing the allotter start relay R900 are held open, so that a second repeater and associated control circuit are not assigned to the use of the connector switch 31 and the finder switch 29. It will also be noted that the heater start relay R990 is deenergized and restores to deenergize the cathode heaters of the amplifier tubes in the repeater 45 in response to the release of the allotter start relay R900.

With the arrangement illustrated, the repeater control circuit 41, when locked out of service in the manner explained in the preceding paragraph, can only be released for further service by operating the release key 997 to open the locking circuit for the relay R1020, or through operation of the overflow relay R970 embodied in the allotter circuit 40. Moreover, the release relay R1020 may be held in its operated position independently of the overflow relay R970 through operation of the hold key 993 to its off-normal position, to complete an obvious alternative locking circuit for the relay R1020. The relay R970 is only operated when all of the repeater control circuits are busy or locked out. Thus, if ground potential is impressed upon the start conductor C178 at a time when all of the repeaters and their associated control circuits are locked out or are busy, the relay R960, upon operating, only prepares the operating circuits for the allotter relays R910, R920, etc., these circuits being held open in the repeater control circuits respectively corresponding thereto. Accordingly, the relay R960 remains in its operated position until the control equipment of the connector switch in the assigned finder-connector link is shifted to its ringing setting to cause the operation of the start relay R900 in the manner explained above. Under these circumstances, the relay R900, upon operating, completes a circuit including the contacts 901, 913, 923, 933, 943, 953 and 966 for energizing the upper winding of the slow-to-operate overflow relay R970. When thus energized, the relay R970 operates after an interval to complete, at its contacts 971, an obvious circuit for energizing the overflow meter 992, whereby the all-busy condition of the repeater control circuits is registered. At its contacts 973, the relay R970 completes an obvious circuit for energizing the all-busy lamp 994, whereby a visual indication is produced indicating that all of the repeater control circuits are busy or are locked out. At its contacts 974, the relay R970 opens the path normally short-circuiting its lower winding, thereby to render itself fast-to-release. At its contacts 972, the relay R970 opens a point in the common portion of the locking circuits for the release relays individual to the five available repeater control circuits. The release relay R1020 of the control circuit 41, if operated, is thus deenergized and restores to close its contacts 1025 and thus complete the prepared operating circuit for the allotter relay R910. In a similar manner, the release relays of the other repeater control circuits which have been locked out of service are deenergized and restore to complete the operating circuits for their respective associated allotter relays. These allotter relays, upon operating, lock to their associated grounded marking leads and open the operating circuit for the overflow relay R970, and the operating circuit for the relay R960. When the relay R970 restores, the operating circuits for the release relays of the repeater control circuits are reprepared at the contacts 972, the operating circuit for the overflow meter 992 is interrupted at the contacts 971, and the circuit for energizing the signal lamp 994 is opened at the contacts 973. Further, the repeater control circuit 41 is in condition for assignment to the use of a link occupied with the call.

In the event the repeater control circuit 41 is assigned to the use of the finder-connector link 20, 31, for example, the relay R1120 is operated to associate this link with the control circuit 41, the calling and called line classification is completed to cause the operation of one or two of the relays in the gain control selector 44, and the circuit 41 is thereafter locked out of service by the release relay R1020 due to failure of the relay R1030 properly to operate, or the relays R1000 and R1010 properly to restore; the relays R1040, R1070, R1050, R1060, R1100, R1120 and one or two of the relays in the gain control selector 44 remain operated in the control circuit 41 under the control of the auxiliary relays R700, R710 and R720 of the connector switch 31 until this connector switch is released. It will be apparent that with this condition prevailing, it is possible for the relay R970 to release the control circuit 41 from lockout before the connector switch 31 is restored to normal. If this should occur, the control circuit 41, when released from its locked-out condition, will again be associated with the finder apparatus 42 due to the reoperation of the start relays R1000 and R1010. Since, however, the relay R700 of the connector switch 31 is operated, the line class marking circuits are open at the contacts 702 and 706, and hence no further classification of the calling and called lines occurs. The finder apparatus 42, however, in reoperation, recompletes the previously traced operating circuit for the relay R1030. If this relay operates properly, it interrupts the operating circuit for the start relay R1000 and performs the other functions previously described. The relay R1000, upon restoring, opens the circuit for energizing its slave relay R1010, whereby the control circuit 41 is disassociated from the finder apparatus 42, and the finder apparatus is released for use in connection with another call. Obviously, if the relay R1030 fails to operate properly, the repeater control circuit 41 will again be locked out of service. On the other hand, if this relay does operate in its intended manner, the repeater control circuit 41 performs the functions described above in regard to the connection set up between the substations A and B. Following the operation of the relay R1030, the control circuit 41 may be released in accordance with one of the methods outlined above.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a telephone system, a plurality of lines having different signal current transmission characteristics, finder-connector links for automatically setting up connections between said lines, signal current repeaters common to said links, and means controlled by said links for automatically including an idle one of said signal current repeaters in each of at least a portion of said connections at a point between the finder and connector ends of the link through which the connection extends and for controlling the signal current gain through the repeaters in accordance with the transmission characteristics of the calling and called lines included in said connections.

2. In a telephone system, a plurality of lines having different signal current transmission characteristics, a finder-connector link for setting up a connection between a pair of said lines, a signal current repeater, and means controlled by said link for automatically including said signal current repeater in the communication channel of said connection at a point between the finder and connector ends of said link and for controlling the voice current gain through said repeater in accordance with the signal current transmission characteristics of said pair of lines.

3. In a telephone system, a plurality of lines having different signal current transmission characteristics, a signal current repeater common to said lines, a finder-connector link controllable over any calling one of said lines to set up a connection between the calling line and a called one of said lines, and means controlled by said automatic switching apparatus for automatically including said signal current repeater in the communication channel of said connection at a point between the finder and connector ends of said link only in the event said calling and called lines are possessed of predetermined signal current transmission characteristics and for controlling the signal current gain through said repeater in accordance with the signal current transmission characteristics of said pair of lines.

4. In a telephone system, a plurality of lines, said lines being divided into classes, a plurality of signal current repeaters common to said lines, means for preselecting said repeaters for use in a predetermined order, means for setting up a connection between two of said lines, means for including a preselected repeater in the communication channel of said connection, and means controlled in accordance with the classification of at least one of said two lines for determining the signal current gain through said preselected repeater.

5. In a telephone system, a plurality of lines, said lines being divided into classes, a plurality of signal current repeaters common to said lines, means for preselecting said repeaters for use in a predetermined order, means for setting up a connection between two of said lines, means for including a preselected repeater in the communication channel of said connection, means for preventing the operation of said last-named means in the event one of said two lines is included in a predetermined class, and means controlled in accordance with the classification of at least one of said two lines for determining the signal current gain through said preselected repeater in the event said preselected repeater is included in said connection.

6. In a telephone system, a plurality of lines having different signal current transmission characteristics, a plurality of signal current repeaters common to said lines, means for preselecting said repeaters for use in a predetermined order, automatic switching apparatus controllable over a calling line of the system to establish a connection between the calling line and a called line of the system, means for automatically including a preselected repeater in the communication channel of the established connection, and means controlled in accordance with the signal current transmission characteristics of at least one of said calling and called lines for determining the signal current gain through said preselected repeater.

7. In a telephone system, a plurality of lines having different signal current transmission characteristics, a plurality of signal current repeaters common to said lines, means for preselecting said repeaters for use in a predetermined order, automatic switching apparatus controllable over a calling line of the system to establish a connection between the calling line and a called line of the system, means for automatically including a preselected repeater in the communication channel of the established connection, means for preventing the operation of said last-named means in the event said calling and called lines are possessed of predetermined signal current transmission characteristics, and means controlled in accordance with the signal current transmission characteristics of said calling and called lines for determining the signal current gain through said preselected repeater in the event said preselected repeater is included in said connection.

8. In a telephone system, a plurality of lines having different signal current transmission characteristics, a plurality of signal current repeaters common to said lines, means for preselecting said repeaters for use in a predetermined order, automatic switching apparatus controllable over a calling line of the system to establish a connection between the calling line and a called line of the system, means controlled by said automatic switching apparatus for automatically including a preselected repeater in the communication channel of said connection only in the event said calling and called lines possess predetermined signal current transmission characteristics, and means controlled in accordance with the signal current transmission characteristics of said calling and called lines for determining the signal current gain through said preselected repeater in the event said preselected repeater is included in said communication channel.

9. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switch apparatus, an allotter operative to select said repeaters for use in said connections, and means operative in response to operation of said control equipment to its ringing setting for causing said allotter to select one of said repeaters for use.

10. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switching apparatus, an allotter operative to select said repeaters for use in said connections, and means operative in response to operation of said control equipment to its ringing setting for associating a selected one of said repeaters with a connection routed by way of said switch and for causing said allotter to select another of said repeaters for use.

11. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switching apparatus, an allotter operative to select said repeaters for use in said connections, means operative in response to operation of said control equipment to its ringing settting for associating a selected one of said repeaters with a connection routed by way of said switch and for causing said allotter to select another of said repeaters for use, and means controllable over the called end of the connection routed by way of said switch for including said one repeater in the communication channel of the connection routed by way of said switch.

12. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switching apparatus, an allotter operative to select said repeaters for use in said connections, means operative in response to operation of said control equipment to its ringing setting for associating a selected one of said repeaters with a connection routed by way of said switch, and means operative in response to a call answering operation performed at the called end of the connection routed by way of said switch for including said one repeater in the communication channel of the connection routed by way of said switch.

13. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switching apparatus, an allotter operative to select said repeaters for use in said connections, means operative in response to operation of said control equipment to its ringing setting for associating a selected one of said repeaters with a connection routed by way of said switch and for causing said allotter to select another of said repeaters for use, means controllable over the called end of the connection routed by way of said switch for including said one repeater in the communication channel of the connection routed by way of said switch, and means operative in response to the release of said switch for releasing said one repeater and for marking said one repeater as idle in said allotter.

14. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switching apparatus, an allotter operative to select said repeaters for use in said connections, means operative in response to operation of said control equipment to its ringing setting for associating a selected one of said repeaters with a connection routed by way of said switch, means operative in response to a call answering operation performed at the called end of the connection routed by way of said switch for including said one repeater in the communication channel of the connection routed by way of said switch, and means operative in response to a call release operation subsequently performed at the called end of the connection for excluding said one repeater from the communication channel of the connection.

15. In a telephone system, a plurality of lines, automatic switching apparatus for setting up connections between said lines, said automatic switching apparatus including a connector switch comprising control equipment having a ringing setting wherein a circuit is provided for transmitting ringing current over a line selected by said switch, signal current repeaters common to said lines and said switching apparatus, an allotter operative to select said repeaters for use in said connections, means operative in response to operation of said control equipment to its ringing setting for associating a selected one of said repeaters with a connection routed by way of said switch, means operative in response to a call answering operation performed at the called end of the connection routed by way of said switch for including said one repeater in the communication channel of the connection routed by way of said switch, means operative in response to a call release operation subsequently performed at the called end of the connection for excluding said one repeater from the communication channel of the connection, and means operative in response to the release of said switch for releasing said one repeater and for marking said one repeater as idle in said allotter.

16. In a telephone system, a plurality of signal current repeaters adapted for concurrent or non-concurrent use in connections established between the lines of the system, an allotter for assigning said repeaters to the use of said lines in a predetermined order, and means controlled by said allotter for registering an all busy condition of said repeaters.

17. In a telephone system, a plurality of signal current repeaters adapted for concurrent or non-concurrent use in connections established between the lines of the system, an allotter for assigning said repeaters to the use of said lines in a predetermined order, means individual to said repeaters for marking the associated repeaters as busy in said allotter when the associated repeaters are in use and for marking the associated repeaters as idle when they are released, and means controlled by said allotter for registering an all busy condition of said repeaters.

18. In a telephone system, a plurality of lines, said lines being classified according to the signal current transmission characteristics thereof, means for setting up a connection between a pair of said lines, a repeater included in said connection, line circuits individual to said pair of lines and each including line and cut-off relays, and means jointly controlled by at least one of the relays of each of said line circuits for controlling the signal current gain through said repeater in accordance with the combined signal current transmission characteristics of said connected pair of lines.

19. In a telephone system, a plurality of lines, line circuits individual to said lines and each including line and cut-off relays, said lines being classified according to the signal current transmission characteristics thereof, means for setting up a connection between a pair of said lines, a repeater included in said connection, testing means jointly controlled by at least one of the relays in each of the line circuits individual to said pair of lines for automatically determining the classification of each of said pair of lines incident to the setting up of said connection, and means controlled by said testing means for determining the signal current gain through said repeater.

20. In a telephone system, a plurality of lines, line circuits individual to said lines and each including line and cut-off relays, said lines being classified according to the signal current transmission characteristics thereof, means for setting up a connection between a pair of said lines, a repeater included in said connection, a gain control selector having a plurality of settings individually corresponding to the classifications of different pairs of connected lines, testing means jointly controlled by at least one of the relays in each of the line circuits individual to the lines of said pair and automatically operative to impart to said gain control selector the setting which corresponds to the classification of said pair of lines, and means controlled in accordance with the setting of said gain control selector for determining the signal current gain through said repeater.

21. In a telephone system, a plurality of lines, line circuits individual to said lines and each including line and cut-off relays, said lines being classified according to the signal current transmission characteristics thereof, means for setting up a connection between a pair of said lines, a repeater included in said connection, a gain control selector comprising relays individually corresponding to said classes of lines, means jointly controlled by at least one of the relays in each of the line circuits individual to said connected pair of lines and automatically operative to cause the operation of the one or ones of said relays of said selector which correspond to the class or classes in which said pair of lines are respectively included, and means controlled in accordance with the setting of said relays for determining the signal current gain through said repeater.

22. In a telephone system, a plurality of lines, said lines being classified according to the signal current transmission characteristics thereof, means for setting up a connection between a pair of said lines, a repeater included in said connection, means for controlling the signal current gain through said repeater in accordance with the classification of at least one of said pair of lines, and means operative in response to a connection release operation performed at the called end of said connection for excluding said repeater from said connection.

23. In a telephone system, a plurality of lines, said lines being classified according to the signal current transmission characteristics thereof, means for setting up a connection between a pair of said lines, a repeater included in said connection, said repeater having a normal high gain setting, means for reducing the signal current gain through said repeater by an amount determined by the classification of at least one of said pair of lines, and means operative in response to a connection release operation performed at the called end of said connection for excluding said repeater from said connection.

24. In a telephone system, a plurality of lines, said lines being classified according to the signal current transmission characteristics thereof, a repeater adapted to be included in a connection set up between any two of said lines, a gain control selector having different settings individually corresponding to the gains required for satisfactory communication between different pairs of connected lines of the system, line testing means operative to test the classification of each line of a connected pair of lines and to impart a corresponding setting to said selector, and means controlled in accordance with the setting of said selector for determining the signal current gain through said repeater.

25. In a telephone system, a plurality of lines, said lines being classified according to the signal current transmission characteristics thereof, a repeater adapted to be included in a connection set up between any two of said lines, a gain control selector comprising relays individually corresponding to different classes of lines of the system, line testing means operative to test the classification of each line of a connected pair and to cause the operation of the relay or relays in said selector which correspond to the classification of the connected lines, and means controlled in accordance with the setting of said relays for determining the signal current gain through said repeater.

26. In a telephone system, a plurality of lines of different classes, means for setting up a connection between a pair of said lines, line circuits individual to said pair of lines and each including line and cut-off relays, a repeater including signal current amplifying means, and means jointly controlled by at least one of the relays of each of said line circuits for automatically including said repeater in said connection only in the event said pair of lines are included in a predetermined class or predetermined classes.

27. In a telephone system, a plurality of lines of different classes, means for setting up a connection between a pair of said lines, line circuits individual to said pair of lines and each including line and cut-off relays, a repeater including signal current amplifying means, means jointly controlled by at least one of the relays of each of said line circuits for automatically including said repeater in said connection, and means for preventing the operation of said last-named means in the event said pair of lines are included in a predetermined class or predetermined classes.

28. In a telephone system, a plurality of lines of different classes, means for setting up a connection between a pair of said lines, line circuits individual to said pair of lines and each including line and cut-off relays, a repeater including signal current amplifying means, means jointly controlled by at least one of the relays of each of said line circuits for automatically including said repeater in said connection only in the event said pair of lines are included in a predetermined class or predetermined classes, and means for controlling the signal current gain through said repeater in accordance with the classification of said pair of lines in the event said repeater is included in said connection.

29. In a telephone system, a plurality of lines of different classes, means for setting up a connection between a pair of said lines, line circuits individual to said pair of lines and each including line and cut-off relays, a repeater including signal current amplifying means, means jointly controlled by at least one of the relays of each of said line circuits for automatically including said repeater in said connection, means for preventing the operation of said last-named means in the event said pair of lines are included in a predetermined class or predetermined classes, and means for controlling the signal current gain through said repeater in accordance with the classification of said pair of lines in the event said repeater is included in said connection.

30. In a telephone system, a plurality of lines having different signal current losses, automatic switching means controllable over a calling one of said lines to set up a connection between said calling line and a called one of said lines, line circuits individual to said calling and called lines and each including line and cut-off relays, a repeater including signal current amplifying means, and means controlled by at least one of the relays in each of said line circuits for automatically including said repeater in said connection only in the event the combined signal current losses of said calling and called lines exceed a predetermined value.

31. In a telephone system, a plurality of lines having different signal current losses automatic switching means controllable over a calling one of said lines to set up a connection between said calling line and a called one of said lines, line circuits individual to said calling and called lines and each including line and cut-off relays, a repeater including signal current amplifying means, means controlled by at least one of the relays in each of said line circuits for automatically including said repeater in said connection incident to the setting up of said connection, and means for preventing the operation of said last-named means in the event the combined signal current losses of said calling and called lines are less than a predetermined value.

32. In a telephone system, a plurality of lines, a signal current repeater common to said lines, a plurality of automatic switches accessible to said lines, means including one of said switches for establishing a connection between two of said lines, finder means operative to select said one switch from said plurality of switches and operative to associate said repeater with said connection, and means responsive to a call answering operation performed at the called end of the connection for automatically including said repeater in the communication channel of said connection.

33. In a telephone system, a plurality of lines, a signal current repeater common to said lines, a plurality of automatic switches accessible to said lines, means including one of said switches for establishing a connection between two of said lines, finder means operative to select said one switch from said plurality of switches and operative to associate said repeater with said connection, and means controllable over the called end of said connection for including said repeater in the communication channel of said connection.

34. In a telephone system, a plurality of lines, a signal current repeater common to said lines, a plurality of automatic switches accessible to said lines, means including one of said switches for establishing a connection between two of said lines, finder means operative to select said one switch from said plurality of switches and operative to associate said repeater with said connection, means responsive to a call answering operation performed at the called end of said connection for including said repeater in the communication channel of said connection, and means responsive to a connection release operation performed at the called end of said connection for excluding said repeater from said communication channel.

35. In a telephone system, a plurality of lines having different signal current transmission characteristics, a signal current repeater common to said lines, a plurality of automatic switches accessible to said lines, means including one of said switches for establishing a connection between two of said lines, finder means operative to select said one switch from said plurality of switches and operative to associate said repeater with said connection, means controllable over the called end of said connection for automatically including said repeater in the communication channel of said connection, and means controlled in accordance with the signal current transmission characteristics of said two lines for determining the signal current gain through said repeater.

36. In a telephone system, a plurality of lines having different signal current transmission characteristics, a signal current repeater common to said lines, a plurality of automatic switches accessible to said lines, means including one of said switches for establishing a connection between two of said lines, finder means operative to select said one switch from said plurality of switches and operative to associate said repeater with said connection regardless of the signal current transmission characteristics of said two lines, and means for automatically including said repeater in the communication channel of said connection only in the event said two lines possess predetermined signal current transmission characteristics.

37. In a telephone system, a plurality of lines having different signal current transmission characteristics, a signal current repeater common to said lines, a plurality of automatic switches accessible to said lines, means including one of said switches for establishing a connection between two of said lines, finder means operative to select said one switch from said plurality of switches and operative to associate said repeater with said connection regardless of the signal current transmission characteristics of said two lines, means for automatically including said repeater in the communication channel of said connection, and means for preventing the operation of said last-named means and for releasing said repeater for further use in the event said two lines possess predetermined signal current transmission characteristics.

38. In a telephone system, a plurality of lines having different signal current transmission characteristics, a signal current repeater common to said lines, a plurality of automatic switches accessible to said lines, means including one of said switches for establishing a connection between two of said lines, finder means operative to select said one switch from said plurality of switches and operative to associate said repeater with said connection regardless of the signal current transmission characteristics of said two lines, means for automatically including said repeater in the communication channel of said connection only in the event said two lines possess predetermined signal current transmission characteristics, and means controlled in accordance with the signal current transmission characteristics of said two lines for determining the signal current gain through said repeater in the event said repeater is included in said communication channel.

39. In a telephone system, a plurality of lines, said lines being classified according to the signal current transmission characteristics thereof, a signal current repeater common to said lines, a plurality of automatic switches accessible to said lines, means including one of said switches for setting up a connection between two of said lines, finder means operative through one cycle to select said one switch from said plurality of switches, means controlled by said finder means during said one operating cycle for operatively associating said repeater with said connection and for then initiating a second cycle of operation of said finder means, means controlled by said finder means during said second operating cycle for determining the class or classes in which said two lines are respectively included, means controlled in accordance with the classification of said two lines for determining the signal current gain through said repeater, and means for automatically including said repeater in the communication channel of said connection.

40. In a telephone system, a plurality of lines, said lines being classified according to the signal current transmission characteristics thereof, a signal current repeater common to said lines, a plurality of automatic switches accessible to said lines, means including one of said switches for setting up a connection between two of said lines, finder means operative through one cycle to select said one switch from said plurality of switches, means controlled by said finder means during said one operating cycle for operatively associating said repeater with said connection and for then initiating a second cycle of operation of said finder means, means controlled by said finder means during said second operating cycle for determining the class or classes in which said two lines are respectively included, means controlled in accordance with the classification of said two lines for determining the signal current gain through said repeater and for then releasing said finder means, and means for automatically including said repeater in the communication channel of said connection.

41. In a telephone system, a plurality of lines, said lines being classified according to the signal current transmission characteristics thereof, a signal current repeater common to said lines, a plurality of automatic switches accessible to said lines, means including one of said switches for setting up a connection between two of said lines, finder means operative through one cycle to select said one switch from said plurality of switches, means controlled by said finder means during said one operating cycle for operatively associating said repeater with said connection and for then initiating a second cycle of operation of said finder means, means controlled by said finder means during said second operating cycle for determining the class or classes in which said two lines are respectively included, means controlled in accordance with the classification of said two lines for determining the signal current gain through said repeater, and means controlled over the called end of said connection for including said repeater in the communication channel of said connection.

42. In a telephone system, a plurality of lines, said lines being classified according to the signal current transmission characteristics thereof, a signal current repeater common to said lines, a plurality of automatic switches accessible to said lines, means including one of said switches for setting up a connection between two of said lines, finder means operative through one cycle to select said one switch from said plurality of switches, means controlled by said finder means during said one operating cycle for operatively associating said repeater with said connection and for then initiating a second cycle of operation of said finder means, a gain control selector controlled by said finder means during said second operating cycle and operative to one of a number of settings determined by the classification of said two lines, means controlled by said selector for releasing said repeater and said finder means in the event said selector is operated to a predetermined setting, means for changing the signal current gain through said repeater in the event said selector is operated to another of its settings, and means for automatically including said repeater in the communication channel of said connection.

43. In a telephone system, a plurality of lines, said lines being classified according to the signal current transmission characteristics thereof, a signal current repeater common to said lines, a plurality of automatic switches accessible to said lines, means including one of said switches for setting up a connection between two of said lines, finder means operative through one cycle to select said one switch from said plurality of switches, means controlled by said finder means during said one operating cycle for operatively associating said repeater with said connection and for then initiating a second cycle of operation of said finder means, a gain control selector controlled by said finder means during said second operating cycle and operative to one of a number of settings determined by the classification of said two lines, means controlled by said selector for releasing said repeater and said finder means in the event said selector is operated to a predetermined setting, means for changing the signal current gain through said repeater and for releasing said finder means in the event said selector is operated to another of its settings, and means for automatically including said repeater in the communication channel of said connection.

44. In a telephone system, a plurality of lines, a plurality of signal current repeaters common to said lines, allotter means for assigning said repeaters for use in a predetermined order, a plurality of automatic switches accessible to said lines, means including one of said switches for establishing a connection between two of said lines, finder means operative to select said one switch from said plurality of switches and operative to associate an assigned repeater with said connection, and means controllable over the called end of said connection for including said assigned repeater in the communication channel of said connection.

45. In a telephone system, a plurality of lines having different signal current transmission characteristics, a plurality of signal current repeaters common to said lines, allotter means for assigning said repeaters for use in a predetermined order, a plurality of automatic switches accessible to said lines, means including one of said switches for establishing a connection between two of said lines, finder means operative to select said one switch from said plurality of switches and operative to associate an assigned repeater with said connection, means for automatically including said assigned repeater in the communication channel of said connection, and means controlled in accordance with the signal current transmission characteristics of said two lines for determining the signal current gain through said assigned repeater.

46. In a telephone system, a plurality of lines having different signal current transmission characteristics, a plurality of signal current repeaters common to said lines, allotter means for assigning said repeaters for use in a predetermined order, a plurality of automatic switches accessible to said lines, means including one of said switches for establishing a connection between two of said lines, finder means operative to select said one switch from said plurality of switches and operative to associate an assigned repeater with said connection regardless of the signal current transmission characteristics of said two lines, and means for automatically including said assigned repeater in the communication channel of said connection only in the event said two lines possess predetermined signal current transmission characteristics.

47. In a telephone system, a plurality of lines having different signal current transmission characteristics, a plurality of signal current repeaters common to said lines, means for assigning said repeaters for use in a predetermined order, a plurality of automatic switches accessible to said lines, means including one of said switches for establishing a connection between two of said lines, finder means operative to select said one switch from said plurality of switches and operative to associate an assigned repeater with said connection, means for automatically including said assigned repeater in the communication channel of said connection only in the event said two lines possess predetermined signal current transmission characteristics, and means controlled in accordance with the signal current transmission characteristics of said two lines for determining the signal current gain through said assigned repeater in the event said assigned repeater is included in said communication channel.

48. In a telephone system, a plurality of lines having different impedance characteristics, means for setting up a connection between a calling one of said lines, and a called one of said lines, a signal current repeater included in said connection and comprising hybrid networks individual to calling and called lines, hybrid balancing circuits individual to said lines and having balancing characteristics determined by the impedance characteristics of the corresponding lines, and means operative incident to the setting up of said connection for connecting the balancing circuits individual to the calling and called lines of said connection to the hybrid systems respectively corresponding to the calling and called lines.

49. In a telephone system, a plurality of lines having different impedance characteristics, means for setting up a connection between a calling one of said lines and a called one of said lines, a signal current repeater included in said connection and comprising hybrid networks individual to calling and called lines, hybrid balancing circuits individual to said lines and having balancing characteristics determined by the impedance characteristics of the corresponding lines, means operative incident to the setting up of said connection for connecting the balancing circuits individual to the calling and called lines of said connection to the hybrid systems respectively corresponding to the calling and called lines, and means controlled in accordance with the signal current transmission characteristics of the calling and called lines of said connection for determining the signal current gain through said repeater.

50. In a telephone system, a plurality of lines having different impedance characteristics, a signal current repeater including a pair of hybrid networks respectively corresponding to calling and called lines, hybrid balancing circuits individual to said lines and having balancing characteristics determined by the impedance characteristics of the corresponding lines, automatic switching apparatus for establishing a connection between a calling one of said lines and a called one of said lines, and means for automatically including said repeater in the communication channel of said connection and for connecting the balancing circuits individual to the calling and called lines to the hybrid networks respectively corresponding to the calling and called lines.

51. In a telephone system, a plurality of lines having different impedance characteristics, a signal current repeater including a pair of hybrid networks respectively corresponding to calling and called lines, hybrid balancing circuits individual to said lines and having balancing characteristics determined by the impedance characteristics of the corresponding lines, automatic switching apparatus for establishing a connection between a calling one of said lines and a called one of said lines, means for automatically including said repeater in the communication channel of said connection and for connecting the balancing circuits individual to the calling and called lines to the hybrid networks respectively corresponding to the calling and called lines, and means controlled in accordance with the signal current transmission characteristics of the calling and called lines for determining the signal current gain through said repeater.

52. In a telephone system, a plurality of lines having different impedance characteristics, a signal current repeater including a pair of hybrid networks respectively corresponding to calling and called lines, hybrid balancing circuits individual to said lines and having balancing characteristics determined by the impedance characteristics of the corresponding lines, automatic switching apparatus for establishing a connection between a calling one of said lines and a called one of said lines, and means for including said repeater in the communication channel of said connection and for connecting the balancing circuits individual to the calling and called lines to the hybrid networks respectively corresponding to the calling and called lines only in the event the calling and called lines possess predetermined signal current transmission characteristics.

53. In a telephone system, a plurality of lines having different impedance characteristics, a signal current repeater including a pair of hybrid networks respectively corresponding to calling and called lines, hybrid balancing circuits individual to said lines and having balancing characteristics determined by the impedance characteristics of the corresponding lines, automatic switching apparatus for establishing a connection between a calling one of said lines and a called one of said lines, means for including said repeater in the communication channel of said connection and for connecting the balancing circuits individual to the calling and called lines to the hybrid networks respectively corresponding to the calling and called lines only in the event the calling and called lines possess predetermined signal current transmission characteristics, and means controlled in accordance with the signal current transmission characteristics of the calling and called lines for determining the signal current gain through said repeater in the event said repeater is included in said communication channel.

54. In a telephone system, a plurality of lines having different impedance characteristics, a signal current repeater common to said lines and including a pair of hybrid networks respectively corresponding to calling and called lines, hybrid balancing circuits individual to said lines and having balancing characteristics determined by the impedance characteristics of the corresponding lines, a plurality of automatic switches accessible to said lines, means including one of said switches for establishing a connection between a calling one of said lines and a called one of said lines, finder means operative to select said one switch from said plurality of switches and operative to associate said repeater with said connection, and means for automatically including said repeater in the communication channel of said connection and for connecting the balancing circuits individual to the calling and called lines to the hybrid networks respectively corresponding to the calling and called lines.

55. In a telephone system, a plurality of lines having different impedance characteristics, a signal current repeater common to said lines and including a pair of hybrid networks respectively corresponding to calling and called lines, hybrid balancing circuits individual to said lines and having balancing characteristics determined by the impedance characteristics of the corresponding lines, a plurality of automatic switches accessible to said lines, means including one of said switches for establishing a connection between a calling one of said lines and a called one of said lines, finder means operative to select said one switch from said plurality of switches and operative to associate said repeater with said connection, means for automatically including said repeater in the communication channel of said connection and for connecting the balancing circuits individual to the calling and called lines to the hybrid networks respectively corresponding to the calling and called lines, and means controlled in accordance with the signal current transmission characteristics of the calling and called lines for determining the signal current gain through said repeater.

56. In a telephone system, a plurality of lines having different impedance characteristics, a signal current repeater common to said lines and including a pair of hybrid networks respectively corresponding to calling and called lines, hybrid balancing circuits individual to said lines and having balancing characteristics determined by the impedance characteristics of the corresponding lines, a plurality of automatic switches accessible to said lines, means including one of said switches for establishing a connection between a calling one of said lines and a called one of said lines, finder means operative to select said one switch from said plurality of switches and operative to associate said repeater with said connection, and means for including said repeater in the communication channel of said connection and for connecting the balancing circuits individual to the calling and called lines to the hybrid networks respectively corresponding to the calling and called lines only in the event the calling and called lines possess predetermined signal current transmission characteristics.

57. In a telephone system, a plurality of lines having different impedance characteristics, a signal current repeater common to said lines and including a pair of hybrid networks respectively corresponding to calling and called lines, hybrid balancing circuits individual to said lines and having balancing characteristics determined by the impedance characteristics of the corresponding lines, a plurality of automatic switches accessible to said lines, means including one of said switches for establishing a connection between a calling one of said lines and a called one of said lines, finder means operative to select said one switch from said plurality of switches and operative to associate said repeater with said connection, means controlled by said one switch for including said repeater in the communication channel of said connection and for connecting the balancing circuits individual to the calling and called lines to the hybrid networks respectively corresponding to the calling and called lines only in the event the calling and called lines possess predetermined signal current transmission characteristics, and means controlled in accordance with the signal current transmission characteristics of the calling and called lines for determining the signal current gain through said repeater in the event said repeater is included in said communication channel.

58. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, automatic switching apparatus controllable over a calling one of said lines to establish a connection between the calling line and a called one of said lines, and means for automatically including an assigned repeater in the communication channel of said connection and for connecting the balancing circuits individual to the calling and called lines to the hybrid networks of the assigned repeater which respectively correspond to the calling and called lines.

59. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, automatic switching apparatus controllable over a calling one of said lines to establish a connection between the calling line and a called one of said lines, means for automatically including an assigned repeater in the communication channel of said connection and for connecting the balancing circuits individual to the calling and called lines to the hybrid networks of the assigned repeater which respectively correspond to the calling and called lines, and means controlled in accordance with the signal current transmission characteristics of the calling and called lines for determining the signal current again through the assigned repeater.

60. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, automatic switching apparatus controllable over a calling one of said lines to establish a connection between the calling line and a called one of said lines, and means for automatically including an assigned repeater in the communication channel of said connection and for connecting the balancig circuits individual to the calling and called lines to the hybrid networks of said assigned repeater which respectively correspond to the calling and called lines only in the event the calling and called lines possess predetermined signal current transmission characteristics.

61. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, automatic switching apparatus controllable over a calling one of said lines to establish a connection between the calling line and a called one of said lines, means for automatically including an assigned repeater in the communication channel of said connection and for connecting the balancing circuits individual to the calling and called lines to the hybrid networks of said assigned repeater which respectively correspond to the calling and called lines only in the event the calling and called lines possess predetermined signal current transmission characteristics, and means controlled in accordance with the signal current transmission characteristics of the calling and called lines for determining the signal current gain through said assigned repeater in the event said assigned repeater is included in said communication channel.

62. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, a plurality of automatic switches accessible to said lines, means including one of said switches for establishing a connection between a calling one of said lines and a called one of said lines, finder means operative to select said one switch from said plurality of switches and to associate an assigned repeater with said connection, and means for automatically including the assigned repeater in the communication channel of said connection and for connecting the balancing circuits individual to the calling and called lines to the hybrid networks of the assigned repeater which respectively correspond to the calling and called lines.

63. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, a plurality of automatic switches accessible to said lines, means including one of said switches for establishing a connection between a calling one of said lines and a called one of said lines, finder means operative to select said one switch from said plurality of switches and to associate an assigned repeater with said connection, means for automatically including the assigned repeater in the communication channel of said connection and for connecting the balancing circuits individual to the calling and called lines to the hybrid networks of the assigned repeater which respectively correspond to the calling and called lines, and means controlled in accordance with the signal current transmission characteristics of the calling and called lines for determining the signal current gain through the assigned repeater.

64. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, a plurality of automatic switches accessible to said lines, means including one of said switches for establishing a connection between a calling one of said lines and a called one of said lines, finder means operative to select said one switch from said plurality of switches and to associate an assigned repeater with said connection, and means for automatically including said assigned repeater in the communication channel of said connection and for connecting the balancing circuits individual to the calling and called lines to the hybrid networks of said assigned repeater which respectively correspond to the calling and called lines only in the event the calling and called lines possess predetermined signal current transmission characteristics.

65. In a telephone system, a plurality of lines having different impedance characteristics, a plurality of signal current repeaters common to said lines, each of said repeaters including a pair of hybrid networks respectively corresponding to calling and called lines, hybrid balancing circuits individual to said lines and having balancing characteristics determined by the impedance characteristics of the corresponding lines, allotter means for assigning said repeaters for use in a predetermined order, a plurality of automatic switches accessible to said lines, means including one of said switches for establishing a connection between a calling one of said lines and a called one of said lines, finder means operative to select said one switch from said plurality of switches and to associate an assigned repeater with said connection, means for automatically including said assigned repeater in the communication channel of said connection and for connecting the balancing circuits individual to the calling and called lines to the hybrid networks of said assigned repeater which respectively correspond to the calling and called lines only in the event the calling and called lines possess predetermined signal current transmission characteristics, and means controlled in accordance with the signal current transmission characteristics of the calling and called lines for determining the signal current gain through said assigned repeater in the event said assigned repeater is included in said communication channel.

66. In a telephone system, a plurality of lines, line circuits terminating said lines, an automatic switch link operative to set up a connection between two of said lines, certain of said lines being arranged for simplex control of said link and line circuits and others of said lines being arranged for loop control of said link and line circuits, a control path extending from the line circuit terminating the calling one of said two lines to said link, means controlled over said path for conditioning the link control equipment to be controlled over the calling ling regardless of whether the calling line is arranged for simplex or loop control of said link and line circuits, a signal current repeater included in said connection, and means also controlled over said path for determining the signal current gain through said repeater.

67. In a telephone system, a plurality of lines, line circuits terminating said lines, a finder-connector link operative to set up a connection between a calling one of said lines and a called one of said lines and including link circuit equipment, certain of said lines being arranged for simplex control of said link and line circuits and others of said lines being arranged for loop control of said link and line circuits, a control path extending from the line circuit terminating the calling line through the outlet contacts of the finder portion of said link to said link circuit equipment, means controlled over said path for adapting said link circuit equipment for control over the calling line regardless of whether the calling line is arranged for simplex or loop control of said link and line circuits, a signal current repeater included in said connection, and means also controlled over said path for determining the signal current gain through said repeater.

68. In a telephone system, a plurality of lines, a signal current repeater common to said lines, a plurality of links, means including one of said links for establishing a connection between two of said lines, finder means operative to select said one link from said plurality of links and operative to associate said repeater with said connection, and means for automatically including said repeater in the communication channel of said connection at a point between the two ends of said one link.

69. In a telephone system, a plurality of lines, said lines being classified according to the signal current transmission characteristics thereof, a signal current repeater common to said lines, a plurality of links, means including one of said links for setting up a connection between two of said lines, finder means operative through one cycle to select said one link from said plurality of links, means controlled by said finder means during said one operating cycle for operatively associating said repeater with said connection and for then initiating a second cycle of operation of said finder means, means controlled by said finder means during said second operating cycle for determining the class or classes in which said two lines are respectively included, means controlled in accordance with the classification of said two lines for determining the signal current gain through said repeater, and means for automatically including said repeater in the communication channel of said connection.

70. In a telephone system, a plurality of lines, a plurality of signal current repeaters common to said lines, allotter means for assigning said repeaters for use in a predetermined order, a plurality of links, means including one of said links for establishing a connection between two of said lines, finder means operative to select said one link from said plurality of links and operative to associate an assigned repeater with said connection, and means for automatically including said assigned repeater in the communication channel of said connection at a point between the two ends of said one link.

71. In a telephone system, a plurality of lines having different impedance characteristics, means including a finder-selector link for setting up a connection between a calling one of said lines and a called one of said lines, a signal current repeater included in said connection and comprising hybrid networks individual to calling and called lines, hybrid balancing circuits individual to said lines and having balancing characteristics determined by the impedance characteristics of the corresponding lines, paths individual to said balancing circuits and respectively including different outlet contacts of the finder portion of said link for effecting a connection between any one of said balancing circuits and the hybrid network which is individual to calling lines, paths individual to said balancing circuits and respectively including different outlet contacts of the selector portion of said link for effecting a connection between any one of said balancing circuits and the hybrid network which is individual to called lines, and means operative incident to the setting up of said connection for completing the paths which extend from the hybrid systems respectively corresponding to the calling and called lines to the balancing circuits where are individual to the calling and called lines of said connection.

72. In a telephone system, a plurality of lines, a signal current repeater adapted to be included in a connection set up between two of said lines and comprising a hybrid network, hybrid balancing circuits individual to said lines, an automatic switch having outlet contacts and operative to seize one of said lines, and means including a path extending through an outlet contact of said switch for connecting the hybrid balancing circuit individual to the seized line to the hybrid system of said repeater.

73. In a telephone system, a plurality of lines, a signal current repeater adapted to be included in a connection set up between two of said lines and comprising a hybrid network, hybrid balancing circuits individual to said lines, a finder switch having outlet contacts and operative in response to the initiation of a call on one of said lines to seize said one line, and means comprising a path extending through an outlet contact of said finder switch for connecting the balancing circuit individual to said calling line to the hybrid network of said repeater.

74. In a telephone system, a plurality of lines, a signal current repeater adapted to be included in a connection set up between two of said lines and comprising a hybrid network, hybrid balancing circuits individual to said lines, an automatic selector switch directively controllable over any calling one of said lines and having outlet contacts, means including said switch for extending a connection from a calling one of said lines to a called one of said lines, and means comprising a path extending through an outlet contact of said switch for connecting the balancing circuit individual to the called line to the hybrid network of said repeater.

75. In a telephone system, a plurality of lines having different signal current losses, means for setting up a connection between two of said lines, a repeater included in said connection and comprising signal current amplifying means, a testing device automatically operative to determine the combined signal current losses of said pair of lines, and means controlled by said testing device for controlling the signal current gain through said repeater.

76. In a telephone system, a plurality of lines, a plurality of signal current amplifiers common to said lines, control equipment for automatically including said amplifiers in connections set up between said lines, and means for automatically locking one of said amplifiers out of service when predetermined conditions prevail in said control equipment.

77. In a telephone system, a plurality of lines, a plurality of signal current amplifiers common to said lines, an allotter for assigning said amplifiers for use in a predetermined order, control equipment for automatically including said amplifiers in connections set up between said lines in the order of their assignment, and means for automatically locking an assigned amplifier out of service when predetermined conditions prevail in said control equipment.

78. In a telephone system, a plurality of lines, a plurality of signal current amplifiers common to said lines, control circuits individual to said amplifiers, an allotter for assigning said amplifiers and their respective associated control circuits for use in a predetermined order, means including said control circuits for automatically including said amplifiers in connections set up between said lines in the order of their assignment, and means for preventing said allotter from assigning any one of said amplifiers for use when its associated control circuit is defective.

79. In a telephone system, a plurality of lines, said lines being classified according to the signal current transmission characteristics thereof, means for setting up a connection between two of said lines, a repeater included in said connection, a single testing device automatically operative to determine the classification of each of said two lines incident to the setting up of said connection, and a gain control circuit controlled by said testing device to impart a gain setting to said repeater which is in part determined by the classification of one of said two lines and in part determined by the classification of the other of said two lines.

80. In a telephone system, a plurality of lines of different classes, a repeater, means for automatically including said repeater in a connection set up between a calling and a called one of said lines, a gain control selector having different settings individually corresponding to the gains required for satisfactory communication between connected calling and called lines of said different classes, a line testing device operative incident to the setting up of said connection to test the line classification of both said calling and called lines and to impart a setting to said selector which is in part determined by the class of the calling line and in part determined by the class of the called line, and means for controlling the gain through said repeater in accordance with the setting of said selector.

81. In a telephone system, a plurality of lines, said lines being classified according to the signal current transmission characteristics thereof, marking paths individually corresponding to the different classes of lines, means for setting up a connection between two of said lines and for completing the marking paths which correspond to the classifications of said two lines, a repeater included in said connection, a gain control selector, means for successively testing said marking paths and for changing the setting of said selector each time a completed path corresponding to either of said two lines is tested, and means for controlling the gain through said repeater in accordance with the setting imparted to said selector by said testing means.

82. In a telephone system, a plurality of lines, means for setting up a connection between two of said lines, a repeater included in said connection, and means operative in response to a connection release operation performed at one end of said connection for excluding said repeater from said connection without releasing said connection.

83. In a telephone system, a plurality of lines, means for setting up a connection between two of said lines, a repeater including signal amplifying means, and means responsive to the answering of the call at the called end of said connection for including said repeater in said connection.

84. In a telephone system, a plurality of lines, means for setting up a connection between two of said lines, line circuits individual to said lines and each including line and cut-off relays, and means controlled by at least one of the relays of each of said line circuits for controlling the signal current gain through said repeater.

SETH E. PETERSON.
MORRIS E. GRIFFINS.

CERTIFICATE OF CORRECTION.

Patent No. 2,311,774.  February 23, 1943.

SETH E. PETERSON, ET AL.

It is hereby certified that error appears in the printed specification of the above numbered patent requiring correction as follows: Page 32, second column, line 24, claim 11, for "settting" read --setting--; page 38, second column, line 38, claim 60, for "balancig" read --balancing--; page 39, second column, line 43, claim 66, strike out the word "for"; line 44, for "ling" read --line--; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.